(12) United States Patent
Sikka et al.

(10) Patent No.: US 9,243,175 B2
(45) Date of Patent: Jan. 26, 2016

(54) SPILL RESISTANT SURFACES HAVING HYDROPHOBIC AND OLEOPHOBIC BORDERS

(71) Applicant: Ross Technology Corporation, Leola, PA (US)

(72) Inventors: Vinod K. Sikka, Oak Ridge, TN (US); Andrew K. Jones, Lancaster, PA (US); Russell Ross, Leola, PA (US)

(73) Assignee: Ross Technology Corporation, Leola, PA (US)

(*) Notice: Subject to any disclaimer, the term of this patent is extended or adjusted under 35 U.S.C. 154(b) by 0 days.

(21) Appl. No.: 14/320,315

(22) Filed: Jun. 30, 2014

(65) Prior Publication Data

US 2015/0097475 A1 Apr. 9, 2015

Related U.S. Application Data

(60) Division of application No. 13/082,319, filed on Apr. 7, 2011, which is a continuation of application No. PCT/US2009/059909, filed on Oct. 7, 2009.

(60) Provisional application No. 61/159,914, filed on Mar. 13, 2009, provisional application No. 61/103,295, filed on Oct. 7, 2008.

(51) Int. Cl.
*C03C 17/30* (2006.01)
*C09K 3/18* (2006.01)
(Continued)

(52) U.S. Cl.
CPC . *C09K 3/18* (2013.01); *C03C 15/00* (2013.01); *C03C 17/30* (2013.01); *C03C 19/00* (2013.01); *C09D 7/1225* (2013.01); *C09D 7/1266* (2013.01); *C09D 7/1275* (2013.01); *C09D 7/1283* (2013.01); *C09D 7/1291* (2013.01);
(Continued)

(58) Field of Classification Search
CPC ....................................................... C09D 7/1225
See application file for complete search history.

(56) References Cited

U.S. PATENT DOCUMENTS 870,439 A 11/1907 Kade
2,191,701 A 2/1940 Wood
(Continued)

FOREIGN PATENT DOCUMENTS

CA 2175848 A1 12/1996
EP 0 207 282 A2 7/1987
(Continued)

OTHER PUBLICATIONS

U.S. Appl. No. 60/699,200, filed Jul. 14, 2005, Guire et al. (Innovative Surface Technologies, Inc.).
(Continued)

*Primary Examiner* — David Sample
*Assistant Examiner* — Christopher Polley
(74) *Attorney, Agent, or Firm* — Perkins Coie LLP

(57) ABSTRACT

Described herein are methods for creating spill-proof or spill-resistant surfaces through the use of hydrophobic or oleophobic (H—SH) edges, borders and/or boundaries that contain the water and other liquids within the inside edges, borders and/or boundaries. Also described herein are spill-proof/spill-resistant surfaces. Liquid (e.g., water and other aqueous solutions/suspensions) heights of 3-6 mm on a level planar surface can be sustained by such edges, borders and/or boundaries. The H—SH borders can be created on glass, metal, wood, plastic, and concrete surfaces.

21 Claims, 9 Drawing Sheets

(A)

(B)

(C)

(D)

(E)
Drain or attachment point for a drain tube (if desired)

Surface area that is wettable or not treated with a hydrophobic or superhydrophobic agent Borders (including edges and barriers)

(51) Int. Cl.

| | | |
|---|---|---|
| *C09D 7/12* | (2006.01) | |
| *D06M 11/79* | (2006.01) | |
| *D06M 15/564* | (2006.01) | |
| *D06M 23/08* | (2006.01) | |
| *C03C 15/00* | (2006.01) | |
| *C03C 19/00* | (2006.01) | |
| *F25D 25/02* | (2006.01) | |
| *C23C 4/10* | (2006.01) | |
| *C23C 4/12* | (2006.01) | |
| *F25D 23/00* | (2006.01) | |
| *C08K 3/22* | (2006.01) | |
| *C08K 3/34* | (2006.01) | |
| *C08K 3/40* | (2006.01) | |
| *C08K 9/08* | (2006.01) | |

(52) U.S. Cl.
CPC ... *C23C 4/10* (2013.01); *C23C 4/12* (2013.01); *C23C 4/125* (2013.01); *C23C 4/127* (2013.01); *D06M 11/79* (2013.01); *D06M 15/564* (2013.01); *D06M 23/08* (2013.01); *F25D 23/00* (2013.01); *F25D 25/02* (2013.01); *C03C 2217/20* (2013.01); *C03C 2217/76* (2013.01); *C03C 2218/11* (2013.01); *C03C 2218/17* (2013.01); *C03C 2218/31* (2013.01); *C03C 2218/34* (2013.01); *C08K 3/22* (2013.01); *C08K 3/34* (2013.01); *C08K 3/40* (2013.01); *C08K 9/08* (2013.01); *D06M 2200/11* (2013.01); *D06M 2200/12* (2013.01); *F25D 2325/022* (2013.01); *F25D 2400/22* (2013.01); *Y10T 428/24802* (2015.01); *Y10T 428/25* (2015.01); *Y10T 442/2172* (2013.04)

(56) References Cited

U.S. PATENT DOCUMENTS

| | | |
|---|---|---|
| 2,976,386 A | 3/1961 | Salton Lewis |
| 3,185,426 A | 5/1965 | Bjerke |
| 3,244,541 A | 4/1966 | Fain et al. |
| 3,354,022 A | 11/1967 | Dettre et al. |
| 3,579,540 A | 5/1971 | Ohlhausen |
| 3,716,502 A | 2/1973 | Loew |
| 3,931,428 A | 1/1976 | Reick |
| 3,963,349 A | 6/1976 | Albright et al. |
| 3,967,030 A | 6/1976 | Johnson et al. |
| 3,976,572 A | 8/1976 | Reick |
| 3,980,153 A | 9/1976 | Andrews |
| 4,142,724 A | 3/1979 | Reick |
| 4,199,142 A | 4/1980 | Reick |
| 4,301,197 A | 11/1981 | Franz et al. |
| 4,301,213 A | 11/1981 | Davies |
| 4,311,755 A | 1/1982 | Rummel |
| 4,415,405 A | 11/1983 | Ruddle et al. |
| 4,451,619 A | 5/1984 | Heilmann et al. |
| 4,453,533 A | 6/1984 | Scheidler et al. |
| 4,492,217 A | 1/1985 | Scheidler |
| 4,581,149 A | 4/1986 | Horodysky et al. |
| 4,591,530 A | 5/1986 | Lui |
| 4,614,464 A | 9/1986 | Christensen |
| 4,624,900 A | 11/1986 | Fau |
| 4,646,948 A | 3/1987 | Jennings |
| 4,680,173 A | 7/1987 | Burger |
| 4,687,707 A | 8/1987 | Matsuo et al. |
| 4,733,843 A | 3/1988 | Bessinger |
| 4,738,426 A | 4/1988 | Bessinger |
| D295,950 S | 5/1988 | Johnston |
| 4,749,110 A | 6/1988 | Maeno et al. |
| 4,753,977 A | 6/1988 | Merrill |
| 4,782,112 A | 11/1988 | Kondo et al. |
| 4,835,014 A | 5/1989 | Roth et al. |
| 4,855,176 A | 8/1989 | Ohwaki et al. |
| 4,870,907 A | 10/1989 | McKee |
| 4,923,260 A | 5/1990 | Poulsen |
| 4,971,912 A | 11/1990 | Buhl et al. |
| 4,983,459 A | 1/1991 | Franz et al. |
| 5,011,727 A | 4/1991 | Kido et al. |
| 5,011,963 A | 4/1991 | Ogawa et al. |
| 5,032,641 A | 7/1991 | Nanishi et al. |
| 5,041,304 A | 8/1991 | Kusano et al. |
| 5,057,050 A | 10/1991 | Hill |
| 5,084,191 A | 1/1992 | Nagase et al. |
| 5,121,134 A | 6/1992 | Albinson et al. |
| 5,156,611 A | 10/1992 | Haynes et al. |
| 5,202,361 A | 4/1993 | Zimmerman et al. |
| 5,225,274 A | 7/1993 | Ogawa et al. |
| 5,228,764 A | 7/1993 | Cherry et al. |
| 5,228,905 A | 7/1993 | Grunewalder et al. |
| 5,238,746 A | 8/1993 | Soga et al. |
| 5,240,774 A | 8/1993 | Ogawa et al. |
| 5,274,159 A | 12/1993 | Pellerite et al. |
| 5,284,707 A | 2/1994 | Ogawa et al. |
| 5,294,252 A | 3/1994 | Gun |
| 5,300,239 A | 4/1994 | Ozaki et al. |
| 5,308,705 A | 5/1994 | Franz et al. |
| 5,316,799 A | 5/1994 | Brunken et al. |
| 5,317,129 A | 5/1994 | Taplan et al. |
| 5,324,566 A | 6/1994 | Ogawa et al. |
| 5,328,768 A | 7/1994 | Goodwin |
| 5,338,345 A | 8/1994 | Scarborough et al. |
| 5,348,547 A | 9/1994 | Payne et al. |
| 5,362,145 A | 11/1994 | Bird et al. |
| 5,364,299 A | 11/1994 | Hill et al. |
| 5,366,810 A | 11/1994 | Merrifield et al. |
| 5,368,892 A | 11/1994 | Berquier |
| 5,372,888 A | 12/1994 | Ogawa et al. |
| 5,380,585 A | 1/1995 | Ogawa et al. |
| 5,385,966 A | 1/1995 | Hermansen et al. |
| 5,395,657 A | 3/1995 | Strepparola et al. |
| 5,424,130 A | 6/1995 | Nakanishi et al. |
| 5,429,433 A | 7/1995 | Bird et al. |
| 5,435,839 A | 7/1995 | Ogawa |
| 5,437,894 A | 8/1995 | Ogawa et al. |
| 5,437,900 A | 8/1995 | Kuzowski |
| 5,441,338 A | 8/1995 | Kane et al. |
| 5,458,976 A | 10/1995 | Horino et al. |
| 5,466,770 A | 11/1995 | Audenaert et al. |
| 5,489,328 A | 2/1996 | Ono et al. |
| 5,500,216 A | 3/1996 | Julian et al. |
| 5,540,493 A | 7/1996 | Kane et al. |
| 5,556,667 A | 9/1996 | Teranishi et al. |
| 5,558,940 A | 9/1996 | Michels et al. |
| 5,564,809 A | 10/1996 | Kane et al. |
| 5,576,096 A | 11/1996 | Ono et al. |
| 5,578,361 A | 11/1996 | Tsujioka et al. |
| 5,584,957 A | 12/1996 | Schultheis et al. |
| 5,585,896 A | 12/1996 | Yamazaki et al. |
| 5,599,893 A | 2/1997 | Asai et al. |
| 5,612,433 A | 3/1997 | Ono et al. |
| 5,618,627 A | 4/1997 | Merrifield et al. |
| 5,651,921 A | 7/1997 | Kaijou |
| 5,674,967 A | 10/1997 | Goodwin |
| 5,679,460 A | 10/1997 | Schakenraad et al. |
| 5,688,864 A | 11/1997 | Goodwin |
| 5,697,991 A | 12/1997 | Frazer |
| 5,707,740 A | 1/1998 | Goodwin |
| 5,725,789 A | 3/1998 | Huber et al. |
| 5,735,589 A | 4/1998 | Herrmann et al. |
| 5,747,561 A | 5/1998 | Smirnov et al. |
| 5,753,734 A | 5/1998 | Maruyama |
| 5,798,144 A | 8/1998 | Varansai et al. |
| 5,800,918 A | 9/1998 | Chartier et al. |
| 5,813,741 A | 9/1998 | Fish et al. |
| 5,814,411 A | 9/1998 | Merrifield et al. |
| 5,824,421 A | 10/1998 | Kobayashi et al. |
| 5,830,529 A | 11/1998 | Ross |
| 5,840,201 A | 11/1998 | Elledge |
| 5,843,338 A | 12/1998 | Inoue et al. |
| 5,853,690 A | 12/1998 | Hibino et al. |
| 5,853,800 A | 12/1998 | Dombrowski et al. |
| 5,858,551 A | 1/1999 | Salsman |
| 5,876,806 A | 3/1999 | Ogawa |

(56) References Cited

U.S. PATENT DOCUMENTS

| | | |
|---|---|---|
| 5,890,907 A | 4/1999 | Minasian |
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,952,053 A | 9/1999 | Colby |
| 5,958,601 A | 9/1999 | Salsman |
| 5,980,990 A | 11/1999 | Goodwin |
| 6,013,724 A | 1/2000 | Mizutani et al. |
| 6,017,609 A | 1/2000 | Akamatsu et al. |
| 6,024,948 A | 2/2000 | Samain et al. |
| 6,025,025 A | 2/2000 | Bartrug et al. |
| 6,033,738 A | 3/2000 | Teranishi et al. |
| 6,045,650 A | 4/2000 | Mitchnick et al. |
| 6,068,911 A | 5/2000 | Shouji et al. |
| 6,090,447 A | 7/2000 | Suzuki et al. |
| 6,093,559 A | 7/2000 | Bookbinder et al. |
| 6,096,380 A | 8/2000 | Takebe et al. |
| 6,105,233 A | 8/2000 | Neal |
| 6,114,446 A | 9/2000 | Narisawa et al. |
| 6,117,555 A | 9/2000 | Fujimori et al. |
| 6,119,626 A | 9/2000 | Miyazawa et al. |
| 6,120,720 A | 9/2000 | Meier et al. |
| 6,136,210 A | 10/2000 | Biegelsen et al. |
| 6,153,304 A | 11/2000 | Smith et al. |
| 6,187,143 B1 | 2/2001 | Juppo et al. |
| 6,191,122 B1 | 2/2001 | Lux et al. |
| 6,201,058 B1 | 3/2001 | Mahr et al. |
| 6,207,236 B1 | 3/2001 | Araki et al. |
| 6,221,434 B1 | 4/2001 | Visca et al. |
| 6,224,974 B1 | 5/2001 | Wuu |
| 6,228,435 B1 | 5/2001 | Yoshikawa et al. |
| 6,228,972 B1 | 5/2001 | Hikita et al. |
| 6,235,383 B1 | 5/2001 | Hong et al. |
| 6,235,833 B1 | 5/2001 | Akamatsu et al. |
| 6,245,387 B1 | 6/2001 | Hayden |
| 6,264,751 B1 | 7/2001 | Kamura et al. |
| 6,280,834 B1 | 8/2001 | Veerasamy et al. |
| 6,333,074 B1 | 12/2001 | Ogawa et al. |
| 6,333,558 B1 | 12/2001 | Hasegawa |
| 6,337,133 B1 | 1/2002 | Akamatsu et al. |
| 6,340,502 B1 | 1/2002 | Azzopardi et al. |
| 6,342,268 B1 | 1/2002 | Samain |
| 6,352,758 B1 | 3/2002 | Huang et al. |
| 6,358,569 B1 | 3/2002 | Badyal et al. |
| 6,361,868 B1 | 3/2002 | Bier et al. |
| 6,376,592 B1 | 4/2002 | Shimada et al. |
| 6,379,751 B1 | 4/2002 | Schaefer et al. |
| 6,383,642 B1 | 5/2002 | Le Bellac et al. |
| 6,403,397 B1 | 6/2002 | Katz |
| 6,419,985 B1 | 7/2002 | Ishizuka |
| 6,423,372 B1 | 7/2002 | Genzer et al. |
| 6,423,381 B1 | 7/2002 | Colton et al. |
| 6,432,181 B1 | 8/2002 | Ludwig |
| 6,451,432 B1 | 9/2002 | Azzopardi et al. |
| 6,458,420 B1 | 10/2002 | Akamatsu et al. |
| 6,461,537 B1 | 10/2002 | Turcotte et al. |
| 6,461,670 B2 | 10/2002 | Akamatsu et al. |
| 6,462,115 B1 | 10/2002 | Takahashi et al. |
| 6,471,761 B2 | 10/2002 | Fan et al. |
| 6,476,095 B2 | 11/2002 | Simendinger, III |
| 6,479,612 B1 | 11/2002 | Del Pesco et al. |
| 6,482,524 B1 | 11/2002 | Yamamoto et al. |
| 6,488,347 B1 | 12/2002 | Bienick |
| 6,564,935 B1 | 5/2003 | Yamamoto et al. |
| 6,579,620 B2 | 6/2003 | Mizunno et al. |
| 6,582,825 B2 | 6/2003 | Amarasekera et al. |
| 6,584,744 B1 | 7/2003 | Schultheis et al. |
| 6,589,641 B1 | 7/2003 | Stirniman et al. |
| 6,596,060 B1 | 7/2003 | Michaud |
| 6,610,363 B2 | 8/2003 | Arora et al. |
| 6,613,860 B1 | 9/2003 | Dams et al. |
| 6,623,863 B2 | 9/2003 | Kamitani et al. |
| 6,641,654 B2 | 11/2003 | Akamatsu et al. |
| 6,649,222 B1 | 11/2003 | D'Agostino et al. |
| 6,652,640 B2 | 11/2003 | Asai et al. |
| 6,660,339 B1 | 12/2003 | Datta et al. |
| 6,660,363 B1 | 12/2003 | Barthlott |
| 6,660,686 B2 | 12/2003 | Inagaki et al. |
| 6,683,126 B2 | 1/2004 | Keller et al. |
| 6,685,992 B1 | 2/2004 | Ogawa et al. |
| 6,689,200 B2 | 2/2004 | Scarborough et al. |
| 6,692,565 B2 | 2/2004 | Johansen, Jr. et al. |
| 6,706,798 B2 | 3/2004 | Kobayashi et al. |
| 6,720,371 B2 | 4/2004 | Furuta et al. |
| 6,729,704 B2 | 5/2004 | Ames |
| 6,733,892 B1 | 5/2004 | Yoneda et al. |
| 6,743,467 B1 | 6/2004 | Jones et al. |
| 6,767,984 B2 | 7/2004 | Toui et al. |
| 6,770,323 B2 | 8/2004 | Genzer et al. |
| 6,780,497 B1 | 8/2004 | Walter |
| 6,786,562 B2 | 9/2004 | Obrock et al. |
| 6,793,821 B2 | 9/2004 | Lee et al. |
| 6,800,354 B2 | 10/2004 | Baumann et al. |
| 6,806,299 B2 | 10/2004 | Baumann et al. |
| 6,808,835 B2 | 10/2004 | Green et al. |
| 6,811,716 B1 | 11/2004 | Stengaard et al. |
| 6,811,844 B2 | 11/2004 | Trouilhet |
| 6,845,788 B2 | 1/2005 | Extrand |
| 6,852,390 B2 | 2/2005 | Extrand |
| 6,855,375 B2 | 2/2005 | Nakagawa et al. |
| 6,855,759 B2 | 2/2005 | Kudo et al. |
| 6,858,284 B2 | 2/2005 | Nun et al. |
| 6,871,923 B2 | 3/2005 | Dietz et al. |
| 6,872,441 B2 | 3/2005 | Baumann et al. |
| 6,890,360 B2 | 5/2005 | Cote et al. |
| 6,923,216 B2 | 8/2005 | Extrand et al. |
| 6,926,946 B2 | 8/2005 | Ogawa et al. |
| 6,931,888 B2 | 8/2005 | Shekunov et al. |
| 6,938,774 B2 | 9/2005 | Extrand |
| 6,942,746 B2 | 9/2005 | Niejelow et al. |
| 6,966,990 B2 | 11/2005 | Chattopadhyay et al. |
| 6,976,585 B2 | 12/2005 | Extrand |
| 6,976,998 B2 | 12/2005 | Rizzo et al. |
| 6,982,242 B2 | 1/2006 | Liss et al. |
| 6,994,045 B2 | 2/2006 | Paszkowski |
| 6,998,051 B2 | 2/2006 | Chattopadhyay et al. |
| 7,019,069 B2 | 3/2006 | Kobayashi et al. |
| 7,022,416 B2 | 4/2006 | Teranishi |
| 7,026,018 B2 | 4/2006 | Kranovich |
| 7,037,591 B2 | 5/2006 | Henze et al. |
| 7,048,889 B2 | 5/2006 | Arney et al. |
| 7,052,244 B2 | 5/2006 | Fouillet et al. |
| 7,056,409 B2 | 6/2006 | Dubrow |
| 7,057,832 B2 | 6/2006 | Wu et al. |
| 7,057,881 B2 | 6/2006 | Chow et al. |
| 7,074,273 B2 | 7/2006 | Shimomura et al. |
| 7,074,294 B2 | 7/2006 | Dubrow |
| 7,083,748 B2 | 8/2006 | Chattopadhyay et al. |
| 7,083,828 B2 | 8/2006 | Muller et al. |
| 7,109,256 B2 | 9/2006 | Amano et al. |
| 7,112,369 B2 | 9/2006 | Wang et al. |
| 7,148,181 B2 | 12/2006 | Tanaka et al. |
| 7,150,904 B2 | 12/2006 | D'Urso et al. |
| 7,153,357 B2 | 12/2006 | Baumgart et al. |
| 7,157,018 B2 | 1/2007 | Scheidler |
| 7,166,235 B2 | 1/2007 | Majeti et al. |
| 7,175,723 B2 | 2/2007 | Jones et al. |
| 7,179,758 B2 | 2/2007 | Chakrapani et al. |
| 7,179,864 B2 | 2/2007 | Wang |
| 7,188,917 B2 | 3/2007 | Bienick |
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al |
| 7,211,605 B2 | 5/2007 | Coronado et al. |
| 7,213,309 B2 | 5/2007 | Wang et al. |
| D547,640 S | 7/2007 | Remmers |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |

(56) References Cited

U.S. PATENT DOCUMENTS

| | | |
|---|---|---|
| 7,265,468 B1 | 9/2007 | Mancl et al. |
| 7,273,658 B2 | 9/2007 | Banayoun et al. |
| 7,285,331 B1 | 10/2007 | Reihs et al. |
| 7,288,311 B2 | 10/2007 | Kawashima et al. |
| 7,288,592 B2 | 10/2007 | Stark et al. |
| 7,291,653 B2 | 11/2007 | Baumann et al. |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |
| 7,354,650 B2 | 4/2008 | Nakajima et al. |
| D568,344 S | 5/2008 | Baacke et al. |
| 7,368,510 B2 | 5/2008 | Lee et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |
| 7,468,333 B2 | 12/2008 | Kimbrell, Jr. et al. |
| 7,524,531 B2 | 4/2009 | Axtell, III et al. |
| 7,527,832 B2 | 5/2009 | Sakoske et al. |
| D596,931 S | 7/2009 | Fernandez |
| D596,932 S | 7/2009 | Kleinsasser |
| 7,563,505 B2 | 7/2009 | Reihs |
| 7,568,583 B2 | 8/2009 | Wing et al. |
| 7,607,744 B2 | 10/2009 | Casoli et al. |
| D607,020 S | 12/2009 | Baacke et al. |
| D612,404 S | 3/2010 | Picken et al. |
| D612,405 S | 3/2010 | Eicher |
| D613,316 S | 4/2010 | Schmidt |
| 7,726,615 B2 | 6/2010 | Rutz |
| 7,731,316 B2 | 6/2010 | Wing |
| 7,748,806 B2 | 7/2010 | Egan |
| 7,989,619 B2 | 8/2011 | Guire et al. |
| 8,286,561 B2 | 10/2012 | Driver et al. |
| 8,596,205 B2 | 12/2013 | Driver et al. |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |
| 2002/0077412 A1 | 6/2002 | Kobayashi et al. |
| 2002/0111402 A1 | 8/2002 | Mizuno et al. |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0021902 A1 | 1/2003 | Yamamoto et al. |
| 2003/0026972 A1 | 2/2003 | Reihs |
| 2003/0040243 A1 | 2/2003 | Ward |
| 2003/0040568 A1 | 2/2003 | Furuta et al. |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0179494 A1 | 9/2003 | Kaneko |
| 2004/0005469 A1 | 1/2004 | Metz et al. |
| 2004/0020104 A1 | 2/2004 | Feldhege et al. |
| 2004/0025747 A1 | 2/2004 | Kamitani et al. |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0121168 A1 | 6/2004 | Goodwin et al. |
| 2004/0137814 A1 | 7/2004 | Kimbrell, Jr. et al. |
| 2004/0138083 A1 | 7/2004 | Kimbrell, Jr. et al. |
| 2004/0142557 A1 | 7/2004 | Levy et al. |
| 2004/0154106 A1 | 8/2004 | Oles et al. |
| 2004/0201048 A1 | 10/2004 | Seki et al. |
| 2004/0202872 A1 | 10/2004 | Fang et al. |
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0022313 A1 | 2/2005 | Scheidler |
| 2005/0053793 A1 | 3/2005 | Benay-Oun et al. |
| 2005/0075020 A1 | 4/2005 | Benayoun et al. |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0207032 A1 | 9/2006 | Reiners et al. |
| 2006/0213849 A1 | 9/2006 | Bienick |
| 2006/0222865 A1 | 10/2006 | Hoshino et al. |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0046160 A1 | 3/2007 | Egan |
| 2007/0065668 A1 | 3/2007 | Idei |
| 2007/0075199 A1 | 4/2007 | Stewart et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear, III, et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |

(56) References Cited

U.S. PATENT DOCUMENTS

| | | |
|---|---|---|
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0012459 A1 | 1/2008 | Picken et al. |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0166549 A1 | 7/2008 | Shieh et al. |
| 2008/0171805 A1 | 7/2008 | Mingarelli |
| 2008/0172937 A1 | 7/2008 | Palmer et al. |
| 2008/0176991 A1 | 7/2008 | Osawa et al. |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbart et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1 | 10/2008 | Baumgart et al. |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'Urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0195136 A1 | 8/2009 | Wing et al. |
| 2009/0212505 A1 | 8/2009 | McMillin et al. |
| 2010/0001625 A1 | 1/2010 | Eckartsberg et al. |
| 2010/0026156 A1 | 2/2010 | Leconte et al. |
| 2010/0052491 A1 | 3/2010 | Vardon |
| 2010/0102693 A1 | 4/2010 | Driver et al. |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0330347 A1 | 12/2010 | Badyal et al. |

FOREIGN PATENT DOCUMENTS

| | | |
|---|---|---|
| EP | 0 307 915 A2 | 3/1989 |
| EP | 0 317 057 A2 | 5/1989 |
| EP | 0 332 141 A2 | 9/1989 |
| EP | 0 399 568 A2 | 11/1990 |
| EP | 0 452 723 A1 | 10/1991 |
| EP | 0 472 215 A2 | 2/1992 |
| EP | 0 493 270 A2 | 7/1992 |
| EP | 0 545 201 A2 | 6/1993 |
| EP | 0 623 656 A2 | 11/1994 |
| EP | 0 649 887 A2 | 4/1995 |
| EP | 0 657 393 A1 | 6/1995 |
| EP | 0 714 870 A1 | 6/1996 |
| EP | 0 714 921 A1 | 6/1996 |
| EP | 0 719 743 A1 | 7/1996 |
| EP | 0 719 821 A1 | 7/1996 |
| EP | 0 739 714 A2 | 10/1996 |
| EP | 0 745 567 A1 | 12/1996 |
| EP | 0 745 568 A1 | 12/1996 |
| EP | 0 752 459 A2 | 1/1997 |
| EP | 0 770 706 A1 | 5/1997 |
| EP | 0 904 343 A1 | 5/1997 |
| EP | 0 799 791 A1 | 10/1997 |
| EP | 0 811 430 A1 | 12/1997 |
| EP | 0 863 191 A2 | 9/1998 |
| EP | 0 969 718 B1 | 9/1998 |
| EP | 0 903 389 A1 | 3/1999 |
| EP | 0 914 873 A1 | 5/1999 |
| EP | 0 915 103 A1 | 5/1999 |
| EP | 0 930 351 A1 | 7/1999 |
| EP | 1 047 735 A2 | 11/2000 |
| EP | 1 048 696 A2 | 11/2000 |
| EP | 1 097 979 A1 | 5/2001 |
| EP | 1 108 735 A1 | 6/2001 |
| EP | 1 113 064 A1 | 7/2001 |
| EP | 1 136 539 A1 | 9/2001 |
| EP | 1 180 533 A1 | 2/2002 |
| EP | 1 187 872 A1 | 3/2002 |
| EP | 1 193 289 A1 | 4/2002 |
| EP | 1 215 252 A2 | 6/2002 |
| EP | 1 401 903 A2 | 9/2002 |
| EP | 1 261 559 A1 | 12/2002 |
| EP | 1 392 619 A1 | 12/2002 |
| EP | 1 392 772 A1 | 12/2002 |
| EP | 1 429 919 A1 | 2/2003 |
| EP | 1 492 837 A1 | 10/2003 |
| EP | 1 360 253 A2 | 11/2003 |
| EP | 1 362 904 A1 | 11/2003 |
| EP | 1 503 813 A1 | 11/2003 |
| EP | 1 387 011 A1 | 2/2004 |
| EP | 1 387 169 A1 | 2/2004 |

(56) References Cited

FOREIGN PATENT DOCUMENTS

| | | |
|---|---|---|
| EP | 1 407 792 A1 | 4/2004 |
| EP | 1 433 821 A1 | 6/2004 |
| EP | 1 583 615 A1 | 7/2004 |
| EP | 1 473 355 A1 | 11/2004 |
| EP | 1 475 234 A1 | 11/2004 |
| EP | 1 479 738 A1 | 11/2004 |
| EP | 1 524 290 A1 | 4/2005 |
| EP | 1 875 279 A1 | 11/2006 |
| EP | 1 883 669 A1 | 11/2006 |
| EP | 1 902 091 A2 | 1/2007 |
| EP | 1 752 284 A1 | 2/2007 |
| EP | 1 857 497 A2 | 11/2007 |
| EP | 1 873 218 A1 | 1/2008 |
| EP | 1 908 804 A1 | 4/2008 |
| EP | 1 988 129 A2 | 11/2008 |
| EP | 1 997 619 A1 | 12/2008 |
| EP | 06787306.7 | 5/2013 |
| GB | 1 341 605 A | 12/1973 |
| JP | 62-246960 A | 10/1987 |
| JP | 2004308984 A | 11/2004 |
| JP | 2007182491 A | 7/2007 |
| JP | 2008228958 A | 10/2008 |
| JP | 2009071672 A | 4/2009 |
| KR | 10-2003-052853 | 6/2003 |
| MX | 175646 | 8/1994 |
| MX | 183533 | 12/1996 |
| MX | 192053 | 5/1999 |
| MX | 195031 | 1/2000 |
| MX | 199899 | 11/2000 |
| MX | 201072 | 3/2001 |
| MX | 203880 | 8/2001 |
| MX | 205074 | 11/2001 |
| MX | PA01011653 A | 12/2002 |
| MX | 215752 | 8/2003 |
| MX | PA02006399 A | 9/2003 |
| MX | PA04010165 A | 2/2005 |
| MX | PA05006898 A | 8/2005 |
| MX | PA02012841 A | 1/2006 |
| MX | 234477 | 2/2006 |
| MX | PA06003323 A | 3/2006 |
| WO | WO 91-04305 A1 | 4/1991 |
| WO | WO 93-16131 A1 | 8/1993 |
| WO | WO 94-13734 A1 | 6/1994 |
| WO | WO 96-04123 A1 | 2/1996 |
| WO | WO 96-07621 A1 | 3/1996 |
| WO | WO 97-07993 A1 | 3/1997 |
| WO | WO 98-20960 A1 | 5/1998 |
| WO | WO 99-23137 A1 | 5/1999 |
| WO | WO 99-23437 A1 | 5/1999 |
| WO | WO 99-40431 A1 | 8/1999 |
| WO | WO 99-47578 A1 | 9/1999 |
| WO | WO 99-48339 A1 | 9/1999 |
| WO | WO 99-57185 A1 | 11/1999 |
| WO | WO 99-64363 A1 | 12/1999 |
| WO | WO 00-05321 A1 | 2/2000 |
| WO | WO 00-14297 A1 | 3/2000 |
| WO | WO 00-25938 A1 | 5/2000 |
| WO | WO 00-34361 A1 | 6/2000 |
| WO | WO 00-39240 A1 | 7/2000 |
| WO | WO 00-46464 A1 | 8/2000 |
| WO | WO 00-66241 A1 | 11/2000 |
| WO | WO 01-19745 A1 | 3/2001 |
| WO | WO 01-62682 A1 | 8/2001 |
| WO | WO 01-74739 A1 | 10/2001 |
| WO | WO 01-79142 A1 | 10/2001 |
| WO | WO 01-79371 A2 | 10/2001 |
| WO | WO 01-98399 A1 | 12/2001 |
| WO | WO 02-14417 A1 | 2/2002 |
| WO | WO 02-28951 A1 | 4/2002 |
| WO | WO 02-062910 A2 | 8/2002 |
| WO | WO 02-074869 A1 | 9/2002 |
| WO | WO 02-098983 A1 | 12/2002 |
| WO | WO 03-010255 A2 | 2/2003 |
| WO | WO 03-012004 A1 | 2/2003 |
| WO | WO 03-030879 A1 | 4/2003 |
| WO | WO 03-037702 A1 | 5/2003 |
| WO | WO 03-045693 A1 | 6/2003 |
| WO | WO 03-080258 A2 | 10/2003 |
| WO | WO 03-082998 A1 | 10/2003 |
| WO | WO 03-093568 A1 | 11/2003 |
| WO | WO 2004-012625 A2 | 2/2004 |
| WO | WO 2004-043319 A1 | 5/2004 |
| WO | WO 2004-058418 A1 | 7/2004 |
| WO | WO 2004-104116 A1 | 12/2004 |
| WO | WO 2004-110132 A2 | 12/2004 |
| WO | WO 2005-021843 A1 | 3/2005 |
| WO | WO 2005-023935 A1 | 3/2005 |
| WO | WO 2005-028562 A1 | 3/2005 |
| WO | WO 2005-068399 A1 | 7/2005 |
| WO | WO 2005-077429 A1 | 8/2005 |
| WO | WO 2006/044641 A2 | 4/2006 |
| WO | WO 2006-044642 A2 | 4/2006 |
| WO | WO 2006-081891 A1 | 8/2006 |
| WO | WO 2006-083600 A1 | 8/2006 |
| WO | WO 2006-101934 A1 | 9/2006 |
| WO | WO 2006-135755 A2 | 12/2006 |
| WO | WO 2007-011731 A2 | 1/2007 |
| WO | WO 2007-027276 A1 | 3/2007 |
| WO | WO 2007-052260 A2 | 5/2007 |
| WO | WO 2007-053266 A1 | 5/2007 |
| WO | WO 2007-056427 A2 | 5/2007 |
| WO | WO 2007-070801 A2 | 6/2007 |
| WO | WO 2007-075407 A1 | 7/2007 |
| WO | WO 2007-092746 A2 | 8/2007 |
| WO | WO 2007-102960 A2 | 9/2007 |
| WO | WO 2007-104494 A1 | 9/2007 |
| WO | WO 2007-126432 A1 | 11/2007 |
| WO | WO 2007-126743 A1 | 11/2007 |
| WO | WO 2007-130294 A2 | 11/2007 |
| WO | WO 2007-149617 A1 | 12/2007 |
| WO | WO 2008-004827 A1 | 1/2008 |
| WO | WO 2008-004828 A1 | 1/2008 |
| WO | WO 2008-006078 A2 | 1/2008 |
| WO | WO 2008-021791 A2 | 2/2008 |
| WO | WO 2008-035347 A2 | 3/2008 |
| WO | WO 2008-035917 A1 | 3/2008 |
| WO | WO 2008-050895 A1 | 5/2008 |
| WO | WO 2008-051221 A2 | 5/2008 |
| WO | WO 2008-066828 A2 | 6/2008 |
| WO | WO 2008-078346 A1 | 7/2008 |
| WO | WO 2008-106494 A1 | 9/2008 |
| WO | WO 2008-112158 A1 | 9/2008 |
| WO | WO 2008-123650 A1 | 10/2008 |
| WO | WO 2008-123955 A1 | 10/2008 |
| WO | WO 2008-123961 A1 | 10/2008 |
| WO | WO 2008-134243 A1 | 11/2008 |
| WO | WO 2008-137973 A1 | 11/2008 |
| WO | WO 2008-151991 A1 | 12/2008 |
| WO | WO 2008-153687 A2 | 12/2008 |
| WO | WO 2009-003847 A1 | 1/2009 |
| WO | WO 2009-005465 A1 | 1/2009 |
| WO | WO 2009-012116 A2 | 1/2009 |
| WO | WO 2009-018327 A2 | 2/2009 |
| WO | WO 2009-037717 A2 | 3/2009 |
| WO | WO 2009-041752 A1 | 4/2009 |
| WO | WO 2009-061199 A1 | 5/2009 |
| WO | WO 2009-148611 A1 | 12/2009 |
| WO | WO 2009-158567 A1 | 12/2009 |

OTHER PUBLICATIONS

U.S. Appl. No. 60/807,143, filed Jul. 12, 2006, Guire et al. (Innovative Surface Technologies, Inc.).
U.S. Appl. No. 60/891,876, filed Feb. 27, 2007, Lawin et al. (Innovative Surface Technology, Inc.).
U.S. Appl. No. 61/058,902, filed Jun. 4, 2008, Driver et al.
U.S. Appl. No. 61/090,002, filed Aug. 19, 2008, Driver et al.
U.S. Appl. No. 61/133,273, filed Jun. 27, 2008, Driver et al.
U.S. Appl. No. 61/216,540, filed May 18, 2009, Driver et al.
"NeverWet—product characteristics," found at http://www.neverwet.com/product-characteristics.php, NeverWet LLC (viewed Mar. 7, 2013).

(56) References Cited

OTHER PUBLICATIONS

Du, "Surfactants, Dispersants, and Defoamers for the Coatings, Inks, and Adhesives Industries," in *Coatings Technology Handbook, Third Edition*, Tracton (ed.), CRC Press (2005).
EPO Communication dated Dec. 5, 2011, regarding third-party observations filed in European Application No. 09771098.2.
Extended European search report for European Application No. 09771098.2, dated Dec. 27, 2011.
Extended European search report for European Application No. 09819518, dated Jul. 22, 2014.
*In re Inter Partes Review of U.S. Pat. No. 8,286,561*, Amended Petition for Inter Partes Review of U.S. Pat. No. 8,286,561 Under 35 U.S.C. §§ 311-319 and 37 C.F.R. § 42.100 et seq., Trial No. IPR2013-00358 (Jun. 21, 2013).
*In re Inter Partes Review of U.S. Pat. No. 8,286,561*, Christopher B. Schechter Deposition, Trial No. IPR2013-00358 (Jan. 23, 2014).
*In re Inter Partes Review of U.S. Pat. No. 8,286,561*, Decision, Trial No. IPR2013-00358 (Nov. 14, 2013).
*In re Inter Partes Review of U.S. Pat. No. 8,286,561*, Declaration of Bradley M. Nall—Redacted Version, Trial No. IPR2013-00358 (Jan. 17, 2014).
*In re Inter Partes Review of U.S. Pat. No. 8,286,561*, Declaration of Chris B. Schechter, Trial No. IPR2014-00367 (Jan. 21, 2014).
*In re Inter Partes Review of U.S. Pat. No. 8,286,561*, Declaration of John Driver, Trial No. IPR2013-00358 (Feb. 7, 2014).
*In re Inter Partes Review of U.S. Pat. No. 8,286,561*, Patent Owner Preliminary Response Under 37 C.F.R. §§ 42.107, Trial No. IPR2013-00358 (Aug. 14, 2013).
*In re Inter Partes Review of U.S. Pat. No. 8,286,561*, Patent Owner Preliminary Response, Trial No. IPR2014-00367 (Apr. 29, 2014).
*In re Inter Partes Review of U.S. Pat. No. 8,286,561*, Patent Owner Response Under 37 C.F.R. §§ 42.120, Trial No. IPR2013-00358 (Feb. 7, 2014).
*In re Inter Partes Review of U.S. Pat. No. 8,286,561*, Patent Owner's Motion for Additional Discovery Pursuant to 37 C.F.R. §42.51(b)(2)—Redacted Version, Trial No. IPR2013-00358 (Aug. 14, 2013).
*In re Inter Partes Review of U.S. Pat. No. 8,286,561*, Paul Saunders Deposition, Trial No. IPR2013-00358 (Apr. 11, 2014).
*In re Inter Partes Review of U.S. Pat. No. 8,286,561*, Petition for Inter Partes Review of U.S. Pat. No. 8,286,561 Under 35 U.S.C. §§ 311-319 and 37 C.F.R. § 42.100 et seq., Trial No. IPR2013-00358 (Jun. 14, 2013).
*In re Inter Partes Review of U.S. Pat. No. 8,286,561*, Petition for Inter Partes Review of U.S. Pat. No. 8,286,561 Under 35 U.S.C. §§ 311-319 and 37 C.F.R. § 42.100 et seq., Trial No. IPR2014-00367 (Jan. 17, 2014).
*In re Inter Partes Review of U.S. Pat. No. 8,286,561*, Petitioner's Reply to Patent Owner's Response to Petition—Public Redacted Version, Trial No. IPR2013-00358 (Apr. 22, 2014).
*In re Inter Partes Review of U.S. Pat. No. 8,286,561*, Second Declaration of Bradley M. Nall, Trial No. IPR2013-00358 (Feb. 6, 2014).
*In re Inter Partes Review of U.S. Pat. No. 8,286,561*, Second Notice of Deposition of Paul Saunders Pursuant to 37 C.F.R. § 42.53, Trial No. IPR2013-00358 (Apr. 10, 2014).
International Preliminary Report on Patentability for International Application No. PCT/US2009/048775, dated Jan. 13, 2011.
International Preliminary Report on Patentability for International Application No. PCT/US2009/059909, dated Apr. 21, 2011.
International Search Report and Written Opinion for International Application No. PCT/US2009/048775, dated Nov. 19, 2009.
International Search Report and Written Opinion for International Application No. PCT/US2009/059909, dated Dec. 4, 2009.
International Search Report and Written Opinion for International Application No. PCT/US2010/048711, dated Mar. 17, 2011.
International Search Report and Written Opinion for International Application No. PCT/US2010/054936, dated Feb. 16, 2011.
Kobayashi et al., Surface Tension of Poly[(3,3,4,4,5,5,6,6,6-nonafluorohexyl)-methylsiloxane], *Macromolecules*, 23:4929-4933 (1990).
Le Marechal et al., "Textile Finishing Industry as an Important Source of Organic Pollutants," in *Organic Pollutants Ten Years After the Stockholm Convention—Environmental and Analytical Update*, Puzyn (ed.), Chapter 2, pp. 29-54, InTech (2012).
Ming et al., "Toward Superlyophobic Surfaces," *Contact Angle, Wettability and Adhesion* (ed. Mittal), vol. 6, pp. 191-205, Koninklijke Brill NV, Leiden (2009).
*SSW Holding Company, Inc.* v. *Schott Gemtron Corporation*, Civil Docket, Civil Action No. 3:12-cv-00661-CRS (as of Dec. 6, 2013).
*SSW Holding Company, Inc.* v. *Schott Gemtron Corporation*, Complaint for Patent Infringement, Demand for Jury Trial, Civil Action No. 3:12-cv-00661-CRS (Oct. 16, 2012).
Materials submitted and considered under MPEP 609 and/or 724 in U.S. Appl. No. 13/082,319 in Artifact Folder 13082319XA.
*In re Inter Partes Review of U.S. Pat. No. 8,286,561*, Final Written Decision, Trial No. IPR2014-00367 (Jun. 11, 2014) (entered May 26, 2015).
Decision on Petition for Writ of Mandamus to the United States Patent and Trademark Office in IPR2013-00358, Case No. 2015-133 (Aug. 11, 2015).

Figure 1
Figure 1 Panel A
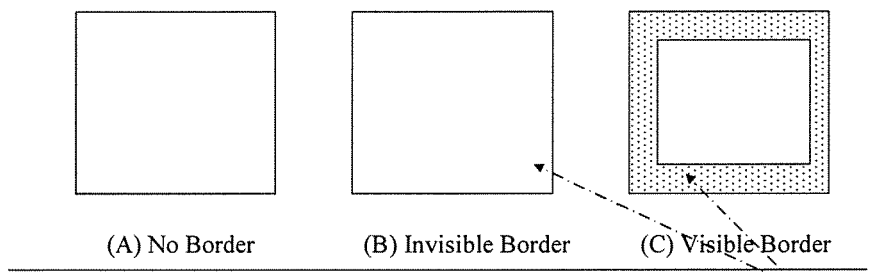
(A) No Border    (B) Invisible Border    (C) Visible Border
borders
Figure 1 Panel B
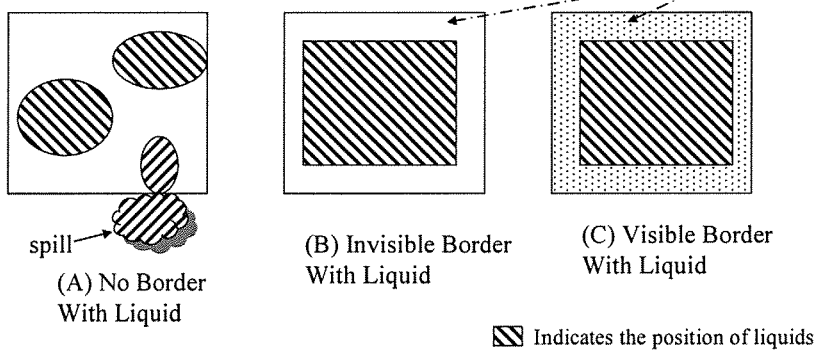
(A) No Border
With Liquid
(B) Invisible Border
With Liquid
(C) Visible Border
With Liquid
spill
▨ Indicates the position of liquids Photographs of the plates shown in Figure 1B with water dyed blue and a close up of the plate with a visible border at a lower angle.

Micrographs of Borders produced by sandblasting with coarse, medium or fine abrasive particles followed by etching the borders with HF Borders that are not visible (clear) can not be photographe

SPILL RESISTANT SURFACES HAVING HYDROPHOBIC AND OLEOPHOBIC BORDERS

CROSS-REFERENCE TO RELATED APPLICATIONS

This application is a divisional of U.S. application Ser. No. 13/082,319, filed Apr. 7, 2011, which is a continuation of PCT/US2009/059909, filed Oct. 7, 2009, which claims the benefit of priority to U.S. Provisional Application No. 61/159,914, filed Mar. 13, 2009, and U.S. Provisional Application No. 61/103,295, filed on Oct. 7, 2008, the contents of each of which are hereby incorporated by reference in their entireties.

BACKGROUND

Most liquids, when properly contained, do not give rise to damage, either to the containers in which they are stored or to physical structure or equipment that may be used to store the liquids or containers of liquids. If spilled, however, the same liquids can cause a variety of problems including contamination, corrosion, and/or damage to equipment or surface that may be used to store the liquids or that come in contact with the spilled liquids. For example, unwanted spills of water and other liquids include spills in refrigerators where unwanted microbial growth can occur (particularly where liquid runs from shelf to shelf requiring excessive cleaning) and spills on hardwood floors causing swelling and/or discoloration due to the joints in the wood becoming wet. Spills on, or in the vicinity of, computers and other electronics can cause damage and/or performance problems in the equipment receiving the spilled liquid or other electronic equipment in the vicinity of the spill. In addition, spills from a drink dispenser in residential or commercial settings, such as restaurants and fast food establishments can lead to hazardous situation including microbial contamination and situations where individuals may slip and become injured. Where spills of foods and beverages are capable of supporting microbial growth, there can be concern over microbial contamination if those spills are not properly cleaned, particularly in areas where the preparation and/or the storage of food occur. Spill may also occur in setting other than those where food is prepared, such as laboratories, lavatories, factory settings and the like.

SUMMARY

Embodiments of this disclosure provide for spill-resistant borders and/or barriers that may be applied to surfaces. Such spill-resistant borders and barriers can prevent water and other liquids from spreading or flowing beyond the position of a border on a planer or substantially planar surface that is placed in a substantially level horizontal position. In embodiments disclosed herein, such borders can prevent the spread of an aqueous liquid until it exceeds a level that is about 4.5 mm higher than the surface. In some instances the liquids can be aqueous solutions, suspensions or emulsions. In other instances, the liquids can be lipids or oils that are prevented from spreading beyond a border until the level of the oil or lipid exceeds, e.g., 2 mm above the surface on which the border is formed. In other instances liquid can be an alcohol (e.g., methanol, ethanol, a propanol, a butanol, or a pentanol) or a liquid comprising an alcohol (e.g., water and alcohol combination including alcoholic beverages such as beer, wine and distilled liquors).

Where the surface, or a portion of the surface, is substantially planar, the spill-resistant border may be placed at or near the edges of the planer surface or near the edge of the portion that is substantially planer, such that the spill-resistant border surrounds a region of the surface that has a lower hydrophobicity or lower oleophobicity than the spill-resistant border. Alternatively, the border may be placed so as to form a boundary encompassing one or more portions of the surface that have a lower hydrophobicity or oleophobicity than the border. Thus, borders may, in some cases, be placed at the edges of (e.g., at or near the edges of the treated surface) or form one or more barriers separating regions of a surface that have lower hydrophobicity than the borders or barriers.

The spill-resistant borders described herein can be made by treating a portion of the surface that will form the border with a variety of compositions that comprise agents that cause water, alcohols, oils and/or other liquids to be retained within the area encompassed by the border. In some instances, the borders are formed by applying a composition to a surface that increases the hydrophobicity or oleophobicity of a portion of the surface that will server as a border (e.g., applying a reagent that converts a portion of the surface into a more hydrophobic or more oleophobic surface by covalently attaching one or more alkyl, fluoroalkyl, or perfluoroalkyl groups to the surface). In such embodiments, the border forms a perimeter around at least one area of the surface that has a lower hydrophobicity or oleophobicity than the border, (i.e., the resulting border is more hydrophobic and/or more oleophobic than the area immediately adjacent to it within its perimeter). Surfaces prepared by such methods are also provided.

Other embodiments provide surfaces comprising a hydrophobic and/or oleophobic spill-resistant border, wherein the border forms a perimeter around at least one area of the surface that has a lower hydrophobicity and/or lower oleophobicity than the border. In another embodiment, the surface may comprise a hydrophobic and/or oleophobic spill-resistant border, wherein said border forms a perimeter around at least two, or at least three, or at least four, areas of the surface that have a lower hydrophobicity and/or lower oleophobicity than the border.

Other embodiments will be apparent to skilled artisans from reading this disclosure, including the figures and appended claims.

BRIEF DESCRIPTION OF THE DRAWINGS

FIG. 1 illustrates multiple embodiments of this disclosure. Shown in FIG. 1 (perspective vertically down) are three glass plates. Panel A depicts the plates in the absence of liquid and Panel B depicts the plates in the presence of liquid. Plate "(A)" is a "control" glass plate without any spill-resistant border; plate "(B)" is a glass plate bearing a spill-resistant border that is not visible (i.e., it is invisible); and plate "(C)" is a glass plate bearing a spill-resistant border that is visible

DETAILED DESCRIPTION

Embodiments disclosed herein provide spill-resistant borders that may be formed on a variety of surfaces and methods of their preparation. An example of a spill-resistant border is depicted in FIG. 1, where the spill-resistance property of the surface is contrasted with an untreated, "control" surface.

Embodiments described herein provide, a spill-resistant border that is a portion of surface forming a perimeter around an area of a surface that has a lower hydrophobicity and/or lower oleophobicity than the border (e.g., the portion of the surface within the perimeter formed by the border is not treated with a composition that modifies the surface to be more hydrophobic and/or oleophobic than the border). In other embodiments, a spill resistant border can be formed on a surface that has a contact angle with water at room temperature that is less than about 10, 15, 20, 30, 40, 50, 60, 70, 80, 90 100, 110, or 120 degrees, and where the border has a contact angle with water at room temperature that is greater than the contact angle of water with the surface on which it is formed by about 7, 8, 9, 10, 20, 30, 40, 50, or 60 degrees measured at room temperature (about 68°-72° F.).

Figure 2:
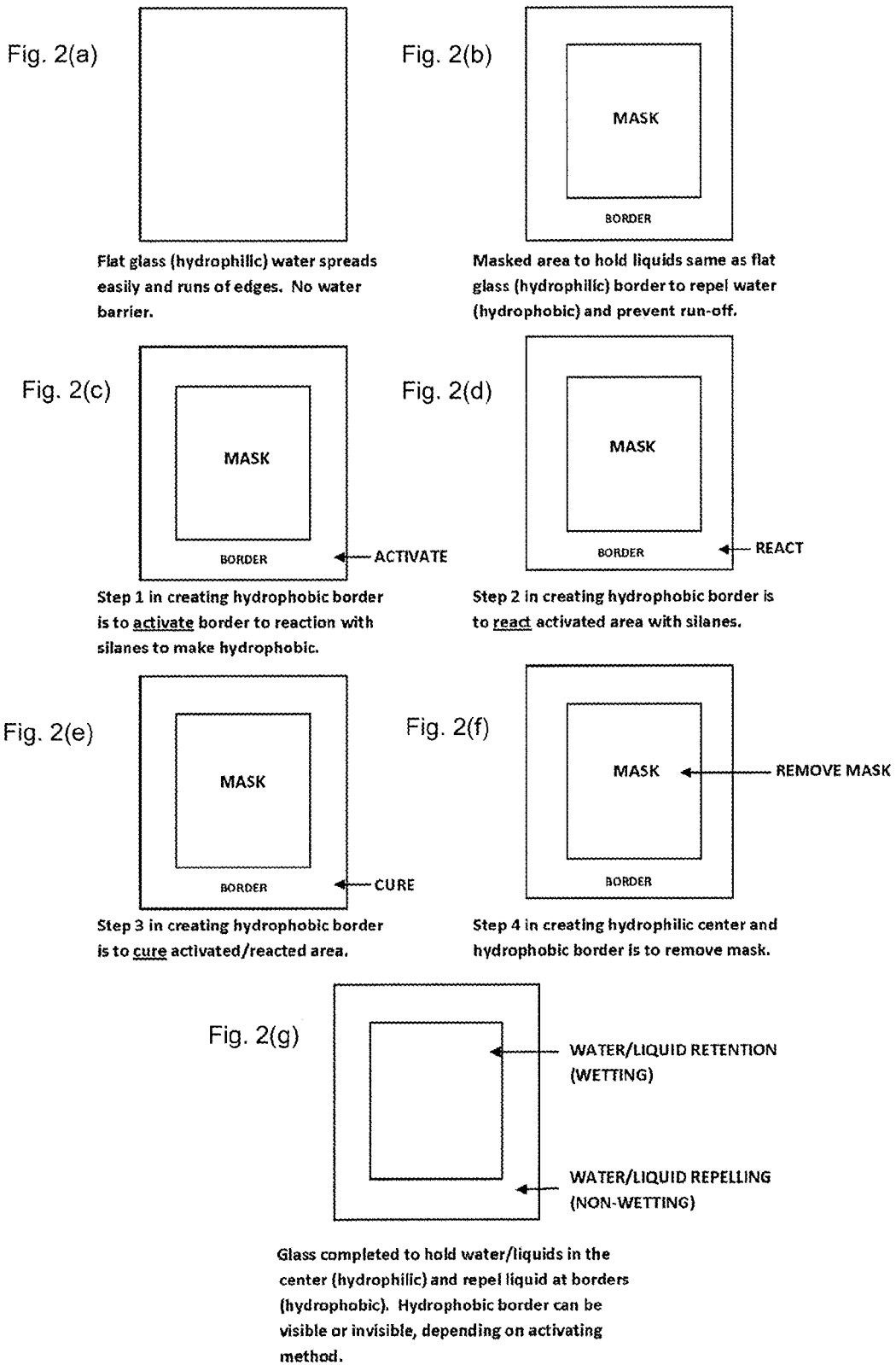
FIGS. 2(a)-2(g) show a schematic illustrating one embodiment of a method comprising transformation steps that may be employed to convert a flat glass sheet into a glass sheet having a spill-resistant border. Panels (b)-(f) show steps that may be employed to convert a flat glass panel shown in (a) into a glass sheet having a spill-resistant border (g).

Steps that may be employed to prepare a spill-resistant border (e.g., at the edge of a substantially planar surface) can, in one embodiment, include masking areas that are not intended to be modified to be hydrophobic/oleophobic, activation of the unmasked areas, reaction with a hydrophobic/oleophobic agent, curing, and unmasking (alternatively, surfaces may be unmasked prior to curing). These steps are outlined in FIG. 2. As will be apparent from the description that follows, the steps outlined in that figure are not limiting to the method, and the method may be modified in numerous ways that will be apparent to the skilled artisan. For example, surfaces need not be masked where other means of controlling the either activation of the surface or reaction of the surface with compositions comprising agents that impart hydrophobicity or oleophobicity to a portion of the surface are employed. In addition, surfaces need not be activated where a border can be formed on the surface in the absence of activation. Moreover, curing may not be necessary for all compositions or agents that impart sufficient hydrophobicity or oleophobicity without curing. Thus, in one embodiment, a method of forming a spill-resistant border may include applying a composition to a surface that increases the hydrophobicity or oleophobicity of the portion of the surface that will server as a border, wherein said border forms a perimeter around at least one area that has a lower hydrophobicity or oleophobicity than the border once it is formed.

The present disclosure provides embodiments of methods for forming a spill-resistant border on a surface that comprise applying a composition to the surface that increases the hydrophobicity or oleophobicity of a portion of the surface that will serve as a border. One embodiment relates to the field of nano structures. Such structures when developed in situ on a surface or introduced through a nano featured powder coating result in a platform for generating selective hydrophobic regions through the monolayer application of fluorosilanes. One silane that may be used is tridecafluoro-1,1,2,2-tetrahydrooctyl trichlorosilane, which functions as a fluorosilane silanizing agent. One approach is called "Polymer Approach." In this case, a polymer is put into solution in a rapidly evaporating liquid such as acetone or MEK. To this solution a known amount of hydrophobic powder is added (see hydrophobic powder description in the section following different approaches). Surfaces prepared by such methods are also provided.

In other embodiments, the present disclosure provides for a surface comprising a hydrophobic or oleophobic spill-resistant border, wherein the border forms a perimeter around at least one area that has a lower hydrophobicity and/or lower oleophobicity than the spill-resistant border.

1.0 Surfaces for Forming Spill-Resistant Borders

Spill-resistant borders can be formed on a variety of surfaces, provided the material that the surface is made from, or a portion thereof, can be made more hydrophobic and/or more oleophobic. In some embodiments the surface can be made from a material selected from glass, metal, metalloid, ceramic, wood, plastic, resin, rubber, stone, concrete or a combination thereof. In other embodiments the surface may be made from a material selected from the group consisting of glass, ceramic and a combination thereof. In other embodiments, the surfaces may be comprised of metalloids (e.g., B, Si, Sb, Te and Ge).

Any glass that can be made hydrophobic or oleophobic on a portion of its surface may be employed as a surface upon which to form a spill-resistant border. Glasses that may be employed as a surface include, without limitation: soda lime glass, borosilicate glass, sodium borosilicate glass, aluminosilicate glass, aluminoborosilicate glass, optical glasses, lead crystal glass, fused silica glass, germania glasses, germanium selenide glasses, and combinations thereof.

Any metal that can be made more hydrophobic and/or more oleophobic on a portion of its surface may be employed as a surface upon which to form a spill-resistant border. Such metals include without limitation: iron, nickel, chrome, copper, tin, zinc, lead, magnesium, manganese, aluminum, titanium silver, gold, and platinum or combinations thereof, or alloys comprising those metals. In one embodiment the metal is forming the surface comprises steel or stainless steel. In another embodiment the metal used for the surface is chromium, is plated with chromium, or comprises chromium or a chromium containing coating.

Any ceramic that can be made more hydrophobic and/or more oleophobic on a portion of its surface may be employed as a surface upon which to form a spill-resistant border. Such ceramics include, without limitation: earthenware (typically quartz and feldspar), porcelain (e.g., made from kaolin), bone china, alumina, zirconia, and terracotta. For the purpose of this disclosure a glazing on a ceramic may be considered either as a ceramic or a glass.

Any wood that can be made more hydrophobic and/or more oleophobic on a portion of its surface may be employed as a surface upon which to form a spill-resistant border. Such woods include without limitation hard and soft woods. In some embodiments, woods may be selected from alder, poplar, oak, maple, cherry, apple, walnut, holly, boxwood, mahogany, ebony teak, luan, and elm. In other embodiments woods may be selected from ash, birch, pine, spruce, fir, cedar, and yew. In still other embodiments the a wood surface may be a composite such as woods products formed from bamboo, chipped woods, or saw dust and the like.

Any plastic or resin that can be made more hydrophobic and/or more oleophobic on a portion of its surface may be employed as a surface upon which to form a spill-resistant border. Such plastics/resins include, without limitation, polyolefins (such as a polypropylene and polyethylene), a polyvinylchloride plastics, a polyamides, a polyimides, a polyamideimides, a polyesters, aromatic polyesters, polycarbonates, polystyrenes, polysulfides, polysulfones, polyethersulfones, polyphenylenesulfides, a phenolic resins, polyurethanes, epoxy resins, a silicon resins, acrylonitrile butadiene styrene resins/plastics, methacrylic resins/plastics, acrylate resins, polyacetals, polyphenylene oxides, polymethylpentenes, melamines, alkyd resins, polyesters or unsaturated polyesters, polybutylene terephthlates, combinations thereof, and the like.

Any rubber that can be made more hydrophobic and/or more oleophobic on a portion of its surface may be employed as a surface upon which to form a spill-resistant barrier. Such rubbers include, without limitation, styrene-butadiene rubber, butyl rubber, nitrile rubber, chloroprene rubber, polyurethane rubber, silicon rubber and the like.

Any type of stone, concrete, or combination thereof, that can be made more hydrophobic or more oleophobic on a portion of its surface, may be employed as a surface upon which to form a spill-resistant border. In some embodiments, the stone that may be employed as a surface, or a component of a surface, is selected from igneous, sedimentary and metamorphic stone (rock). In one embodiment the stone is selected from granite, marble, limestone, hydroxylapatite, quartz, quartzite, obsidian and combinations thereof. Stone may also be used in the form of a conglomerate with other components such as concrete and/or epoxy to form an aggregate that may be used as a surface upon which a spill-resistant border may be formed (e.g., terrazzo).

2.0 Spill-Resistant Borders

The spill-resistant borders described herein can be formed by causing a portion of a surface to become more hydrophobic and/or more oleophobic by treatment with composition comprising agents that impart those properties to the surface. The hydrophobic/oleophobic properties of the surface will be affected by both the nature of the surface and the type of agent that is applied to the surface to form the border.

A spill-resistant border may be placed on a surface so that the border forms a perimeter around one or more areas that have a lower hydrophobicity and/or lower oleophobicity than the border, thereby providing an area within the border that can retain liquids. In other embodiments, a spill resistant border can be formed on a surface that has a contact angle with water at room temperature that is less than about 10, 15, 20, 30, 40, 50, 60, 70, 80, 90 100, 110, or 120 degrees, and where the surface can be modified to form a border that has a contact angle with water at room temperature that is greater than the contact angle of water with the surface on which it is formed by about 7, 8, 9, 10, 20, 30, 40, 50, or 60 degrees measured at room temperature (about 70-72° F.).

In some embodiments a border may be placed at the edge of a surface, in which case it may be referred to as an "edge." In other embodiments a border may be placed near an edge of a surface, such as in the form of a strip parallel or substantially parallel to one or more edges of a surface. In some embodiments a border may be placed on a surface at a position that is not the edge such that the border forms a perimeter around one or more areas that are have a lower hydrophobicity and/or lower oleophobicity than the border.

Where a border is not placed at the edge it may be termed a "barrier." Barriers may divide a surface into several regions that have a lower hydrophobicity and/or lower oleophobicity than the border. Each area having a barrier as a perimeter will separately prevent the spreading of liquid between different areas of the surface. The regions separated by barriers may be in variety of forms. For example, the regions may be in the form of a series of concentric circles or a series of regular quadrilaterals (e.g., squares or rectangles, hexagons, or triangles). In some embodiments a border in the form of an edge, or a border located at or near the edge of the surface, may be employed with borders in the form of barriers. In such an embodiment the surface will not only prevent the spread of liquids between regions separated by barriers, but also prevent or stop liquids from flowing off the surface by blocking passage of the liquid over the border at the edge. Some examples of spill-resistant borders, including those with edges and barriers, and combinations thereof may be seen in FIG. 3.

Spill-resistant borders (including borders in the form of edges and barriers), regardless of the pattern in which they are formed, are substantially 2-dimensional structures. The width of the hydrophobic/oleophobic regions of a surface forming spill-resistant borders can vary depending on the specific application in which the borders are intended to be used. In some embodiments, the borders may be from about 0.2 to about 2 inches in width, or alternatively, about 0.2, 0.25, 0.3, 0.4. 0.5, 0.6, 0.7, 0.8, 0.9, 1.0, 1.1, 1.2, 1.25, 1.3 1.4, 1.5, 1.75 or 2.0 inches (about 5 mm to 50 mm) in width. In one embodiment, where the borders are intended for use on food preparation or storage surfaces, (e.g., cutting boards, glass shelving for refrigerators, or countertops) the borders in the range of 0.2 to 2.0 inches. In other embodiments, such as where the spill-resistant borders are intended for use on food preparation or storage surfaces, the borders can be about 0.4 to 1 inch wide, or alternatively, about, 0.4, 0.5, 0.6 0.7 0.75, 0.8, 0.9, or 1.0 inches wide. Border width does not have to be uniform, and where borders on a surface comprise an edge and barriers, the edge and barriers may be of different widths or even varying widths on the same surface.

Where a combination of a border, such as a border in the form of an edge, and a barrier are used, the hydrophobicity of the barrier and edge may be controlled such that liquids will be prevented from spreading between different areas of the surface, but the highest resistance to liquid spreading (the highest height of liquid retained) will be at the edge. Thus, in the case of a spill that overflows an area surrounded by a barrier, the spill would flow to an adjacent area, rather than over the edge.

Figure 3:
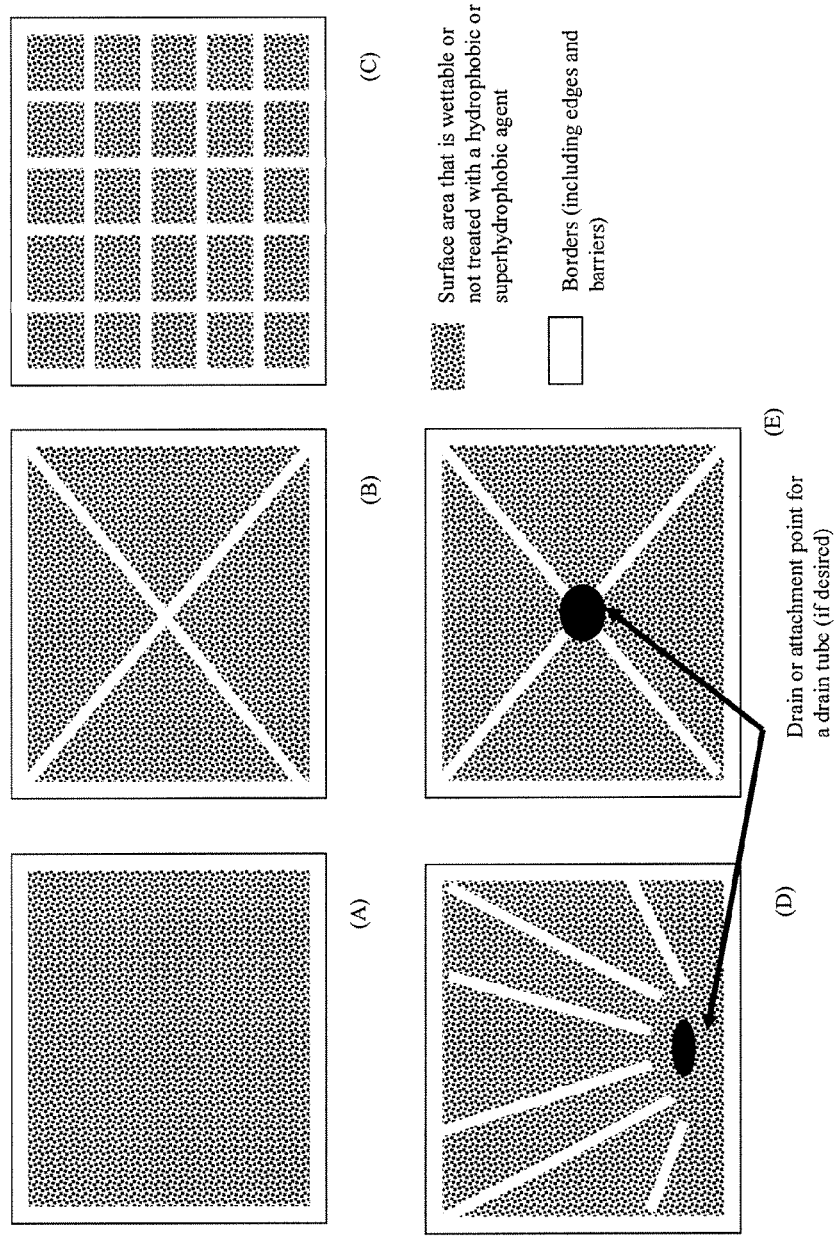
FIG. 3 depicts five different surfaces denoted (A) through (E) with regions (stippled) that have a lower hydrophobicity and/or lower oleophobicity than the spill-resistant border and spill-resistant borders as unmarked (white) regions. In (A), a surface with a spill resistant border in the form of an edge (at its edge) is depicted. (B) shows a surface with a spill resistant border in the form of a spill-resistant edge along with two diagonal spill resistant barriers. The diagonal barriers may retain liquids at the same height as the spill-resistant edge or optionally may have a lesser ability to retain liquids than the border at the edge (i.e., the barrier lines optionally may retain liquids to lower heights than the border at the edge). (C) shows a surface with a spill resistant border in the form of a spill-resistant edge along with a series of spill resistant barriers in the form of a grid, where the barrier lines optionally may have a lesser ability to retain liquids than the edge. (D) depicts a surface with a spill resistant border in the form of a spill-resistant edge along with a series of partial spill resistant barriers, that optionally may have a lesser ability to retain liquids and which may be used to channel liquids toward a drain (or drains), or a site where one or more drain tube(s) are connected (black oval). The barrier lines in such an embodiment may extend to the drain. (E) shows a surface with a spill resistant border in the form of a spill-resistant edge along with two diagonal spill resistant barriers that terminate at a drain (black oval). The diagonal barriers lines optionally may have a lesser ability to retain liquids than the edge and can be used to channel or direct liquids to the drain. Where drains are attached to a surface, the surface may be formed inclined or depressed so that the opening of the drain is lower than the edge of the surface so that liquids will be channeled to the drain.

Spill-resistant borders and barriers may be used to direct liquid toward one or more drains in a surface and can be arranged to channel spilled liquids toward a drain (see e.g., FIG. 3 panels D and E). Borders in the forms of edges and/or barriers may be also combined with drains in a surface so as to direct liquids to a drain or collection site/container. Drains may be in the form of an opening, depression or trough (e.g., slot, hole, or groove) in the surface bearing the border. Openings, depressions, or troughs may be connected to tubing or pipes that will permit liquid to be collected or channeled to a desired location (e.g., a collection container or sewer waste line). Barrier lines that form incomplete perimeters around areas of a surface may also be used to channel liquids towards a drain (see FIG. 3, Panel D); particularly where the barrier lines form a complete perimeter except at the point where they end at or near a drain (see FIG. 3, Panel E). In one embodiment, one or more drains may be placed at the edge of surface so that the border forms a continuous perimeter around an area of the surface up to the point where the drain is located, with the drain completing the perimeter formed by the border.

For the purpose of this disclosure a border that is not visible is a border that cannot be readily seen with the unaided human on a clean dry surface using transmitted or reflected light in the spectrum visible to the human eye. Borders that are not visible may be prepared by treating a surface with an agent that makes the region forming the border hydrophobic or oleophobic. If the surface needs to be activated for the application of an agent that makes the surface hydrophobic and/or oleophobic, that may be accomplished by chemical etching with agents such as HF for brief periods or polishing of the surface with very fine powders such as cerium oxide powder or diamond powders.

For the purpose of this disclosure a border that is visible can be seen with the unaided human eye on a clean dry surface using transmitted or reflected light in the spectrum visible to the human eye. A border can be visible but clear, in which case it may, for example, be clear but colored. A border may also be visible due to surface treatments, such as etching or abrading (e.g., sand blasting or grinding).

A fine visible spill-resistant border, also referred to as a "fine border", is a visible border one having fine features on the order of 30 to 80 microns, or 40 to 70 microns, or 50 to 60 microns, or about 30, about 40, about 50 or about 60 microns. Fine borders can be prepared, for example, by sand blasting with materials in the range of about 200 to about 450 mesh, or 225 to 350 mesh, or 250 to 325 mesh, or materials about 200, 250, 300, 350, 400, or 450 mesh (generally metal oxides or carbide powders).

A coarse visible spill-resistant border, also referred to as a "coarse border", is one having features on the order of about 150 to about 250 microns, or 175 to about 225 microns, or about 200 microns. Coarse visible borders can be prepared, for example, by sand blasting with materials in the range of about 20 to 60 mesh, or 30 to 50 mesh, or 40 to 60 mesh, or materials about 20, 25, 30, 35, 40, 45, 50, 55, or 60 mesh.

A medium visible spill-resistant border, also referred to as a "medium border", is a visible border one having features on the order of about 80 to about 150 microns, or about 85 to about 140 microns, or about 90 to about 120 microns, or about 80, 90, 100, 110, 120, 130, 140 or 150 microns. Medium borders can be prepared, for example, by sand blasting with a mixture of coarse and fine meshed materials (e.g., approximately equal amounts by weight, or in the range of a mixture from 1:4 to 4:1 of coarse: fine materials by weight). Alternatively, medium borders can be prepared by blasting with materials from about 80 to about 150 mesh, or 90 to 145 mesh, 100 to 140 mesh, or about 80, 90, 100, 110, 120, 130, 140, or 150 mesh.

Data for fine, medium, and coarse spill-resistant boarders produced by sand blasting glass surfaces appears in Example 17. Fine medium and coarse borders may also be prepared by etching the surface of glass, ceramics or plastics with chemical etching/activation agents.

2.1 Forming Hydrophobic and Oleophobic Borders on Regions of a Surface

Borders, whether they are visible or not visible, must be more hydrophobic and/or more oleophobic than the regions they surround. Modification of the properties of a surface, or a portion thereof that serves as a boarder, to impart the desired hydrophobic and/or oleophobic nature can be accomplished by chemical modification. Such modifications can be accomplished by applying to a surface a composition comprising an agent that increases the hydrophobicity and/or oleophobicity of the surface upon which it is applied. The result of such chemical modification is covalent binding of one or more hydrophobic and/or oleophobic functionalities to the portion of the surface (i.e. modification of the surface) where the border is to be located.

For the purposes of this disclosure a hydrophobic border or surface is one that results in a water droplet forming a surface contact angle exceeding about 45° and less than about 150° at room temperature. Similarly, for the purposes this disclosure a superhydrophobic border or surface is one that results in a water droplet forming a surface contact angle exceeding about 150° but less than the theoretical maximum contact angle of about 180° at room temperature. Some authors further categorize hydrophobic behavior and employ the term "ultrahydrophobic." Since for the purposes of this disclosure, a superhydrophobic surface has contact angles of about 150° to about 180°, superhydrophobic behavior is considered to include ultrahydrophobic behavior. Throughout this disclosure where a surface (e.g., a border region of a surface) is recited as being hydrophobic and no specific contact angles are recited, a superhydrophobic surface may also be employed. For the purpose of this disclosure hydrophobic shall include superhydrophobic unless stated otherwise.

For the purposes of this disclosure an oleophobic material or surface is one that results in a droplet of light mineral oil forming a surface contact angle exceeding about 25° and less than the theoretical maximum contact angle of about 180° at room temperature.

A variety of methods to increase the hydrophobicity and/or oleophobicity of a surface can be employed. Such methods including the used of one or more agents, or compositions comprising such agents, that will chemically bind alkyl, fluoroalkyl, or perfluoroalkyl groups to the surface. Such agents include the use of alkyl, fluroalkyl, or perfluoroalkyl silanizing agents. Other agents that can be used to form hydrophobic or oleophobic borders will depend on the functionalities available for forming chemical (covalent) linkages to the surfaces. For example where surfaces have, or can be modified to have hydroxyl or amino groups, acid anhydrides and acid chlorides of alkyl, fluoroalkyl, or perfluoroalkyl compounds (e.g., the acid chlorides: Cl—C(O)(CH$_2$)$_{4-18}$CH$_3$; Cl—C(O)(CH$_2$)$_{4-10}$(CF$_2$)$_{2-14}$CF$_3$; Cl—C(O)(CF$_2$)$_{4-18}$CF$_3$ or the anhydrides of those acids) can be employed.

2.2 the Use of Silanizing Agents to Apply a Spill-Sesistant Border to a Surface

A variety of silanizing agents can be employed to convert a portion of the surface into a spill resistant border. Silanizing agents have both leaving groups and terminal functionalities. Terminal functionalities are groups that are not displaced by reaction with silicate containing glasses (e.g., R groups of compounds of the formula (I)). Leaving groups are those groups that are displaced from silanizing agents upon reaction with silicate containing glasses to form bonds with the glass surface. Such silanizing agents include, but are not limited to, compounds of the formula (I):

$$R_{4-n}Si—X_n \qquad (I)$$

where
n is an integer from 1-3;
each R is independently selected from
  (i) alkyl or cycloalkyl group optionally substituted one or more fluorine atoms,
  (ii) $C_{1\,to\,20}$ alkyl optionally substituted with one or more independently selected substituents selected from fluorine atoms and $C_{6-14}$ aryl groups, which aryl groups are optionally substituted with one or more independently selected halo, $C_{1\,to\,10}$ alkyl, $C_{1\,to\,10}$ haloalkyl, $C_{1\,to\,10}$ alkoxy, or $C_{1\,to\,10}$ haloalkoxy substituents,
  (iii) $C_{6\,to\,20}$ alkyl ether optionally substituted with one or more substituents independently selected from fluorine and $C_{6-14}$ aryl groups, which aryl groups are optionally substituted with one or more independently selected halo, $C_{1\,to\,10}$ alkyl, $C_{1\,to\,10}$ haloalkyl, $C_{1\,to\,10}$ alkoxy, or $C_{1\,to\,10}$ haloalkoxy substituents,
  (iv) $C_{6-14}$ aryl, optionally substituted with one or more substituents independently (iv) $C_{6-14}$ selected from halo or alkoxy, and haloalkoxy substituents;
  (v) $C_{6\,to\,20}$ alkenyl or $C_{6\,to\,20}$ alkynyl, optionally substituted with one or more substituents independently selected from halo, alkoxy, or haloalkoxy; and
  (vi) —Z—((CF$_2$)$_q$(CF$_3$))$_r$, wherein Z is a $C_{1-12}$ divalent alkane radical or a $C_{2-12}$ divalent alkene or alkyne radical, and q is an integer from 1 to 12, and r is an integer from 1-4;
each X is independently selected from —H, —Cl, —I, —Br, —OH, —OR$^2$, —NHR$^3$, or —N(R$^3$)$_2$;
each R$^2$ is independently selected $C_{1\,to\,4}$ alkyl or haloalkyl group; and
each R$^3$ is independently an independently selected H, $C_{1\,to\,4}$ alkyl or haloalkyl group.

In one embodiment, R is an alkyl or fluoroalkyl group having from 6 to 20 carbon atoms.

In another embodiment, R is an alkyl or fluoroalkyl group having from 8 to 20 carbon atoms.

In another embodiment, R is an alkyl or fluoroalkyl group having from 10 to 20 carbon atoms.

In another embodiment, R is an alkyl or fluoroalkyl group having from 6 to 20 carbon atoms and n is 3

In another embodiment, R is an alkyl or fluoroalkyl group having from 8 to 20 carbon atoms and n is 3

In another embodiment, R is an alkyl or fluoroalkyl group having from 10 to 20 carbon atoms and n is 3.

In another embodiment, R has the form —Z—((CF$_2$)$_q$(CF$_3$))$_r$, wherein Z is a $C_{1-12}$ divalent alkane radical or a $C_{2-12}$ divalent alkene or alkyne radical, and q is an integer from 1 to 12, and r is an integer from 1-4.

In any of the previously mentioned embodiments of compounds of formula (I) the value of n may be varied such 1, 2 or 3 terminal functionalities are present in compounds of formula (I). In one embodiment, n is 3. In another embodiment, n is 2, and in still another embodiment n is 1.

In any of the previously mentioned embodiments of compounds of formula (I), the all halogen atoms present in any one or more R groups are fluorine atoms in some embodiments.

In any of the previously mentioned embodiments of compounds of formula (I), X is independently selected from H, Cl, —OR$^2$, —NHR$^3$, —N(R$^3$)$_2$, or combinations thereof in some embodiments. In another, embodiment, X may be selected from Cl, —OR$^2$, —NHR$^3$, —N(R$^3$)$_2$, or combinations thereof. In still another embodiment, X may be selected from, Cl, —NHR$^3$, —N(R$^3$)$_2$ or combinations thereof.

Any border described herein may be formed from one, two, three, four or more compounds of formula (I) employed alone or in combination to convert a surface into a hydrophobic or oleophobic surface.

Alkyl as used herein denotes a linear or branched alkyl radical. Alkyl groups may be independently selected from $C_1$ to $C_{20}$ alkyl, $C_2$ to $C_{20}$ alkyl, $C_4$ to $C_{20}$ alkyl, $C_6$ to $C_{18}$ alkyl, $C_6$ to $C_{16}$ alkyl, or $C_6$ to $C_{20}$ alkyl. Unless otherwise indicated, alkyl does not include cycloalkyl. Cycloalkyl groups may be independently selected from: $C_1$ to $C_{20}$ alkyl comprising one or two $C_4$ to $C_8$ cycloalkyl functionalities; $C_2$ to $C_{20}$ alkyl comprising one or two $C_4$ to $C_8$ cycloalkyl functionalities; $C_6$ to $_{20}$ alkyl comprising one or two $C_4$ to $C_8$ cycloalkyl functionalities; $C_6$ to $C_{18}$ alkyl comprising one or two $C_4$ to $C_8$ cycloalkyl functionalities; $C_6$ to $C_{16}$ alkyl comprising one or two $C_4$ to $C_8$ cycloalkyl functionalities. One or more hydrogen atoms of the alkyl groups found in compounds of formula (I) may be replaced by fluorine atoms.

Haloalkyl as used herein denotes an alkyl group in which some or all of the hydrogen atoms present in an alkyl group have been replaced by halogen atoms. Halogen atoms may be limited to chlorine or fluorine atoms in haloalkyl groups.

Fluoroalkyl as used herein denotes an alkyl group in which some or all of the hydrogen atoms present in an alkyl group have been replaced by fluorine atoms.

Perfluoroalkyl as used herein denotes an alkyl group in which fluorine atoms have been substituted for each hydrogen atom present in the alkyl group.

In another embodiment, specific compounds that can be employed to prepare spill-resistant borders include compounds that are commercially available (e.g., from Gelest, Inc., Morrisville, Pa.) including, but not limited to, those compounds found in the tables of the Examples that accompany this disclosure such as the compounds in Tables 1 to 9. Some compounds that may be employed to prepare spill-resistant borders include those that follow, which are identified by their chemical name followed by the commercial supplier reference number (e.g., their Gelest reference in parentheses): tridecafluoro-1,1,2,2-tetrahydrooctyl)silane (SIT8173.0); (tridecafluoro-1,1,2,2-tetrahydrooctyl) trichlorosilane (SIT8174.0); (tridecafluoro-1,1,2,2-tetrahydrooctyl)triethoxysilane (SIT8175.0); (tridecafluoro-1,1,2,2-tetrahydrooctyl)trimethoxysilane (SIT8176.0); (heptadecafluoro-1,1,2,2-tetrahydrodecyl)dimethyl(dimethylamino)silane (SIH5840.5); (heptadecafluoro-1,1,2,2- tetrahydrodecyl)tris(dimethylamino)silane (SIH5841.7); n-octadecyltrimethoxysilane (SIO6645.0); n-octyltriethoxysilane (SIO6715.0); and nonafluorohexyldimethyl(dimethylamino)silane (SIN6597.4).

Two attributes of silanizing agents that may be considered when forming a spill-resistant border are the leaving group (e.g., X groups of compounds of the formula (I)) and the terminal functionality (e.g., R groups of compounds of the formula (I)). Silanizing agent leaving groups determine the reactivity of the agent with a substrate. Where, the substrate is a silicate glass or stone, the leaving group can be displaced to form the Si—O—Si bonds (see Schemes I-VII). The terminal functionality determines the level of hydrophobicity that results from application of the silane to the surface.

In addition to assessing the hydrophobicity of a border formed on a surface as a means of assessing its effectiveness for the preparation of spill-resistant borders, a measurement of the height of water retained by the border can be employed. In some embodiments the height of water retained by the borders described herein will be at least 2, 3 4 or 5 mm above the surface on which the border is formed (measured at room temperature). Within such embodiments, the height of water retained by the borders described herein will be from 2-3.5, or from 2.5 to 4, or from 3 to 5, or from 3.25 to 5.25 mm above the surface on which the border is formed (measured at room temperature).

In order to test the effectiveness of leaving group and terminal functionalities of silanizing agents, nine different agents are used to prepare spill-resistant borders on glass plates (see Example 14). The contact angles of water with surfaces treated with the agents are summarized in Table 14. Data for silanizing agents SIT8173, SIT8174, SIT8175, and SIT8176, which have different leaving groups but the same terminal functional groups, should depend only depend on the effectiveness of the leaving group. Among those four silanizing agents, the leaving group effectiveness is ranked in the decreasing order as chloro>methoxy>hydro (H)>ethoxy (measured as trichloro>trimethoxy>trihydro>triethoxy). This ranking of the leaving groups is consistent with their bond dissociation energy.

Bond Dissociation Energies for Various Leaving Groups[a]

| Bond | Dissociation Energy Kcal/mole |
| --- | --- |
| $Me_3Si$—$NMe_2$ (dimethyamine) | 98 |
| $Me_3Si$—$N(SiMe_3)_2$ tris(dimethylamino) | 109 |
| $Me_3Si$—Cl (chloro) | 117 |
| $Me_3Si$—OMe (methoxy) | 123 |
| $Me_3Si$—OEt (ethoxy) | 122 |

[a]Data from Gelest, Inc.

Silanes SIH5840.5 and SIH5841.7 contain the (heptadecafluoro-1,1,2,2-tetrahydrodecyl) functional group, however, water-height data suggests the tris(dimethylamino) leaving group, has a lower bond dissociation energy than the dimethylamino leaving group. This is also consistent with the bond dissociation energies given above.

2.3 Effect of Terminal Groups on Liquid Retention by Spill-Resistant Borders

The choice of hydrophobic or oleophobic agents, particularly the terminal groups of silane reagents, influences a border's ability to retain various liquids. Alkyl functionalities, and particularly alky terminal functional functionalities of silanizing agents, while suitable for use in the preparation of borders, generally are not as effective as their fluorinated or perfluorinated counterparts at retaining aqueous liquids based on the height of water the borders can retain. Compare the data in Examples 5-7 with Examples 8 and 9.

In addition to the ability to retain aqueous based solutions, suspension, and emulsions, embodiments of the borders disclosed herein tend to have oleophobic behavior, permitting them to retain oils. This is particularly true where the borders have been prepared with silanizing agents having fluorinated or perfluorinated alkyl groups (e.g., where the terminal functionality of a silane of the formula $R_{4-n}Si$—$X_n$ is a fluorinated alkyl or perfluoroalkyl). See, for example, the contact angle data in Example 14 and Table 14, for mineral oil and borders comprising fluorinated alkanes. The height of mineral oil that can be retained by boarders comprising fluorinated alkyl groups is exemplified in Example 15, in which data for two fluoroalkyl silanizing agent treatments and mineral oil is presented.

2.4 Use of Compounds Other than Silanizing Agents to Form Spill-Resistant Borders Other agents that can be used to form hydrophobic or oleophobic borders will depend on the functionalities available for forming chemical (covalent) linkages between hydrophobic/oleophobic component and the surfaces. For example where surfaces have, or can be modified to have, hydroxyl or amino groups then acid anhydrides and acid chlorides of alkyl, fluoroalkyl, and perfluoroalkyl compounds may be employed (e.g., the acid chlorides: Cl—C(O)$(CH_2)_{4-18}CH_3$; Cl—C(O)$(CH_2)_{4-10}(CF_2)_{2-14}CF_3$; Cl—C(O)$(CF_2)_{4-18}CF_3$ or the anhydrides of those acids) can be employed.

3.0 Surface Activation

Surfaces may benefit from, or even require, activation to effectively react with agents that will increase the hydrophobicity and/or oleophobicity of the surface. Where surfaces do not comprise a suitable type or suitable number of functionalities for reaction with compositions comprising agents that will increase the hydrophobicity and/or oleophobicity of the surfaces, they may be activated to change the surface properties Where a surface does not contain a suitable type of functional group, or sufficient numbers of those functional groups, to permit effective increases in hydrophobicity an/or oleophobicity, the surface can be reacted with reagents that will modify the surface so as to introduce a sufficient numbers of suitable functionalities. Alternatively, where desired functional groups on a surface are blocked or otherwise unavailable, the surface may be activated by various physical or chemical treatments.

3.1 Activation of Glass and Ceramic Surfaces

In one embodiment, where a surface is a silicate containing glass or ceramic having less than a desirable number of functional groups for reaction with silanizing agents (e.g., alkylsilyl chlorides or perfluoroalkylsilyl chlorides, or more generally compounds of formula (I), that can covalently bind hydrophobic and/or oleophobic functionalities to the surface), the surface can be activated by chemical or physical means. Activation of $SiO_2$ containing glasses (silicate glasses or silicate containing glasses) is considered to require exposure of $SiO_2$ (e.g., Si—OH groups) on the glass surface. Some glass compositions that contain $SiO_2$, along with glasses that do not, are recited in the table that follows. A skilled artisan will appreciate that ceramics and glasses that do not comprise $SiO_2$ may be activated for reaction with agents that result in converting the portion of a surface that is to serve as a border into a hydrophobic or oleophobic surface using the methods described for silicate glasses or similar methods.

| Properties | Soda-lime glass (for containers) | Borosilicate (low expansion, similar to Pyrex, Duran) | Glass Wool (for thermal insulation) | Special optical glass (similar to Lead crystal) | Fused silica | Germania glass | Germanium selenide glass |
|---|---|---|---|---|---|---|---|
| Chemical composition, wt % | 74 $SiO_2$, 13 $Na_2O$, 10.5 CaO, 1.3 $Al_2O_3$, 0.3 $K_2O$, 0.2 $SO_3$, 0.2 MgO, 0.01 $TiO_2$, 0.04 $Fe_2O_3$ | 81 $SiO_2$, 12.5 $B_2O_3$, 4 $Na_2O$, 2.2 $Al_2O_3$, 0.02 CaO, 0.06 $K_2O$ | 63 $SiO_2$, 16 $Na_2O$, 8 CaO, 3.3 $B_2O_3$, 5 $Al_2O_3$, 3.5 MgO, 0.8 $K_2O$, 0.3 $Fe_2O_3$, 0.2 $SO_3$ | 41.2 $SiO_2$, 34.1 PbO, 12.4 BaO, 6.3 ZnO, 3.0 $K_2O$, 2.5 CaO, 0.35 $Sb_2O_3$, 0.2 $As_2O_3$ | $SiO_2$ | $GeO_2$ | $GeSe_2$ |
| Viscosity log($\eta$, Pa·s) = A + B/(T in °C. − $T_o$) | 550-1450° C.: A = −2.309 B = 3922 $T_o$ = 291 | 550-1450° C.: A = −2.834 B = 6668 $T_o$ = 108 | 550-1400° C.: A = −2.323 B = 3232 $T_o$ = 318 | 500-690° C.: A = −35.59 B = 60930 $T_o$ = −741 | 11140-2320° C.: A = −7.766 B = 27913 $T_o$ = −271.7 | 515-1540° C.: A = −11.044 B = 30979 $T_o$ = −837 | |
| Glass transition temperature, $T_g$, °C. | 573 | 536 | 551 | ~540 | 1140 | 526 ± 27[27][28][29] | 395 [30] |
| Coefficient of thermal expansion, ppm/K, ~100-300° C. | 9 | 3.5 | 10 | 7 | 0.55 | 7.3 | |
| Density at 20° C., [g/$cm^3$], ×1000 to get [kg/$m^3$] | 2.52 | 2.235 | 2.550 | 3.86 | 2.203 | 3.65 [31] | 4.16 [30] |
| Refractive index $n_D$] at 20° C. | 1.518 | 1.473 | 1.531 | 1.650 | 1.459 | 1.608 | 1.7 |
| Dispersion at 20° C., $10^4 \times (n_F - n_C)$ | 86.7 | 72.3 | 89.5 | 169 | 67.8 | 146 | |
| Young's modulus at 20° C., GPa | 72 | 65 | 75 | 67 | 72 | 43.3 [33] | |
| Shear modulus at 20° C., GPa | 29.8 | 28.2 | | 26.8 | 31.3 | | |
| Liquidus temperature, ° C. | 1040 | 1070[34] | | | 1715 | 1115 | |
| Heat capacity at 20° C., J/(mol·K) | 49 | 50 | 50 | 51 | 44 | 52 | |
| Surface tension, at ~1300° C., mJ/$m^2$ | 315 | 370 | 290 | | | | |

Some of the potential interactions of silicate containing substrates (e.g., many glasses) with compounds of formula (I) having hydrogen, halogens (illustrated by chlorine), —O-alkyl, or —N(alkyl)$_2$ substituents as leaving groups are illustrated in Schemes I-VII.

Scheme I

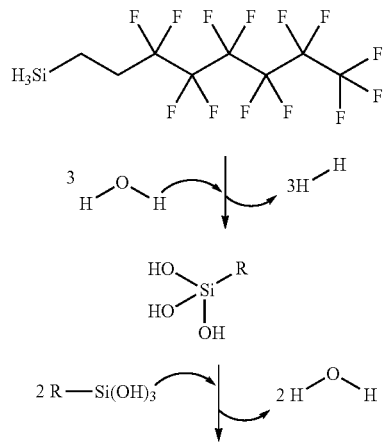

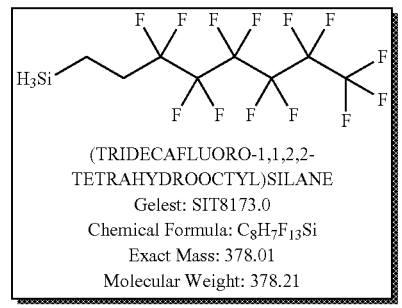

(TRIDECAFLUORO-1,1,2,2-TETRAHYDROOCTYL)SILANE
Gelest: SIT8173.0
Chemical Formula: $C_8H_7F_{13}Si$
Exact Mass: 378.01
Molecular Weight: 378.21

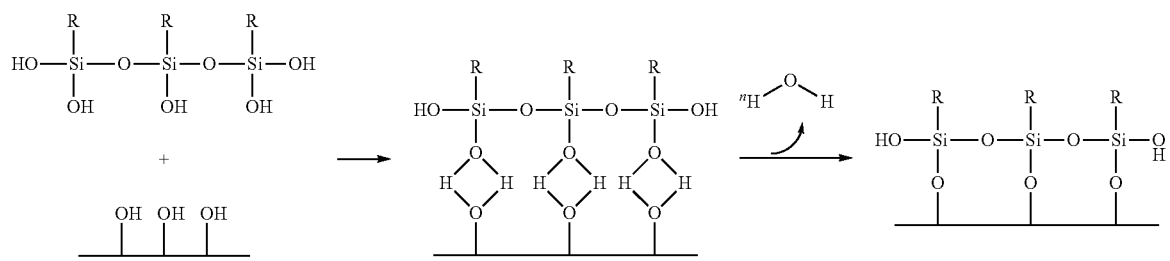

Reaction Mechanism: Hydrolytic deposition of silane. The reaction of water with the corresponding silane results in the loss of three equivalents $H_2$ gas producing a triol-silane, followed by polymerization and reactivity with the substate producing hydrogen bonding that results in net silica-oxygen bond formation.

Scheme II

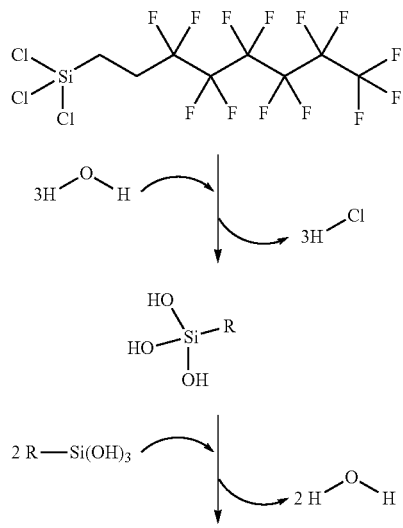

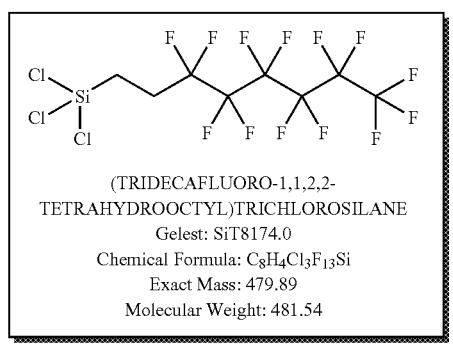

(TRIDECAFLUORO-1,1,2,2-TETRAHYDROOCTYL)TRICHLOROSILANE
Gelest: SiT8174.0
Chemical Formula: $C_8H_4Cl_3F_{13}Si$
Exact Mass: 479.89
Molecular Weight: 481.54

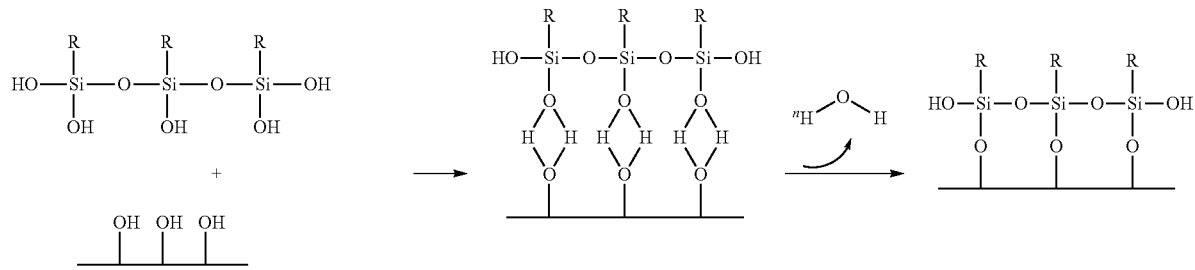

Reaction Mechanism: Hydrolytic deposition of silane. The reaction of water with the corresponding trichloro-silane results in the loss of three equivalents of hydrogen chloride producing a triol-silane, followed by polymerization and reactivity with the substate producing hydrogen bonding that results in net silica-oxygen bond formation.

Scheme III

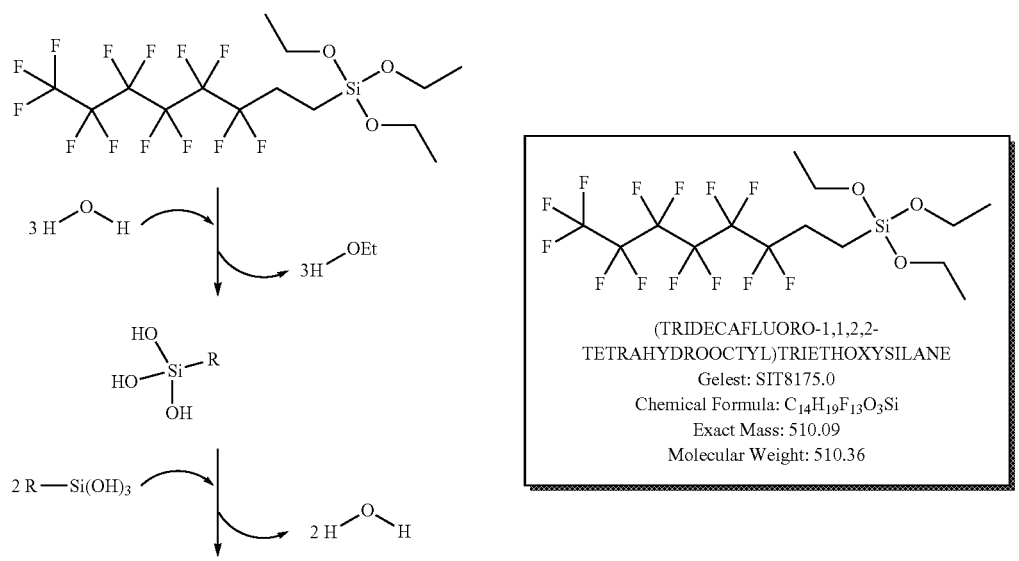

(TRIDECAFLUORO-1,1,2,2-TETRAHYDROOCTYL)TRIETHOXYSILANE
Gelest: SIT8175.0
Chemical Formula: $C_{14}H_{19}F_{13}O_3Si$
Exact Mass: 510.09
Molecular Weight: 510.36

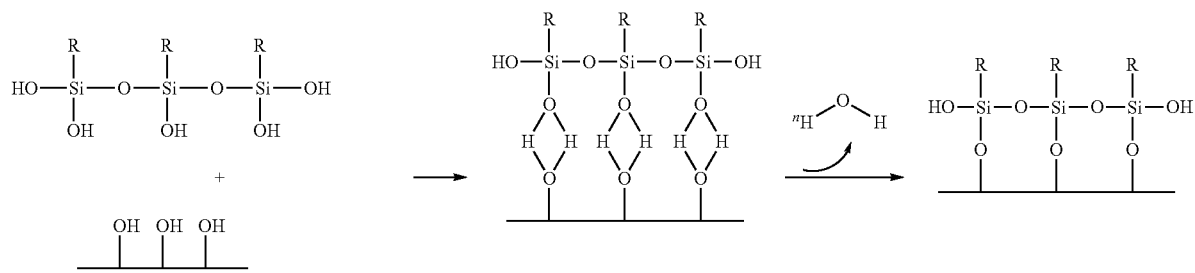

Reaction Mechanism: Hydrolytic deposition of silane. The reaction of water with the corresponding triethoxy-silane results in the loss of three equivalents of ethanol producing a triol-silane, followed by polymerization and reactivity with the substate producing hydrogen bonding that results in net silica-oxygen bond formation.

Scheme IV

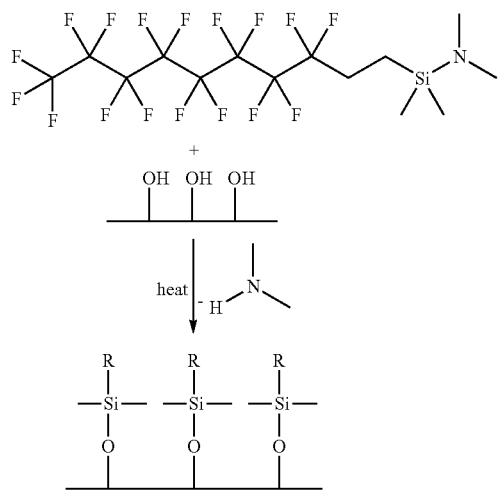
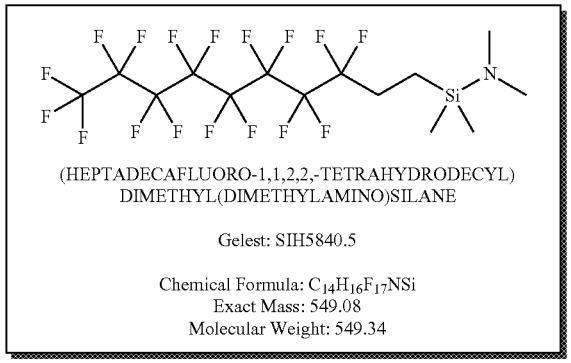

Reaction Mechanism: Anhydrous Deposition of Silane. Higher temperatures and extended reaction time must occur for the reaction to occur at high yield. The reaction of alcohol substrate with the corresponding amino-silane results in the loss of dimethylamine and silica-oxygen bonding.

Scheme V

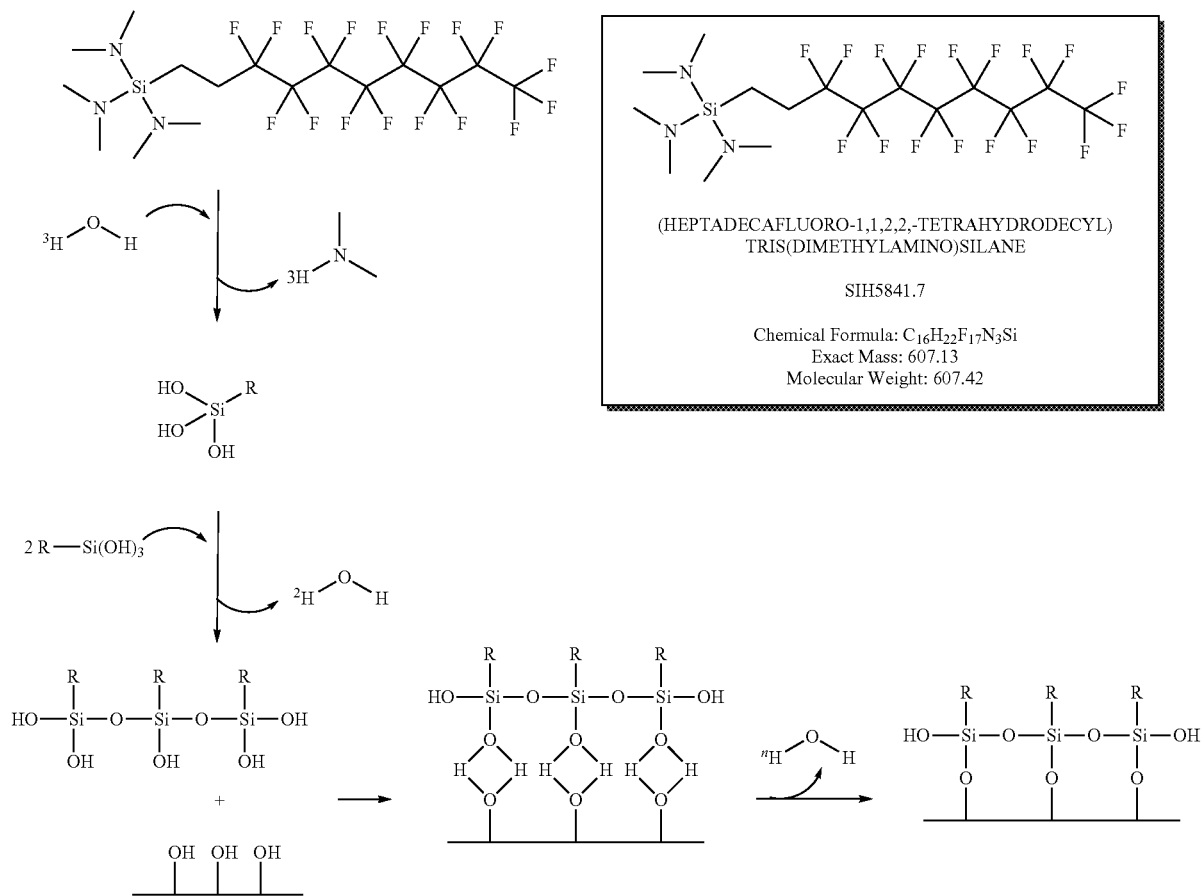

Reaction Mechanism: Hydrolytic deposition of silane. The reaction of water with the corresponding triamino-silane results in the loss of three equivalents of dimethylamine producing a triol-silane, followed by polymerization and reactivity with the substrate producing hydrogen bonding that results in net silica-oxygen bond formation producing hydrophobicity.

Scheme VI

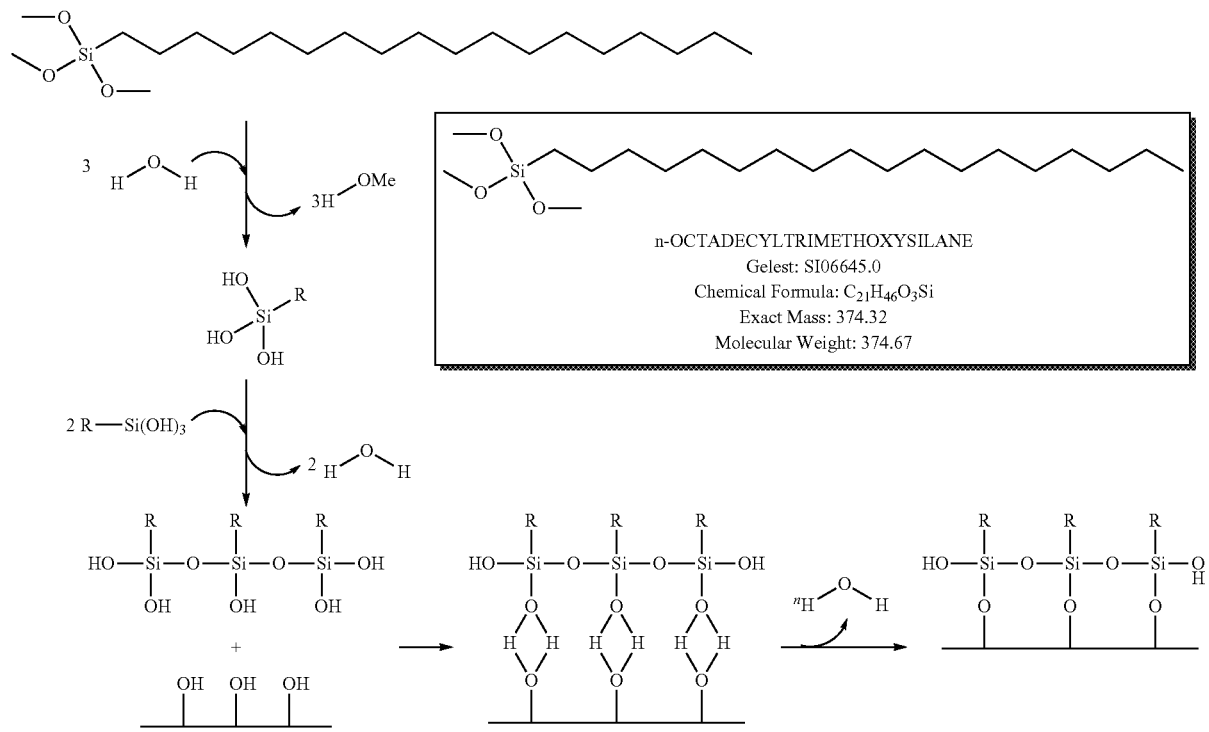

Reaction Mechanism: Hydrolytic desposition of silane. The reaction of water with the corresponding trimethoxy-silane results in the loss of three equivalents of methanol producing a triol-silane, followed by polymerization and reactivity with the substrate producing hydrogen bonding that results in net silica-oxygen bond formation.

Scheme VII

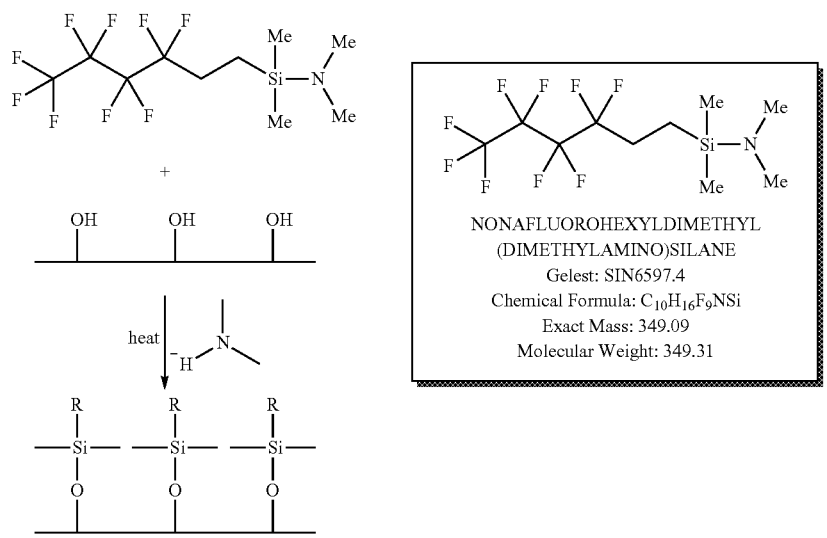

Reaction Mechanism: Anhydrous Deposition of Silane. Higher temperatures and extended reaction times must occur for the reaction to occur at high yield. The reaction of alcohol substrate with the corresponding amino-silane results in the loss of dimethylamine and silica-oxygen bonding.

Chemical means that can be used to activate and/or etch a surface and particularly glass or ceramic surfaces, include without limitation, reaction with: acids (e.g., hydrofluoric acid); base (e.g., 1 to 10 N NaOH or KOH with or without added sodium or potassium silicate); sodium or potassium silicate; or fluorine containing salts (e.g., a composition comprising ammonium fluoride). A variety of commercial etching agents that can be used to activate glass and/or ceramic surfaces are also available, including, but not limited to, "New Improved Armour Etch" (Armour Products, Hawthorn, N.J.), with GALLERY GLASS® etching medium (Plaid Enterprises, Inc., Norcross, Ga.), Professional 30 second Glass Etching Cream (Martronic Corp, Salkum, Wash.), ETCH-ALL® Etching Cream (B & B Products, Inc., Peoria, Ariz.), and VTX catalyst (Advanced Oxidation Technology, Inc.) in the presence of hydrogen peroxide.

The pH of activating agents/etchants used to treat glass/ceramic surfaces can vary widely. The activating agents/etchants listed in Example 5 and Table 5 varied in their pH from 1 to 14. As noted in Examples 1-5, and Tables 1-5, many of the compositions employed for glass etching are acidic with a pH of ~3, one is basic with a pH of 9, and sodium silicate and sodium hydroxide solutions are significantly more basic. The height of water retained on glass plates bearing spill-resistant borders formed with Gelest silane SIT8174 is plotted as a function of pH of the activating agent/etchant employed in FIG. 4., which indicates that the height of water retained on the plates is basically independent of pH.

In one embodiment activation of glass by exposure of $SiO_2$, (Si—OH groups), 1 which can react with silanizing agents and the like, is carried out by chemical treatment with 5% HF, 1 or 10 N NaOH, sodium silicate, or VTX in the presence of peroxide.

In one embodiment, activation and/or etching of glass or ceramic is conducted with HF. In another embodiment, activation of glass and or ceramic surfaces is conducted by treatment of the surface with commercial etching compositions comprising a fluoride salt.

Some of the reactions that $SiO_2$ containing glasses undergo with HF are listed below.

$$SiO_2(S)+4HF(aqueous(aq)) \rightarrow SiF_4(g)+2H_2O(l) \quad \text{(Equation (1a))}$$

$$SiO_2(S)+6HF(aq) \rightarrow H_2SiF_6(aq)+2H_2O(l) \quad \text{(Equation (1b))}$$

The $SiO_2$ in the glass can be dissolved by both reactions (1a) and (1b).

In another embodiment, activation and/or etching of $SiO_2$ containing glasses is conducted with ammonium bifluoride, such as in some acidic etching creams. Some of $SiO_2$ containing glass undergoes with ammonium bifluoride, potassium fluoride, and sodium fluoride, are listed below.

$$SiO_2+4[NH_4][HF_2] \rightarrow SiF_4+4[NH_4]F+2H_2O \quad \text{(Equation (2a))}$$

$$SiO_2+4[K][HF_2] \rightarrow SiF_4+4[K]F+2H_2O \quad \text{(Equation (2b))}$$

$$SiO_2+4[Na][HF_2] \rightarrow SiF_4+4[Na]F+2H_2O \quad \text{(Equation (2c))}$$

In yet other embodiments, activation and/or etching of $SiO_2$ containing glasses is conducted with sodium hydroxide or sodium silicate, which also attack $SiO_2$ and possible reactions with the glass include:

$$(X)SiO_2 \text{ glass}+2NaOH \rightarrow Na_2SiO_3+H_2O+\text{Etched glass} \quad \text{(Equation (3))}$$

$$(X)SiO_2(\text{glass})+Na_2SiO_3(\text{water glass}) \rightarrow Na_2SiO_3(\text{water glass with higher } SiO_2 \text{ content}) \quad \text{(Equation (4))}$$

where X in Equations (3) and (4) represents a non-$SiO_2$ part of the glass.

In general, the aqueous etchants such as HF, NaOH, $Na_2SiO_3$, and VTX produced clear borders that are not visible. Etching creams that contained ammonium bifluoride with large quantities of inactive ingredients generally produce translucent or visible borders. Only one of the etching creams with a pH of 9 (Gallery Glass Window Etch) produces a clear border. That etching cream is liquid with minimum amounts of inactive ingredients. Without wishing to be bound by theory, it appears that translucent or visible borders produced by etching creams are caused by the presence of inert ingredients masking the surface which causes the etching reaction to take a longer time and also makes it irregular and translucent. The absence of inactive ingredients in pure aqueous solution causes them to produce a more uniform etching, which leaves the etched surface transparent or clear Attempts to employ inactive materials, such as 512 polymer particles, with 5% HF to produce a patterned border due to masking of the glass by the polymer particles is, however, ineffective as the 512 powder does not produce any significant masking effect.

Glasses and ceramics may also be abraded to improve their reaction with agents such as the silanizing agents of formula (I). Mechanical abrasion may be conducted using a variety of techniques known in the art, including but not limited to abrading or blasting (sand blasting) with hard particles such as SiC, $SiO_2$, or $Al_2O_3$. The particle sizes can be coarse (e.g., 30-50 mesh) to cause a coarse appearance, or fine (e.g. 300 mesh) to obtain a fine appearance, or medium (e.g., a blend of 30-50 and 300-400 mesh) to obtain a surfaces with an appearance that is intermediate between fine and coarse. Abrasion may also be conducted using immobilized particles of hard materials in the form of sheets (e.g., sand paper or emery cloth) or aggregated hard particles in the form of grinding equipment (e.g., grinding stones an the like).

Without wishing to be bound by any theory, abrading processes are thought to activate $SiO_2$ containing glasses and ceramics by removing relatively more of softer non-$SiO_2$ components than the hard $SiO_2$ components of glass and ceramic compositions. Thus, $SiO_2$ sites (e.g., existing as groups comprising Si—OH functionalities), which can react with silanizing agents, are preferentially exposed. Because of significant roughness, a boarder produced by abrasion is generally translucent or visible.

In contrast to abrasion with moderately large particles, where the particles of abrading agent are very fine (e.g., 1,200 grit or 15 microns to 200,000 grit 0.125 microns) they may serve as a polishing agent, and still produce activation of a glass or ceramic surface. Thus, in one embodiment, polishing agents such as cerium oxide, tin oxide, iron oxide, silicon dioxide, chromium oxide, aluminum oxide, or diamond powders, having a size from about 1,200 mesh to about 200,000 mesh, or more typically from 50,000 to 200,000 mesh can be used to polish and activate ceramic and glass surfaces for the preparation of spill-resistant borders that are not visible. In some embodiments, the polishing powders can have a mesh (grit) size of about, 1,000, 2,000, 3,000, 4,000, 8,000, 12,000, 16,000, 20,000, 40,000, 50,000, 100,000 or 200,000 grit.

Polishing with fine particles, such as cerium oxide particles, is often conducted in slurry form using a motorized wheel. Data for the effect of cerium oxide polishing and its effect on the height of water retained by spill-resistant borders on glass surfaces is found Example 10.

In some embodiments, a combination of chemical treatments or a combination of mechanical (physical treatments such as abrasion or polishing) and chemical treatments may be employed to activate surfaces (e.g., glasses and ceramics) on which spill-resistant borders are to be formed. Combining of treatments for surface activation do not necessarily produce the highest water retention on glass or ceramic plates. Treatment of plates with sodium silicate after sandblasting with coarse particles or fine particles resulted in spill-resistant borders having lower water height retention as can be noted from Table 5. This suggests that sodium silicate treatment can inactivate some of the sites to which silanizing agents might otherwise have attached. In addition, the data in Table 5 indicates that NaOH etching of borders prepared by sandblasting produced even a larger reduction of the water height capacity than sodium silicate treatment.

While many chemical treatments are suitable for the activation of surfaces and have the ability to markedly increase the ability of spill-resistant borders formed on those surfaces to retain liquids, the use of chemical treatments often entails the use of materials that are toxic, caustic or corrosive, particularly where glass, stone, or ceramics are treated. In contrast, physical treatments, such as abrasion by sand blasting or polishing, tend to utilize or produce fewer noxious, toxic, caustic or corrosive chemicals; hence, the materials used and by-products produced are less likely to have the same degree of environmental impact as caustic etchants.

3.2 Activation of Non-Glass and Non-Ceramic Surfaces
Activation of Metals:

Metals and alloys can be activated by many different methods.

1. Blasting the surface with hard particles. The hard particles include oxides ($SiO_2$, $Al_2O_3$, $ZrO_2$, etc.), carbides (SiC, WC, etc.), steel shot, glass shot, etc.
2. Etching of surfaces with chemical reagents. All metals can be etched to reveal the grain boundaries and the grain interiors. By controlling the chemical concentration and exposure time, the grain interiors can be etched to create active sites for binding with silanes. The chemicals used include acids, alkalis, and salts.
3. Anodizing is another process used to activate metal surfaces. In this process, the metal or alloy to be activated is made an anode in an electrolytic bath containing acid. When a current is applied, the anode surface is oxidized with micron to nano size features. The anodizing process is most commonly used for aluminum but can also be applied to other metals and alloys. Titanium is another common material that is anodized.
4. Combined blasting and etching is another method for activating metals. Blasting creates the regions of high and low stresses and etching preferentially etches the high stress areas to create the desired micron/nano size features. The final size is controlled by the particle size and hardness of the blast media used, choice of an etchant, and etching time. Sometimes temperature is used to enhance the etching process.
5. Wood is porous and generally does not require activation, where binding if agents such as silanes will be to groups such as hydroxyl, that are already present in the cellulose. Its porous surface and body can also be impregnate with chemicals such as $SiCl_4$, $Si(OEt)_4$, or $Si(OMe)_4$, or $Si(OR)_3Cl$ for creating Si—OH sites to which silanes attach to create covalent Si—O—Si bonds.
6. Plastics can also be chemically bonded to silanes. In some cases, plastics may be inert to bonding with agents that will impart a hydrophobic or oleophobic characteristic to a portion of the surface. Surface activation to bond to silanes requires creating active sites in the plastic molecules, which can generally be done by exposure to thermal plasma generated using electrical discharge methods. In certain circumstances, chemical treatments may also be used for plastic activation. In one instance, PVC can be activated by treating its surface with a solvent use as a PVC cleaner such as MEK.

4.0 Control of Spill-Resistant Border Dimensions, Placement and Shape—Masked and Non-Masked Border Formation.

The shape, dimensions and placement of spill-resistant border on surfaces can be controlled by a variety of means that broadly fall into two categories, control of the activation process and control of portion of a surface exposed to compositions comprising agents that will increase the hydrophobicity and/or oleophobicity of the portion of the surface that will form the border (e.g., silanizing agents such as compounds of formula I). Control of the activation process and the local placement of compositions comprising agents can be used alone or in combination.

Masks can control chemical, physical (e.g., abrasion, sandblasting, polishing) or photochemical activation of surfaces. The choice of masking agents will depend on the treatments that the mask is expected to control. For example, where activation of a surface and/or the application of silanizing agent will not involve mechanical treatments such as abrasion or sand blasting, waxes can be used as a masking agent. Alternatively, where sand blasting is used activate and/or etch a surface, a more durable masking agent, such as a rigid or flexible plastic, resin, or rubber/rubberized material may be more desirable. Masking may be attached to the surface through the use of adhesives, which may be applied to the masking agent, the surface, or both. In one embodiment, the mask may formed from a photo sensitive agent such as a photo resist that upon exposure to light can be removed to expose the glass surface (see e.g., U.S. Pat. No. 4,415,405). Where masks are to be subject to chemical treatments in an etching and/or activation process, or chemical treatments involved in the application of compositions that modify hydrophobic/oleophobic properties of a surface, the mask should be resistant to the reagents employed in those processes.

More than one type of mask can be used in the process of preparing items with spill-resistant borders. For example, one type of mask may be employed for control of activation/etching and another type of mask to control the application of composition comprising agents that increase the hydrophobic or oleophobic properties of a surface.

Masks need not be in direct contact with a surface for all types of treatments. For example, where glass is subject to photochemical etching with ultraviolet light or ultraviolet light and heat, the mask need only control the regions where light falls on the surfaces (i.e., the mask is a photomask, see e.g., U.S. Pat. No. 5,840,201 or 6,136,210) Alternatively, a combination of a photoresistive coating as a mask to create pattern, and a chemical etchant can be employed to activate/etch glasses, ceramics, and other materials in specific regions where borders are to be formed.

As an alternative to the use of masks, it is possible control the location of border formation by limiting the portion of a surface to which activation/etching agents, and/or compositions comprising agents that will increase the hydrophobicity or oleophobicity of a surface will be applied. In one embodiment, activation or etching is carried out with a chemical composition that does not flow significantly from the area to which it is applied under the conditions employed (e.g., the etchant is a cream or paste), thereby permitting activation of portion of a surface that will form a border without the use of a mask. In another embodiment, sandblasting can be conducted using equipment which produces a narrowed stream of particles permitting local abrasion of a surface without a mask (using such techniques the borders may have more diffuse edges). In still another embodiment, compositions comprising agents that will increase the hydrophobicity and/or oleophobicity of a surface may be applied to limited regions (e.g., by the painting, printing, or stamping of silanizing agents on a portion of a surface). In one embodiment, or the use of applicators such as foams or spongy material formed in the shape of the border desired are employed. Thus, it is possible to prepare spill-resistant borders on surfaces omitting steps where masks are used.

5.0 Retention of Liquids by Spill-Resistant Borders

The spill-resistant borders described herein can prevent a large variety of liquids from moving beyond the borders edge until the height of the liquid exceeds a critical level. Included in the liquids that can be retained by the spill-resistant borders described herein are water, and aqueous liquids, aqueous suspension, and aqueous emulsions. In addition, alcohols, and aqueous alcohol mixtures (e.g. wines and distilled alcohol containing liquids such as vodka) can be retained by the spill-resistant borders described herein. Non-aqueous materials including many oils and lipids can be retained by spill-resistant borders, particularly where the border is comprised of one or more types of fluorinated or perfluorinated alkane, alkene, or aryl groups (an alkyl group where all hydrogen atoms are replaced by fluorine atoms), or formed from one or more highly fluorinated alkanes, alkenes, alkynes or aryl group where greater than about 65%, 75%, 80%, 85% 90%, 95%, or 98% of the hydrogen atoms are replaced by fluorine atoms. In one embodiment, spill-resistant borders formed with agents (e.g., silanizing agents) comprising one or more perfluorinated alkane groups or highly fluorinated alkane groups are useful not only for preventing the spilling of aqueous materials, but also for non-aqueous materials, including alcohols, aqueous alcohol combinations, and many oils and lipids.

In some embodiments, the height of water retained by the borders described herein is about 2 to about 3.5, or about 2.5 to about 4, or about 3 to about 5, or about 3.5 to about 5.25 millimeters (mm). Alternatively, the height of water retained by spill-resistant borders above the surface on which the border is formed (measured at room temperature) is be about 2.0, 2.25, 2.5, 2.75, 3.0, 3.25, 3.5, 3.75, 4.0, 4.25, 4.5, 4.75, 5.0, 5.25 or 5.5 millimeters. In some embodiments the spill-resistant borders provide a contact angle of: about 45° to about 125°; about 50° to about 110°; about 50° to about 90°; about 90° to about 125°; or about 75° to about 115° with water on a glass surface that has a fine, medium or coarse visible border. In other embodiments the spill-resistant borders provide a contact angle of: about 60° to about 116°; about 65° to about 90°; about 90° to about 116°; or about 70° to about 115° with water on a glass surface that has a border that is not visible.

Reduced temperatures do not prevent the spill-resistant borders described in this disclosure from retaining liquids. The performance of several, spill-resistant borders formed on glass at surface at temperatures typically employed in food refrigeration is depicted in Example 12. The height of ice cold water (about 0°-4° C. or about 32° to 39° F.) retained by the spill-resistant borders described herein is generally about 5% less than that observed with room temperature water.

Non-aqueous liquids that can be retained by the spill-resistant borders described in this disclosure include alcohols, liquid comprising an alcohol, a liquid comprising alcohol and water, oils such as mineral oil, lipids (e.g., triglycerides, fatty acids or their esters). Combinations of aqueous and non-aqueous liquids, even where immiscible, can also be retained by the spill-resistant-borders described herein.

As depicted in Example 11, the spill-resistant borders described herein can retain alcohol containing liquids, (e.g., a liquid comprising an alcohol, or a liquid comprising alcohol and water). In some embodiments, the height of those liquids retained by the spill-resistant borders described herein is about 1 to about 4.25 mm, or about 1.5 to about 4.2 mm, or about 2.0 to about 4.1, or about 2.5 to about 4.1 mm, above the surface of on which the border is formed. Alternatively, the height of those liquids (e.g., wine or distilled liquors such as vodka) retained by spill-resistant borders above the surface on which the border is formed (measured at room temperature) can be about 0.8, 0.9, 1.0, 1.2, 1.3, '1.4, 1.5, 1.6, 1.7, 1.8, 1.9, 2.0, 2.1, 2.2, 2.3, 2.4, 2.5, 2.75, 3.0, 3.25, 3.5, 3.75, 4.0, or 4.25 millimeters.

As can be observed from the data in Example 14, the contact angle of water with a hydrophobic and/or oleophobic surface is generally higher than the contact angle of mineral oil with that surface. The contact angle for water and silane treated surfaces/borders is typically 3 to 6 time higher than for control, untreated sample surfaces. In contrast, the contact angle for mineral oil and silane treated borders is typically 2 to 9 times higher than control, untreated sample surfaces. The data in Examples 14 and 15 indicate that silanizing agents that produce the highest contact angles for water also produce the highest contact angles for mineral oil, indicating that the higher the hydrophobicity of the border formed by the silane treatment, the better its performance will be in retaining water and oils. The data in those examples also indicate that trichlorinated silanizing agents (trichlorosilanes, e.g., compounds of formula (I) where n is 3 and X is Cl) produce the highest contact angles for both water and mineral oil.

Examples 14 and 15, indicate that the borders formed with fluorinated alkyl silanes SIT8174 and SIT5841.7 each produce mineral oil heights exceeding 1.9 mm, regardless of the treatment used to activate the surface prior to their deposition. This contrasts with the non-fluorinated alkyl silane SIO6715.0, which produces mineral oil heights of about 1 mm. This suggest that the higher contact angles observed for SIT8174 and SIT5841.7 correlate with higher mineral oil heights and spill-resistance observed for borders formed with those agents. The data further indicate a correlation between the terminal functionalities' fluorine content (e.g., the R groups of a compound of formula (I)) and their ability to serve as oleophobic spill-resistant borders that retain lipid/oils.

In some embodiments, the height of oils (e.g., light mineral oil) retained by the borders described herein is about 0.8 to about 2.5 mm, or about 0.9 to about 2.4 mm, or about 1.0 to about 2.4 mm, or about 1.5 to about 2.5 mm, or about 1.9 to 2.4 mm. Alternatively, the height of oils (e.g., mineral oil) retained by spill-resistant borders above the surface on which the border is formed (measured at room temperature) can be about 0.8, 0.9, 1.0, 1.2, 1.3, 1.4, 1.5, 1.6, 1.7, 1.8, 1.9, 2.0, 2.1, 2.2, 2.3, 2.4, or 2.5 millimeters. In some embodiments, the spill-resistant borders provide a contact angle of: about 36° to about 91°; about 40° to about 70°; about 70° to about 90°; about 45° to about 85°; or about 50° to about 80° with oil (e.g., light mineral oil) on a glass surface that has a fine, medium or coarse visible border. In other embodiments the spill-resistant borders provide a contact angle of: about 27° to about 109°; about 30° to about 105°; about 40° to about 105°; about 40° to about 75°; about 75° to about 109°; or about 80° to about 100° with oil (e.g., light mineral oil) on a glass surface that has a border that is not visible.

6.0 Effects of Surface Cleaning and Use on the Ability to Retain Liquids

Spill-resistant borders by their nature are exposed not only to the liquids spilled, but also to agents used to clear the surface after a spill. In addition, surfaces bearing spill-resistant borders are subject to wear from contact between items and the surface. Exposure to a diversity of liquids and wear can be exemplified by the use of spill-resistant borders on shelving for refrigerated enclosures for food storage. Refrigeration unit shelves in both commercial and home settings are subject to both frequent use and cleaning after exposure to a variety of spilled foods and food preparation materials. The spill-resistant borders described herein are durable and retain their ability to prevent the spread of spilled materials even after cleaning with detergent solutions and after significant contact with items that can cause ware on the surface.

Example 15 demonstrates the ability of spill-resistant borders on glass surfaces to retain a variety of food items after exposure to a variety of food items followed by cleaning after each exposure. In addition, that example demonstrates the ability of the spill-resistant borders to retain water (cooled) even after repeated cleaning.

The type of ware/abrasion that would result from the typical use of spill-resistant borders on shelving in home or commercial refrigerated enclosures can be simulated. A test of spill-resistant borders subject to repeated abrasion by a glass jar to simulate ware shows the borders, and particularly coarse visible boarders, can withstand repeated abrasion. See Example 13 and Tables 13A and 13B. The high abrasion resistance of these borders is likely the result of covalently bonded net works of Si—O—Si bonds formed in the interaction of the glass surface and silanizing agents. Overall, the spill-proof borders described herein are highly durable for expected use in refrigerators and in other applications.

EXAMPLES

Example 1

A Spill-Resistant Border Formed at the Edge of Glass Plates Employing Hydrofluoric Acid Activation Glass plates (4-inch by 4-inch squares) are used to demonstrate border formation and to measure the border's water-holding capacity (height of water retained). Borders are a 0.5-inches wide hydrophobic and/or oleophobic regions applied to the outside edge of the glass plates. The center part of the glass that is not to be treated is masked with an adhesive plastic film (e.g., vinyl electrical tape). After masking, glass plates are activated by etching with a 5% solution of HF, typically for 30 seconds. After etching plates are washed thoroughly with water, excess water blown away with a stream of air, and the plates are dried in a 200° F. oven for 5 min. After cooling, a solution of the indicated silanizing agent in hexanes (1% silane by weight) is applied to the border area. After the hexanes have evaporate, plates are cured at 200° F. for 15 minutes, the plates are cooled, and the mask is removed. The appearance of the border region remained the same as the original plate after HF etching, silane application, and curing.

Plates prepared as described above are placed on a level surface, and the water-retention level of each plate is measured by filling the area within the border (the previously masked area) with water. Water is added to center of each plate until border breakage (water overflowing the border) is noted. The volume of water added to the center of a plate is divided by the area within the border of that plate to derive the height of the water retained by the plate. The appearance of the border, the name and molecular formula of the silane used to treat the plate, and the height of the retained water are summarized in Table 1 and plotted in the graph shown in FIG. 1. Although the pH of the etching solution is listed in Table 1 as "1", the value of the pH can be less than 1 depending on a number of factors including the temperature.

TABLE 1

| 5% HF and Five Different Silanes* | | | | |
|---|---|---|---|---|
| Etchant | Border pH Appearance | Silane | Molecular Formula | Water Height (mm) |
| 5% HF | 1 Clear | SIT 8174 (Tridecafluoro-1,1,2,2 Tetrahydrooctyl) Trichlorosilane | $C_8H_4Cl_3F_{13}Si$ | 4.69 |
| | 1 Clear | SIN 6597.4 Nonafluorohexyl-dimethyl (dimethylamino)silane | $C_{10}H_{16}F_9NSi$ | 3.50 |
| | 1 Clear | SIH 5840.5 Heptadecafluoro-tetrahydrodecyl-dimethyl (dimethylamino)silane | $C_{14}H_{16}F_{17}NSi$ | 4.30 |
| | 1 Clear | SIH 5841.7 Heptadecafluoro-1,1,2,2 Tetrahydrodecyltris (dimethylamino) silane | $C_{16}H_{22}F_{17}N_3Si$ | 4.65 |
| | 1 Clear | SIT 8173 Tridecafluoro-1,1,2,2 Tetrahydrooctylsilane | $C_8H_7F_{13}Si$ | 3.91 |

*The silanes employed are procured from Gelest, Inc., whose product numbers are also given as an additional reference.

The brief etching with 5% HF and treatment with the indicted silanes produce a clear border that is not visible. While each of the silanizing agents listed produce a spill-resistant border, tridecafluoro-1,1,2,2-tetrahydrooctyl trichlorosilane (SIT8174), and heptadecafluoro-1,1,2,2-tetrahydrodecyltris(dimethylamino)silane (SIH5841.7) retain water approximately equally well, and heptadecafluorotetrahydrodecylimethyl (dimethylamino)silane (SIH5840.5) retains water a level that is nearly as high.

Example 2

Spill-Resistant Border Formation Employing Sodium Silicate Acid Activation

Seven 4 inch×4-inch glass plates are prepared as in Example 1, except that the plates are etched with an aqueous sodium silicate solution ($SiO_2/Na_2O$ ratio 3.22, with 8.9% $Na_2O$ and 28.7% $SiO_2$ by weight) for 2 minutes and 30 seconds in place of HF etching. The etched borders are treated with one of the seven different silanes listed in Table 2, and the plates are cured at 200° F. for 15-30 min. The tape mask is removed from the plates and height of water retained by the silanized borders is measured. Data from the plates is summarized in Table 2. Sodium silicate, like the 5% HF etch employed in Example 1, produces a clear border. Again, tridecafluoro-1,1,2,2-tetrahydrooctyl trichlorosilane (SIT8174), and heptadecafluoro-1,1,2,2-tetrahydrodecyltris (dimethylamino)silane (SIH5841.7) retain greater than 4.5 mm of water.

TABLE 2

Sodium Silicate Etch and Seven Different Silanes

| Etchant | pH | Border Appearance | Silane | Molecular Formula | Water Height (mm) |
|---|---|---|---|---|---|
| Sodium Silicate | 12.5 | Clear | SIT 8174 Tri-decafluoro-1,1,2,2-Tetra-hydrooctyl Tri-chlorosilane | $C_8H_4Cl_3F_{13}Si$ | 4.50 |
| | 12.5 | Clear | SIO 6645 n-Octadecyl Trimethoxysilane | $C_{21}H_{46}O_3Si_3$ | 3.96 |
| | 12.5 | Clear | SIO 6715 n-Octyl Triethoxysilane | $C_{14}H_{32}O_3Si_3$ | 3.48 |
| | 12.5 | Clear | Sin 6597.4 Nonafluorohexyl-dimethyl (dimethylamino) silane | $C_{10}H_{16}F_9NSi$ | 3.34 |
| | 12.5 | Clear | SIH 5840.5 Heptadecafluoro-tetrahydrodecyl-dimethyl (dimethylamino) silane | $C_{14}H_{16}F_{17}NSi$ | 3.74 |
| | 12.5 | Clear | SIH 5841.7 Heptadecafluoro-1,1,2,2,-Tetra-hydrodecyltris (dimethylamino) silane | $C_{16}H_{22}F_{17}N_3Si$ | 4.50 |
| | 12.5 | Clear | SIT 8173 Tri-decafluoro-1,1,2,2-Tetra-hydrooctyl silane | $C_8H_7F_{13}Si$ | 3.65 |

Example 3

A Coarse Visible Spill-Resistant Border Formed at the Edge of Glass Plates Employing Sand Blasting as a Means to Activate the Glass Surface Nine 4 inch by 4-inch glass plates with the center masked with electrical tape as in Example 1 are sandblasted using coarse grit sand (43 mesh) to form a coarse visible border. The blasted surface is washed with water, dried, and silanated by applying one of nine different silanizing agents to the etched border of each plate. The silanated plates are cured at 200° F. for 15-30 min. After cooling, the mask is removed and the plates are tested for their ability to retain water as described in Example 1. The height of water retained by plates with coarse visible borders are given in Table 3.

The use of coarse materials to etch and activate the surface of glass plates produces a visible border without the use of chemicals that require special handling and disposal. Sandblasting with coarse material to produce a visible edge also provides a means by which to form spill-resistant borders or barriers on glass with the ability to retain greater than 4.5 mm of water for a number of silanizing agents. See Table 3.

TABLE 3

Coarse-Blasted and Nine Different Silanes

| Etchant | pH | Border Appearance | Silane | Molecular Formula | Water Height (mm) |
|---|---|---|---|---|---|
| Coarse Grit Sandblast | N/A | Nice Visible | SIT 8174 Tri-decafluoro-1,1,2,2-Tetra-hydrooctyl Tri-chlorosilane | $C_8H_4Cl_3F_{13}Si$ | 4.78 |
| | N/A | Nice Visible | SIT 8175 Tri-decafluoro-1,1,2,2-Tetra-hydrooctyl Tri-methoxysilane | $C_{14}H_{19}F_{13}O_3Si$ | 3.83 |
| | N/A | Nice Visible | SIT 8176 Tri-decafluoro-1,1,2,2-Tetra-hydrooctyl Tri-ethoxysilane | $C_{11}H_{13}F_{13}O_3Si$ | 3.77 |
| | N/A | Nice Visible | SIO 6645 n-Octadecyl Trimethoxysilane | $C_{21}H_{46}O_3Si_3$ | 4.09 |
| | N/A | Nice Visible | SIO 6715 n-Octyl Triethoxysilane | $C_{14}H_{32}O_3Si_3$ | 3.28 |
| | N/A | Nice Visible | SIN 6597.4 Nonafluorohexyl-dimethyl (dimethylamino) silane | $C_{10}H_{16}F_9NSi$ | 4.25 |
| | N/A | Nice Visible | SIH 5840.5 Heptadecafluoro-tetrahydrodecyl-dimethyl (dimethylamino) silane | $C_{14}H_{16}F_{17}NSi$ | 4.56 |
| | N/A | Nice Visible | SIH 5841.7 Heptadecafluoro-1,1,2,2,-Tetra-hydrodecyltris (dimethylamino) silane | $C_{16}H_{22}F_{17}N_3Si$ | 4.78 |
| | N/A | Nice Visible | SIT 8173 Tri-decafluoro-1,1,2,2-Tetra-hydrooctyl silane | $C_8H_7F_{13}Si$ | 4.66 |

Example 4

A Fine Visible Spill-Resistant Border Formed at the Edge of Glass Plates Employing Sand Blasting as a Means to Activate the Glass Surface Eight plates are prepared for silanization as in Example 3 substituting fine grit sand (300 mesh) in place of the coarse grit material used in that example. The borders of the plates are each treated with one of eight different silanes and cured at 200° F. for 15-30 min. After cooling, the mask is removed to reveal that fine grit sandblasting provides a fine visible border. The height of water retained on the plates by the silanized borders is measured. The data for water retention is shown Table 4.

As with coarse sandblasting in Example 3, the use of fine materials to etch and activate the surface of the glass plates produces a visible border. Sandblasting with fine mesh also provides a means by which to form spill-resistant border or barriers on glass with the ability to retain greater than about 4 mm of water for a number of silanes. See table 4.

TABLE 4

Fine-Blasted and Eight Different Silanes

| Etchant | pH | Border Appearance | Silane | Molecular Formula | Water Height (mm) |
|---|---|---|---|---|---|
| Fine Grit Sandblast | N/A | Nice Visible | SIT 8174 Tri-decafluoro-1,1,2,2-Tetra-hydrooctyl Tri-chlorosilane | $C_8H_4Cl_3F_{13}Si$ | 4.86 |

TABLE 4-continued

Fine-Blasted and Eight Different Silanes

| Etchant | pH | Border Appearance | Silane | Molecular Formula | Water Height (mm) |
|---|---|---|---|---|---|
| | N/A | Nice Visible | SIT 8175 (Tridecafluoro-1,1,2,2-Tetrahydrooctyl Trimethoxysilane | $C_{14}H_{19}F_{13}O_3Si$ | 3.92 |
| | N/A | Nice Visible | SIT 8176 Tridecafluoro-1,1,2,2-Tetrahydrooctyl Triethaxysilane | $C_{11}H_{13}F_{13}O_3Si$ | 3.90 |
| | N/A | Nice Visible | SIO 6645 n-Octadecyl Trimethoxysilane | $C_{21}H_{46}O_3Si_3$ | 4.01 |
| | N/A | Nice Visible | SIO 6715 n-Octyl Triethoxysilane | $C_{14}H_{32}O_3Si_3$ | 3.32 |
| | N/A | Nice Visible | SIH 5840.5 Heptadecafluoro-tetrahydrodecyl-dimethyl (dimethylamino) silane | $C_{14}H_{16}F_{17}NSi$ | 3.86 |
| | N/A | Nice Visible | SIH 5841.7 Heptadecafluoro-1,1,2,2,-Tetra-hydrodecyltris (dimethylamino) silane | $C_{16}H_{22}F_{17}N_3Si$ | 4.51 |
| | N/A | Nice Visible | SIT 8173 Tridecafluoro-1,1,2,2-Tetra-hydrooctyl silane | $C_8H_7F_{13}Si$ | 3.85 |

Example 5

Spill-Resistant Border Formation with Tridecafluoro-1,1,2,2-Tetrahydrooctyl Trichlorosilane after Activation of Glass Surfaces by Chemical Etching, Abrasion, and Combined Treatments A series of 4 inch by 4 inch glass plates are masked as described in Example 1 leaving a 0.5 inch border exposed around their outer margin, washed with water, and dried. The plates are then subject to one of the treatments described below to activate the border region. After activation the plates are treated with tridecafluoro-1,1,2,2-tetrahydrooctyl trichlorosilane (product reference SIT 8174 from Gelest), cured at 200° F. for 15 to 30 minutes. After cooling the mask are removed, and the height of water retained by the border applied to those plates is measured. See Table 5 which correlates the height of water retained with the appearance of the border resulting from the treatment listed below:

1. 5% HF etching for 30 seconds produces a clear or invisible border;
2. Treatment with "New Improved Armour Etch" (Armour Products, Hawthorn, N.J.), which is an inorganic fluoride, titanium dioxide, and citric acid composition, for 2-5 minutes produces a visible border;
3. Treatment with GALLERY GLASS® etching medium (Plaid Enterprises, Inc., Norcross, Ga.) for 1-3 minutes produces a clear border that is not visible, very similar to that produced by 5% HF;
4. Treatment with Professional 30 second Glass Etching Cream (Martronic Corp, Salkum, Wash.) for 30 seconds produces a visible border;
5. Treatment with ETCHALL® Etching Cream (B & B Products, Inc., Peoria, Ariz.) for up to 15 minute produces a visible border;
6. 1 N NaOH etching for 5-7 minutes produces a clear or invisible border;
7. 5% aqueous sodium silicate, for 2-5 minutes also known as water glass, etches glass and produces a clear invisible border;
8. The hydroxyl radical generating system, VTX catalyst (Advanced Oxidation Technology, Inc., Fredericksburg, Va.) (amount used) and $H_2O_2$ (3%??? w/w) when used in combination to activate glass prior to silanization produces a clear or invisible border;
9. Treatment by coarse grit sandblasting (43 mesh sand) produced a highly visible border with a rough appearance;
10. Treatment by coarse grit sandblast followed by sodium silicate etching is conducted by coarse grit sandblasting (43 mesh sand) as in treatment 9, supra, to produce a highly visible border with a rough appearance. The border produced by the sandblasting is subsequently etched using 5% aqueous sodium silicate for 2 minutes and 30 seconds;
11. Treatment by fine grit sandblasting (300 grit SiC particles) produced a visible border;
12. Treatment by etching with 5% HF in the presence of 20% w/v of thermoplastic powder (512 powder, 10-100 micron size, XIOM Corp. and NY) for 1-2 minutes produced a clear border;
13. Treatment by fine grit sandblast followed by sodium silicate etching is conducted by fine grit sandblasting as in treatment 11, supra, to produce a visible border. The border produced by the sandblasting is subsequently etched using 5% aqueous sodium silicate for 2 minutes and 30 seconds;
14. Treatment by fine grit sandblast followed by aqueous sodium hydroxide (NaOH 5% w/v) etching is conducted by fine grit sandblasting as in treatment 11, supra, to produce a visible border. The border produced by the sandblasting is subsequently etched using 5% aqueous sodium hydroxide for 2 minutes and 30 seconds.

Figure 4:
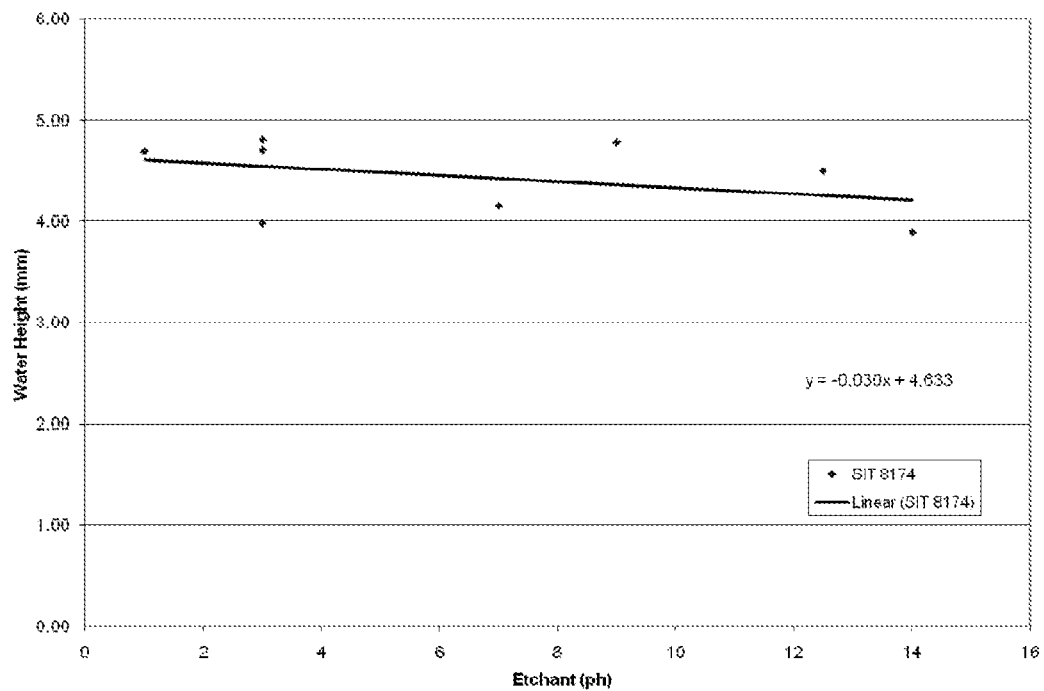
FIG. 4 is a plot of etchant pH and its effect on height of water retained by spill-resistant borders formed with Gelest Inc. silanizing agent SIT 8174 on glass plates.

The height of water retained by the various glass plates are plotted as a function of pH of the etchant used in FIG. 4. That plot indicates that the water height data are basically independent of the etchant's pH.

TABLE 5

Silane SIT8174

| Broader Etchants | pH | Border Appearance | Silane | Molecular Formula | Water Height (mm) |
|---|---|---|---|---|---|
| 5% HF Etch | 1 | Clear | SIT 8174 Tridecafluoro-1,1,2,2-Tetrahydrooctyl Trichlorosilane | $C_8H_4Cl_3F_{13}Si$ | 4.69 |
| New Improved Armour Etch | 3 | Nice Visible | SIT 8174 Tridecafluoro-1,1,2,2-Tetrahydrooctyl Trichlorosilane | $C_8H_4Cl_3F_{13}Si$ | 4.80 |
| Gallery Glass window etch | 9 | Clear | SIT 8174 Tridecafluoro-1,1,2,2-Tetrahydrooctyl Trichlorosilane | $C_8H_4Cl_3F_{13}Si$ | 4.78 |

TABLE 5-continued

Silane SIT8174

| Broader Etchants | pH | Border Appearance | Silane | Molecular Formula | Water Height (mm) |
|---|---|---|---|---|---|
| Professional 30 s glass etching | 3 | Nice Visible | SIT 8174 Tridecafluoro-1,1,2,2-Tetrahydrooctyl Trichlorosilane | $C_8H_4Cl_3F_{13}Si$ | 4.70 |
| Etchall etching cream | 3 | Nice Visible | SIT 8174 Tridecafluoro-1,1,2,2-Tetrahydrooctyl Trichlorosilane | $C_8H_4Cl_3F_{13}Si$ | 3.98 |
| 1N NaOH | 14 | Clear | SIT 8174 Tridecafluoro-1,1,2,2-Tetrahydrooctyl Trichlorosilane | $C_8H_4Cl_3F_{13}Si$ | 3.89 |
| Sodium Silicate | 12.5 | Clear | SIT 8174 Tridecafluoro-1,1,2,2-Tetrahydrooctyl Trichlorosilane | $C_8H_4Cl_3F_{13}Si$ | 4.50 |
| VTX | 7 | Clear | SIT 8174 Tridecafluoro-1,1,2,2-Tetrahydrooctyl Trichlorosilane | $C_8H_4Cl_3F_{13}Si$ | 4.15 |
| Coarse Grit Sandblast | N/A | Nice Visible | SIT 8174 Tridecafluoro-1,1,2,2-Tetrahydrooctyl Trichlorosilane | $C_8H_4Cl_3F_{13}Si$ | 4.78 |
| Coarse Grit Sandblast with Sodium Silicate | N/A | Nice Visible | SIT 8174 Tridecafluoro-1,1,2,2-Tetrahydrooctyl Trichlorosilane | $C_8H_4Cl_3F_{13}Si$ | 4.27 |
| Fine Grit Sandblast | N/A | Nice Visible | SIT 8174 Tridecafluoro-1,1,2,2-Tetrahydrooctyl Trichlorosilane | $C_8H_4Cl_3F_{13}Si$ | 4.86 |
| 5% HF (with 512 Power coat) | 1 | Clear | SIT 8174 Tridecafluoro-1,1,2,2-Tetrahydrooctyl Trichlorosilane | $C_8H_4Cl_3F_{13}Si$ | 4.47 |
| Fine Grit Sandblast with Sodium Silicate | 12.5 | Nice Visible | SIT 8174 Tridecafluoro-1,1,2,2-Tetrahydrooctyl Trichlorosilane | $C_8H_4Cl_3F_{13}Si$ | 4.57 |
| Fine Grit Sandblast with NaOH | 14 | Nice Visible | SIT 8174 Tridecafluoro-1,1,2,2-Tetrahydrooctyl Trichlorosilane | $C_8H_4Cl_3F_{13}Si$ | 4.02 |

Example 6

Spill-Resistant Border Formation with Tridecafluoro-1,1,2,2-Tetrahydrooctyl Trimethoxysilane after Activation of Glass Surfaces by Chemical Etching, Abrasion, and Combined Treatments The ability of plates having borders prepared with tridecafluoro-1,1,2,2-tetrahydrooctyl trimethoxysilane (Gelest product reference SIT8176) under the conditions described in Table 6 to retain water is conducted using six glass plates. The plates are masked leaving a 0.5 inch border at their edge and treated using SIT8176 as the silanizing agent using the methods employed in Example 5. The height of water retained on these plates and the pH of the etchant, where applicable, is listed in Table 6.

TABLE 6

Silane SIT8176

| Broader Etchants | pH | Border Appearance | Silane | Molecular Formula | Water Height (mm) |
|---|---|---|---|---|---|
| VTX | 7 | Clear | SIT8176 Tridecafluoro-1,1,2,2-Tetrahydrooctyl Trimethoxysilane | $C_{14}H_{19}F_{13}O_3Si$ | 3.16 |
| Coarse Grit Sandblast | N/A | Nice Visible | SIT8176 Tridecafluoro-1,1,2,2-Tetrahydrooctyl Trimethoxysilane | $C_{14}H_{19}F_{13}O_3Si$ | 3.83 |
| Coarse Grit Sandblast with Sodium Silicate | N/A | Nice Visible | SIT8176 Tridecafluoro-1,1,2,2-Tetrahydrooctyl Trimethoxysilane | $C_{14}H_{19}F_{13}O_3Si$ | 3.32 |
| Fine Grit Sandblast | N/ | Nice Visible | SIT8176 Tridecafluoro-1,1,2,2-Tetrahydrooctyl Trimethoxysilane | $C_{14}H_{19}F_{13}O_3Si$ | 3.92 |
| Fine Grit Sandblast with Sodium Silicate | 12.5 | Nice Visible | SIT8176 Tridecafluoro-1,1,2,2-Tetrahydrooctyl Trimethoxysilane | $C_{14}H_{19}F_{13}O_3Si$ | 3.92 |
| Fine Grit Sandblast with NaOH | 14 | Nice Visible | SIT8176 Tridecafluoro-1,1,2,2-Tetrahydrooctyl Trimethoxysilane | $C_{14}H_{19}F_{13}O_3Si$ | 2.97 |

Example 7

Spill-Resistant Border Formation with Tridecafluoro-1,1,2,2-Tetrahydrooctyl Triethoxysilane after Activation of Glass Surfaces by Chemical Etching, Abrasion, and Combined Treatments Spill-resistant borders are prepared on glass plates as in example 6 using tridecafluoro-1,1,2,2-tetrahydrooctyl triethoxysilane (Gelest reference SIT8175) in place of tridecafluoro-1,1,2,2-tetrahydrooctyl trimethoxysilane. Data for this example are summarized in Table 7. tridecafluoro-1,1,2,2-tetrahydrooctyl triethoxysilane produce lower water heights than tridecafluoro-1,1,2,2-tetrahydrooctyl trimethoxysilane (SIT8176). Post-blast etching reductions in water height are similar to those in Examples 5 and 6.

TABLE 7

Silane SIT8175

| Broader Etchants | pH | Border Appearance | Silane | Molecular Formula | Water Height (mm) |
|---|---|---|---|---|---|
| VTX | 7 | Clear | SIT 8175 Tridecafluoro-1,1,2,2-Tetrahydrooctyl Triethoxysilane | $C_{11}H_{13}F_{13}O_3Si$ | 2.85 |

TABLE 7-continued

Silane SIT8175

| Broader Etchants | pH | Border Appearance | Silane | Molecular Formula | Water Height (mm) |
|---|---|---|---|---|---|
| Coarse Grit Sandblast | N/A | Nice Visible | SIT 8175 Tridecafluoro-1,1,2,2-Tetrahydrooctyl Triethoxysilane | $C_{11}H_{13}F_{13}O_3Si$ | 3.77 |
| Coarse Grit Sandblast with Sodium Silicate | N/A | Nice Visible | SIT 8175 Tridecafluoro-1,1,2,2-Tetrahydrooctyl Triethoxysilane | $C_{11}H_{13}F_{13}O_3Si$ | 3.12 |
| Fine Grit Sandblast | N/A | Nice Visible | SIT 8175 Tridecafluoro-1,1,2,2-Tetrahydrooctyl Triethoxysilane | $C_{11}H_{13}F_{13}O_3Si$ | 3.90 |
| Fine Grit Sandblast with Sodium Silicate | 12.5 | Nice Visible | SIT 8175 Tridecafluoro-1,1,2,2-Tetrahydrooctyl Triethoxysilane | $C_{11}H_{13}F_{13}O_3Si$ | 3.78 |
| Fine Grit Sandblast with NaOH | 14 | Nice Visible | SIT 8175 Tridecafluoro-1,1,2,2-Tetrahydrooctyl Triethoxysilane | $C_{11}H_{13}F_{13}O_3Si$ | 3.12 |

Example 8

Spill-Resistant Border Formation with n-Octadecyl Trimethoxysilane after Activation of Glass Surfaces by Chemical Etching, Abrasion, and Combined Treatments The ability of plates having borders prepared with n-octadecyl trimethoxysilane (Gelest product reference SIO 6645) to retain water under the conditions described in Table 8 is conducted using six glass plates. The plates are masked leaving a 0.5 inch border at their edge and treated using SIO 6645 as the silanizing agent using the indicated methods in Example 5. The height of water retained on these plates and the pH of the etchant, where applicable, is listed in Table 8.

TABLE 8

Silane SIO6645

| Broader Etchants | pH | Border Appearance | Silane | Molecular Formula | Water Height (mm) |
|---|---|---|---|---|---|
| New Improved Armour Etch | 3 | Nice Visible | SIO 6645 n-Octadecyl Trimethoxysilane | $C_{21}H_{46}O_3Si_3$ | 3.91 |
| Gallery glass window etch | 9 | Clear | SIO 6645 n-Octadecyl Trimethoxysilane | $C_{21}H_{46}O_3Si_3$ | 3.97 |
| Professional 30 s glass etching | 3 | Nice Visible | SIO 6645 n-Octadecyl Trimethoxysilane | $C_{21}H_{46}O_3Si_3$ | 4.07 |
| Etchall etching cream | 3 | Nice Visible | SIO 6645 n-Octadecyl Trimethoxysilane | $C_{21}H_{46}O_3Si_3$ | 3.94 |
| 10N NaOH | 14 | Clear | SIO 6645 n-Octadecyl Trimethoxysilane | $C_{21}H_{46}O_3Si_3$ | 3.96 |
| Sodium Silicate | 12.5 | Clear | SIO 6645 n-Octadecyl Trimethoxysilane | $C_{21}H_{46}O_3Si_3$ | 3.96 |

TABLE 8-continued

Silane SIO6645

| Broader Etchants | pH | Border Appearance | Silane | Molecular Formula | Water Height (mm) |
|---|---|---|---|---|---|
| VTX | 7 | Clear | SIO 6645 n-Octadecyl Trimethoxysilane | $C_{21}H_{46}O_3Si_3$ | 3.91 |
| Coarse Grit Sandblast | N/A | Nice Visible | SIO 6645 n-Octadecyl Trimethoxysilane | $C_{21}H_{46}O_3Si_3$ | 4.09 |
| Coarse Grit Sandblast with Sodium Silicate | N/A | Nice Visible | SIO 6645 n-Octadecyl Trimethoxysilane | $C_{21}H_{46}O_3Si_3$ | 3.86 |
| Fine Grit Sandblast | N/A | Nice Visible | SIO 6645 n-Octadecyl Trimethoxysilane | $C_{21}H_{46}O_3Si_3$ | 4.01 |
| Fine Grit Sandblast with Sodium Silicate | 12.5 | Nice Visible | SIO 6645 n-Octadecyl Trimethoxysilane | $C_{21}H_{46}O_3Si_3$ | 4.03 |
| Fine Grit Sandblast with NaOH | 14 | Nice Visible | SIO 6645 n-Octadecyl Trimethoxysilane | $C_{21}H_{46}O_3Si_3$ | 3.16 |

Example 9

Spill-Resistant Border Formation with n-Octadecyl Triethoxysilane after Activation of Glass Surfaces by Chemical Etching, Abrasion, and Combined Treatments The ability of plates having borders prepared with n-octyl triethoxysilane (Gelest product reference SIO 6715) to retain water is assessed using twelve glass plates treated with one of the conditions set forth in Table 9. The plates are masked leaving a 0.5 inch border at their edge and treated using SIO 6715 as the silanizing agent using the methods employed in Example 5. The height of water retained on these plates and the pH of the etchant, where applicable, is listed in Table 9.

TABLE 9

Silane SIO6715

| Broader Etchants | pH | Border Appearance | Silane | Molecular Formula | Water Height (mm) |
|---|---|---|---|---|---|
| New Improved Armour Etch | 3 | Nice Visible | SIO 6715 n-Octyl Triethoxysilane | $C_{14}H_{32}O_3Si_3$ | 3.85 |
| Gallery Glass window etch | 9 | Clear | SIO 6715 n-Octyl Triethoxysilane | $C_{14}H_{32}O_3Si_3$ | 4.06 |
| Professional 30 s glass etching | 3 | Nice Visible | SIO 6715 n-Octyl Triethoxysilane | $C_{14}H_{32}O_3Si_3$ | 3.96 |
| Etchall etching cream | 3 | Nice Visible | SIO 6715 n-Octyl Triethoxysilane | $C_{14}H_{32}O_3Si_3$ | 3.86 |
| 10N NaOH | 14 | Clear | SIO 6715 n-Octyl Triethoxysilane | $C_{14}H_{32}O_3Si_3$ | 3.25 |
| Sodium Silicate | 12.5 | Clear | SIO 6715 n-Octyl Triethoxysilane | $C_{14}H_{32}O_3Si_3$ | 3.48 |
| VTX | 7 | Clear | SIO 6715 n-Octyl Triethoxysilane | $C_{14}H_{32}O_3Si_3$ | 3.59 |
| Coarse Grit Sandblast | N/A | Nice Visible | SIO 6715 n-Octyl Triethoxysilane | $C_{14}H_{32}O_3Si_3$ | 3.28 |
| Coarse Grit Sandblast with Sodium Silicate | N/A | Nice Visible | SIO 6715 n-Octyl Triethoxysilane | $C_{14}H_{32}O_3Si_3$ | 3.12 |

TABLE 9-continued

Silane SIO6715

| Broader Etchants | pH | Border Appearance | Silane | Molecular Formula | Water Height (mm) |
|---|---|---|---|---|---|
| Fine Grit Sandblast | N/A | Nice Visible | SIO 6715 n-Octyl Triethoxysilane | $C_{14}H_{32}O_3Si_3$ | 3.32 |
| Fine Grit Sandblast with Sodium Silicate | 12.5 | Nice Visible | SIO 6715 n-Octyl Triethoxysilane | $C_{14}H_{32}O_3Si_3$ | 4.14 |
| Fine Grit Sandblast with NaOH | 14 | Nice Visible | SIO 6715 n-Octyl Triethoxysilane | $C_{14}H_{32}O_3Si_3$ | 3.12 |

Example 10

Abrasion with Fine Polishing Powders as a Means of Activating Glass Surfaces for the Formation of Spill-Resistant Borders Four 4 inch by 4-inch square glass plates are masked with electrical tape to create a 0.5-inch wide spill-resistant border at the outer edge. The area that will form the border is polished using slurry of about 60-70 gram of cerium oxide in water (3.5-3.7 micron particles, about 3,000-8,000 mesh or grit). Polishing is carried out by using a motorized wheel with the surface of the plate being polished soaked with the slurry.

Following abrasion/polishing with cerium oxide, two of the four plates are etched with 5% aqueous HF solution for 30 seconds. The polished and polished/etched plates are washed with water and dried first with a stream of air and then in a 200° F. oven for 5 min. One each of the polished and polished/etched plates is treated with the silanizing agent SIT8174 or silanizing agent SIH5841.7. The treated plates are cured by heating at 200° F. for 15-30 min. Data for all four plates are summarized in Table 10. The agent SIT8174 performed slightly better than SIH5841.7 for both sets of plates.

TABLE 10

Spill-Resistant Borders Prepared by Cerium Oxide Polishing With and Without 5% HF Etch Employing Two Different Silane Treatments

| Border Treatment | pH | Silane | Formula | Water Height (mm) | Border Appearance |
|---|---|---|---|---|---|
| Cerium oxide polish | N/A | SIT8174 | $C_8H_4Cl_3F_{13}Si$ | 4.46 | Clear |
| Cerium oxide & 5% HF etch | 1 | SIT8174 | $C_8H_4Cl_3F_{13}Si$ | 4.53 | Clear |
| Cerium oxide | N/A | SIH5841.7 | $C_{16}H_{22}F_{17}N_3Si$ | 4.31 | Clear |
| Cerium oxide & 5% HF etch | 1 | SIH5841.7 | $C_{16}H_{22}F_{17}N_3Si$ | 4.38 | Clear |

Example 11

The Ability of Spill-Resistant Borders to Retain Alcohol Containing Liquids

Four 4 inch×4-inch glass plates with spill-resistant borders are prepared by four different methods indicated in Table 11 as described in Example 5 and silanated with tridecafluoro-1,1,2,2-tetrahydrooctyl trichlorosilane (SIT8174). The plates are tested for their spill performance with two alcoholic beverages; a wine (Sutter Home Merlot, California, 2007) and vodka (Krasser's Vodka). Spill height data for those alcoholic drinks are summarized in Table 11. Wine with its lower alcohol content shows a higher retained liquid level than the vodka with its higher alcohol content. The coarse grit sandblasted borders show the highest retained liquid heights for both liquids.

TABLE 11

Spill Barrier Height for Two Alcoholic Beverages

| Border Treatment | pH | Silane | Formula | Water Height (mm) | Border Appearance |
|---|---|---|---|---|---|
| Sutter Home Merlot (California, 2007) | | | | | |
| 5% HF | 1 | SIT8174 | $C_8H_4Cl_3F_{13}Si$ | 3.54 | Clear |
| Sodium silicate | 12.5 | SIT8174 | $C_8H_4Cl_3F_{13}Si$ | 3.69 | Clear |
| Coarse grit blast | N/A | SIT8174 | $C_8H_4Cl_3F_{13}Si$ | 4.02 | Visible |
| Fine grit blast | N/A | SIT8174 | $C_8H_4Cl_3F_{13}Si$ | 3.58 | Visible |
| Krasser's Vodka | | | | | |
| 5% HF | 1 | SIT8174 | $C_8H_4Cl_3F_{13}Si$ | 2.53 | Clear |
| Sodium silicate | 12.5 | SIT8174 | $C_8H_4Cl_3F_{13}Si$ | 2.53 | Clear |
| Coarse grit blast | N/A | SIT8174 | $C_8H_4Cl_3F_{13}Si$ | 2.66 | Visible |
| Fine grit blast | N/A | SIT8174 | $C_8H_4Cl_3F_{13}Si$ | 2.63 | Visible |

Example 12

The Ability of Spill-Resistant Borders to Retain Various Liquid Food Items after Cleaning Four groups three 4 inch by 4 inch square plates, having a 0.5 inch spill-resistant border formed by the application of tridecafluoro-1,1,2,2-tetrahydrooctyl trichlorosilane to their edges after one of the following four treatments are prepared. In the first treatment, three plates are masked leaving a 0.5 inch region at the edge exposed for the preparation of the spill-resistant border. The plate is etched with 5% aqueous HF for 30 seconds at room temperature (Treatment 1 in Tables 12 a-f). The second set of three plates is masked as described for the first treatment in this example and subject to sandblasting with 400 mesh abrasive particles and subsequently etched with 5% aqueous HF for 30 seconds at room temperature (Treatment 2 in Tables 12 a-f). The third set of three plates is masked as described for the first treatment in this example and subject to sandblasting with 35 mesh abrasive particles and subsequently etched with 5% aqueous HF for 30 seconds at room temperature (Treatment 3 in Tables 12 a-f). The fourth set of plates are masked as described for the first treatment in this example and subject to sandblasting with 35 mesh abrasive particles without subsequent etching (Treatment 4 in Tables 12 a-f).

After the above treatments, and before removing the masks, the plates are washed with water, and dried in an oven (about 200° F.) for about 15 minutes. After cooling, the plates are treated tridecafluoro-1,1,2,2-tetrahydrooctyl trichlorosilane as a 1% solution in hexane. After the hexane has evaporated the plates are cured by baking in an oven at 150 to 250° F. for 5 to 30 minutes (curing can also be accomplished by allowing the silanated plates to remain at room temperature for about 24 hours in a controlled humidity environment). Following curing masks are removed. The ability of each set of three plates to retain water is measured and the average values for the height of water retained is plotted for each plate in the histogram shown in FIG. 5 and the average for each treatment is shown FIG. 6.

A border is prepared on a fifth glass plate by dissolving a polymer binder in a rapidly evaporating liquid (e.g., acetone or methyl ethyl ketone) and adding a hydrophobic powder. The mixture of the dissolved polymer and hydrophobic powder is applied to form a border on the plate. While many powders can be made hydrophobic (superhydrophobic) by silanating them, including oxides of semi-metallic such as silicon, in the present example the powder used was diatomaceous earth treated with tridecafluoro-1,1,2,2-tetrahydrooctyl trichlorosilane. (Treatment 5 in Tables 12 a-f)

Using the following sequence of cleaning and filling with various food stuffs, the ability of the plates to retain liquids (resistance to spillage) is assessed for each type of plate and food stuff:
  i) Cleaning with soap and water,
  ii) Filling with water (see data for the height of retained water in Table 12a),
  iii) Cleaning with soap and water,
  iv) Filling with apple juice (see data for the height of retained apple juice in Table 12b),
  v) Cleaning with soap and water,
  vi) Filling with oil and vinegar salad dressing with spices (see data for the height of retained salad dressing in Table 12c),
  vii) Cleaning with soap and water,
  viii) Filling with milk (see data for the height of retained milk in Table 12d),
  vii) Cleaning with soap and water,
  ix) Cooling the plates and water to approximately 36° F. overnight and filling the plates with the cooled water without removing any condensation from their surfaces (see data for the height of retained cooled water in Table 12e), and
  x) Drying the condensation present on the plates and filling them with ice cold water (see data for the height of retained ice cold water in Table 12f).

TABLE 12a

Retention of water after one cleaning with soap and water

| Treatment | Spill Area (mm) Width | Length | Spill Area (cm²) | Volume Filled In Spill Area Prior to Spill (cm³) | Liquid Height in Spill Area (Volume/Spill Area) (mm) |
|---|---|---|---|---|---|
| 1 | 28.30 | 41.19 | 11.66 | 4.8 | 4.12 |
| 2 | 22.73 | 46.78 | 10.63 | 4.8 | 4.51 |
| 3 | 18.64 | 45.13 | 8.41 | 5.0 | 5.94 |
| 4 | 18.93 | 47.08 | 8.91 | 4.0 | 4.49 |
| 5 | 29.59 | 54.52 | 16.13 | 4.8 | 2.98 |

TABLE 12b

Retention of apple juice after cleaning with soap

| Treatment | Spill Area (mm) Width | Length | Spill Area (cm²) | Volume Filled In Spill Area Prior to Spill (cm³) | Liquid Height in Spill Area (Volume/Spill Area) (mm) |
|---|---|---|---|---|---|
| 1 | 28.30 | 41.19 | 11.66 | 4.8 | 4.12 |
| 2 | 22.73 | 46.78 | 10.63 | 4.8 | 4.51 |
| 3 | 18.64 | 45.13 | 8.41 | 5.0 | 5.94 |
| 4 | 18.93 | 47.08 | 8.91 | 4.0 | 4.49 |
| 5 | 29.59 | 54.52 | 16.13 | 5.2 | 3.22 |

TABLE 12c

Retention of salad dressing after cleaning with soap and water

| Treatment | Spill Area (mm) Width | Length | Spill Area (cm²) | Volume Filled In Spill Area Prior to Spill (cm³) | Liquid Height in Spill Area (Volume/Spill Area) (mm) |
|---|---|---|---|---|---|
| 1 | 28.30 | 41.19 | 11.66 | 4.7 | 4.03 |
| 2 | 22.73 | 46.78 | 10.63 | 4.8 | 4.51 |
| 3 | 18.64 | 45.13 | 8.41 | 4.4 | 5.23 |
| 4 | 18.93 | 47.08 | 8.91 | 3.0 | 3.37 |
| 5 | 29.59 | 54.52 | 16.13 | 5.8 | 3.60 |

TABLE 12d

Retention of milk after cleaning with soap and water

| Treatment | Spill Area (mm) Width | Length | Spill Area (cm²) | Volume Filled In Spill Area Prior to Spill (cm³) | Liquid Height in Spill Area (Volume/Spill Area) (mm) |
|---|---|---|---|---|---|
| 1 | 28.30 | 41.19 | 11.66 | 3.6 | 3.09 |
| 2 | 22.73 | 46.78 | 10.63 | 3.9 | 3.67 |
| 3 | 18.64 | 45.13 | 8.41 | 4.0 | 4.76 |
| 4 | 18.93 | 47.08 | 8.91 | 3.0 | 3.37 |
| 5 | 29.59 | 54.52 | 16.13 | 3.8 | 2.36 |

TABLE 12e

Retention of cooled water after cleaning with soap and water (without removing condensation)

| Sample ID | Spill Area (mm) Width | Length | Spill Area (cm²) | Volume Filled In Spill Area Prior to Spill (cm³) | Liquid Height in Spill Area (Volume/Spill Area) (mm) |
|---|---|---|---|---|---|
| 1 | 28.30 | 41.19 | 11.66 | 1.6 | 1.37 |
| 2 | 22.73 | 46.78 | 10.63 | 3.4 | 3.20 |
| 3 | 18.64 | 45.13 | 8.41 | 3.9 | 4.64 |
| 4 | 18.93 | 47.08 | 8.91 | 2.9 | 3.25 |
| 5 | 29.59 | 54.52 | 16.13 | 4.0 | 2.48 |

TABLE 12f

Retention of ice cold water after removing condensation

| Sample ID | Spill Area (mm) Width | Length | Spill Area (cm²) | Volume Filled In Spill Area Prior to Spill (cm³) | Liquid Height in Spill Area (Volume/Spill Area) (mm) |
|---|---|---|---|---|---|
| 1 | 28.30 | 41.19 | 11.66 | 4.7 | 3.99 |
| 2 | 22.73 | 46.78 | 10.63 | 4.6 | 4.32 |
| 3 | 18.64 | 45.13 | 8.41 | 4.2 | 4.99 |
| 4 | 18.93 | 47.08 | 8.91 | 3.8 | 4.26 |
| 5 | 29.59 | 54.52 | 16.13 | 5.0 | 3.10 |

Example 13

Figure 5:
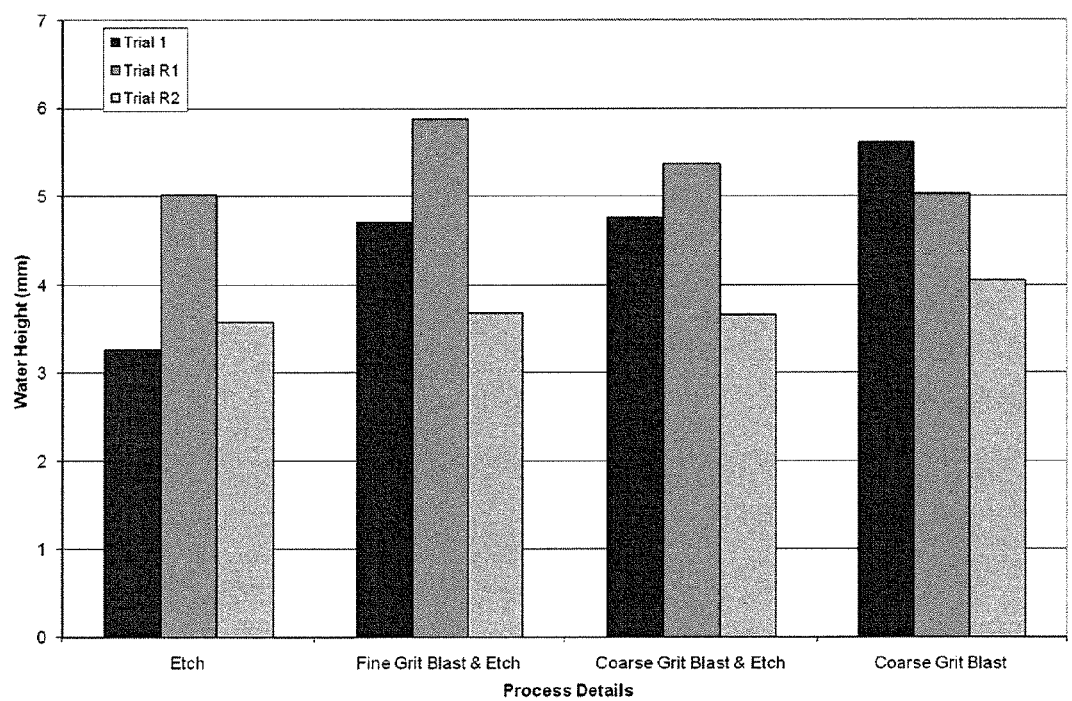
FIG. 5 shows a comparison of the height of water retained for three sets of glass plates prepared in three different trials using four different treatment methods in each trial.
Figure 6:
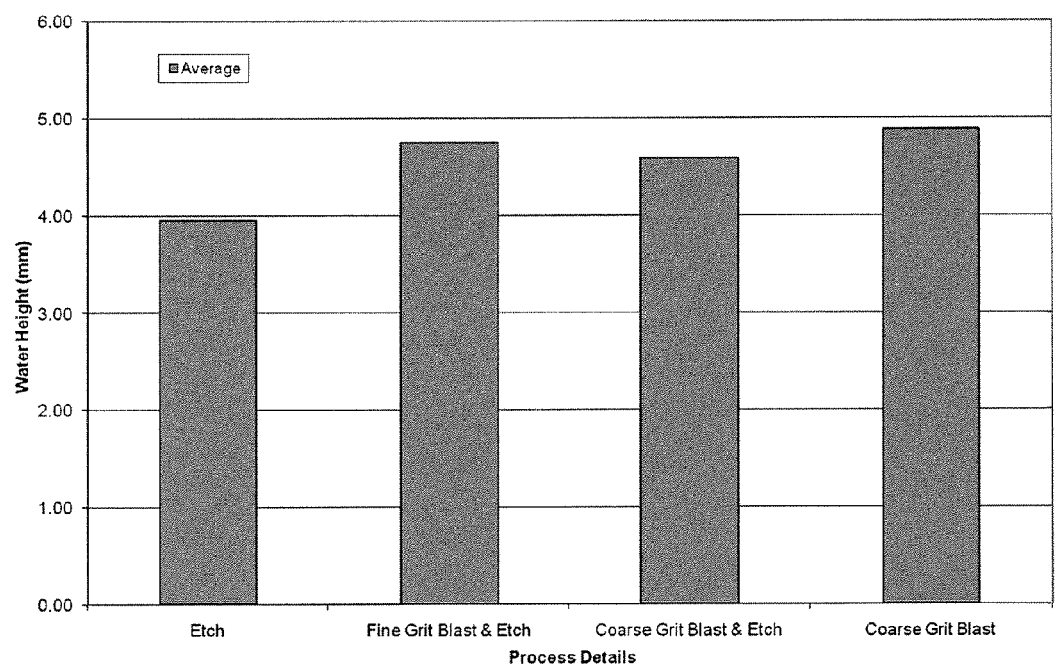
FIG. 6 shows the average height of water retained for each different treatment method employed in FIG. 5.
Figure 7:
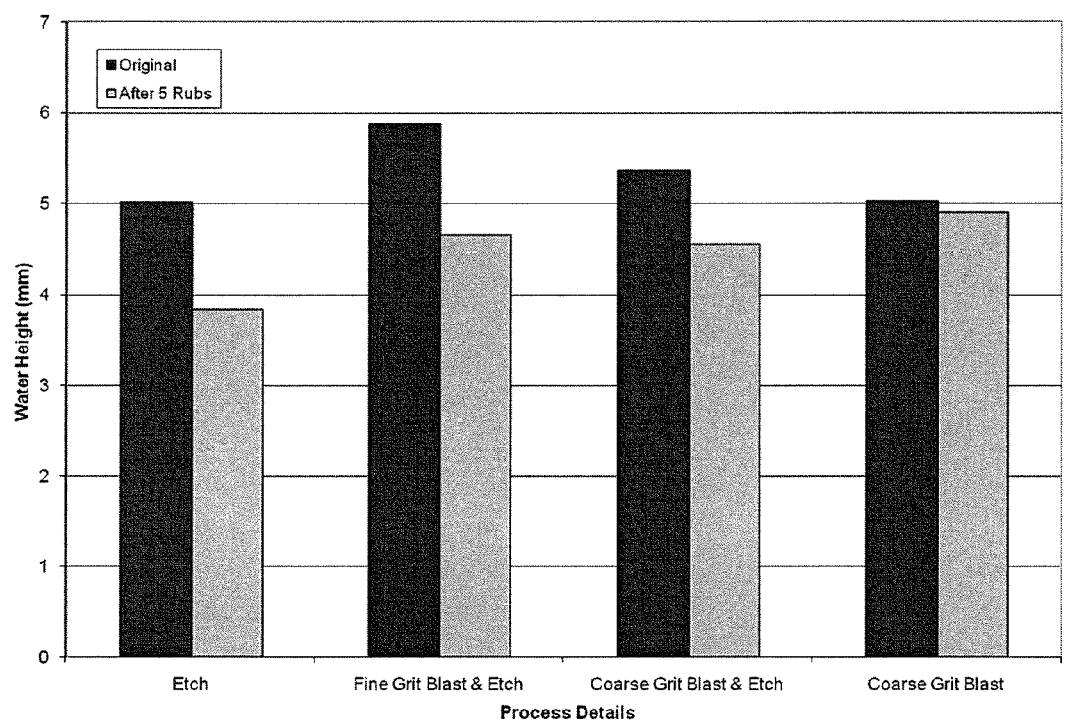
FIG. 7 shows the height of water retained by glass plates prepared by four different treatment methods before and after repeated abrasion with a glass jar.
Figure 8:
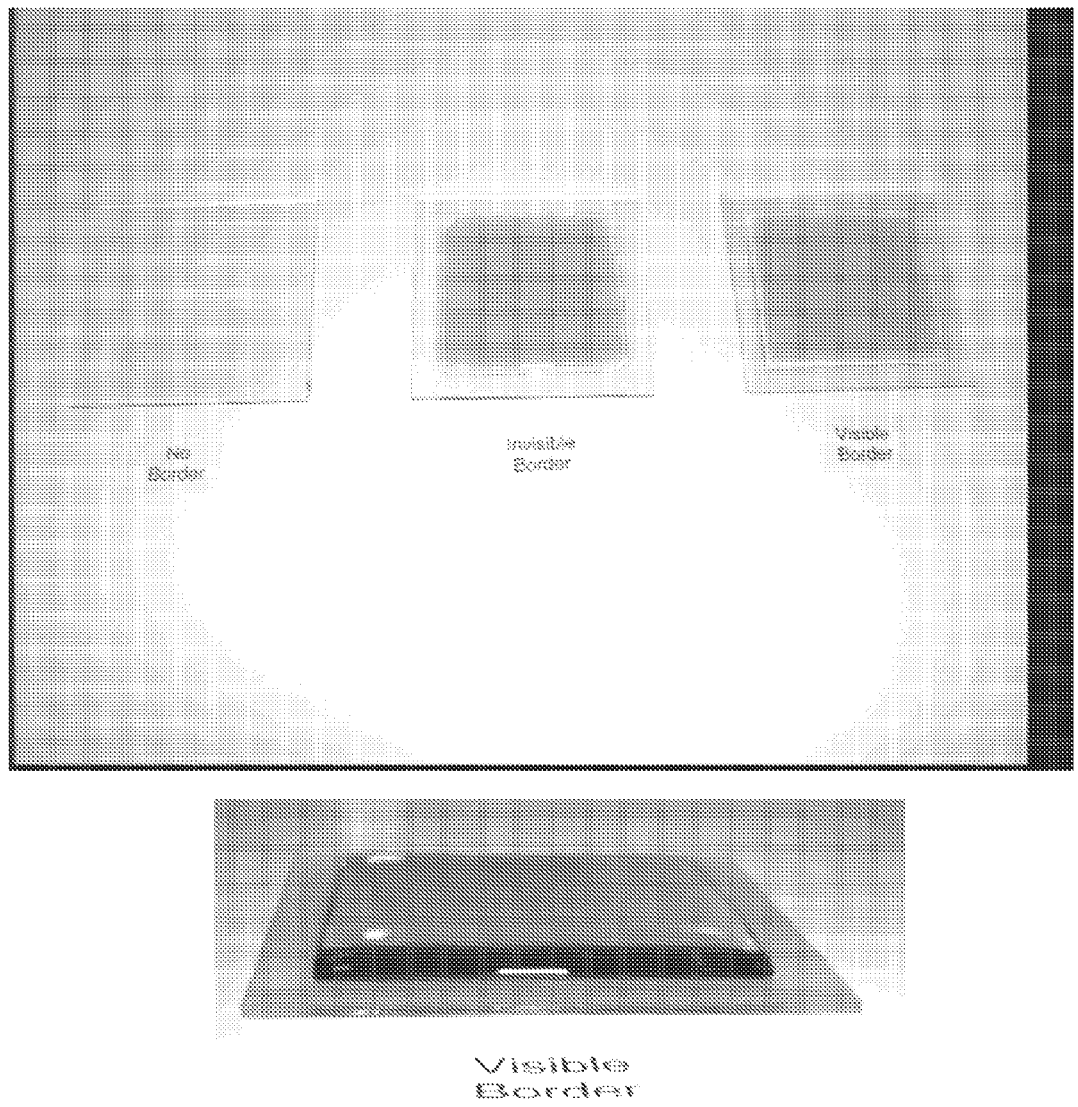
FIG. 8 in the upper portion shows a photograph of three glass sheets having no border, an invisible border, and a visible border and their ability to retain water. The lower portion of FIG. 8 shows a view of the plate with a visible border at a lower angle that shows the height of water retained.
Figure 9:
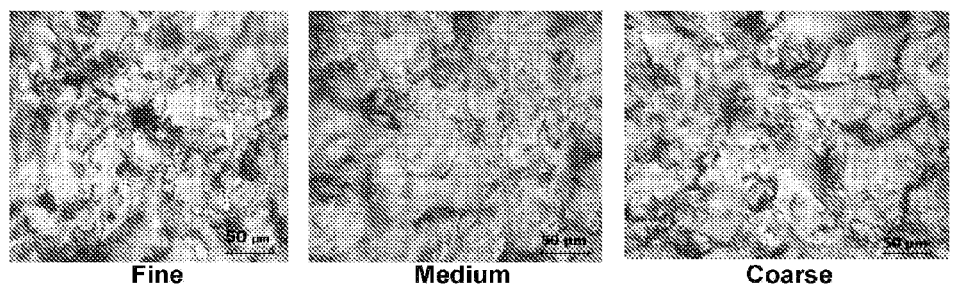
FIG. 9 shows micrographs of glass plates sandblasted with three different grades of abrasive particles (coarse, medium, or fine).

The Effects of Abrasion on the Ability of Spill-Resistant Borders to Retain Water Part A—A second of the glass plates are prepared using each of the four treatments described in Example 12, is assessed for their ability to retain water (see the middle bar for each treatment group in FIG. 5. The plates are subject to abrasion using a glass jar by moving it back and forth over the border 5 times and the height of water retained by the border on those plates is measured again. From the data in Table 13 and FIG. 7 it can be seen that rubbing can reduce the water height to some extent.

TABLE 13A

Testing water retention of a spill-resistant border after abrasion with a glass jar five times

| Treatment | Spill Area (mm) Width | Length | Spill Area ($cm^2$) | Volume of Water Filled In Spill Area Prior to Spill ($cm^3$) | Water Height in Spill Area Water Volume/ Spill Area (mm) |
|---|---|---|---|---|---|
| 1 | 15.45 | 38.78 | 5.99 | 2.3 | 3.84 |
| 2 | 18.95 | 43.15 | 8.18 | 3.8 | 4.65 |
| 3 | 17.30 | 43.17 | 7.47 | 3.4 | 4.55 |
| 4 | 18.39 | 45.53 | 8.37 | 4.1 | 4.90 |

Part B—A 0.5 inch spill-resistant borders is prepared on the edge three 4-by 4-in. glass plates using as activation treatments (i) 0 5% HF etching produced a clear border, (ii) sandblasting using find sand produced a visible border by abrasion, and (iii) Professional 30 Second Glass Etch to form a visible border. The activated borders regions of each plate are treated with silane SIT8174 from Gelest, Inc.

For each plate, border abrasion tests are carried with using a 32-oz. glass jar filled (a "Mason Jar") filled with 24 oz. of water. After an initial measurement of water fill height for each plate, the jar is rubbed over the border on one side of the plate 50, 100, 150, 200 and 300 times for with the height of water retained by the plate measured after each set of rubbing. Data are shown in Table 13B.

TABLE 13B

| Glass Plate Sample No. | Border Type | \multicolumn{6}{c}{Height of water retained in millimeter for the numbers of rubs indicated in parentheses} |
|---|---|---|---|---|---|---|---|

| Glass Plate Sample No. | Border Type | (control 0 rubs) | (50) | (100) | (150) | (200) | (300) |
|---|---|---|---|---|---|---|---|
| 1 | Invisible | 4.7 | 4.65 | 4.33 | 4.33 | 4.33 | 4.17 |
| 3 | Visible (Sand) | 4.86 | 4.81 | 4.81 | 4.81 | 4.81 | 4.81 |
| 5 | Visible Professional 30 sec. Glass Etch | 4.7 | 4.81 | 4.65 | 4.49 | 4.49 | 4.49 |

Example 14

The Hydrophobic and Oleophobic Behavior Treated Surfaces

Water and mineral oil contact angle data are measured for on 2 inch by 2 inch glass plates that have been treated with one of nine different silanizing agents. Prior to treatment with silanizing agents the plates are activated by etching the surface with 5% aqueous HF for 30 seconds, drying at 200° F. for 15-30 minutes, cooling, and treating the plates with one of nine the different silanes in Table 14(a). After treatment with silanes, the plates are cured at 200° F. for 15 to 30 minutes and cooled. Ten measurements of the contact angles for water and mineral oil (Mineral Oil, Light Viscosity, Technical Grade, PTI Process Chemicals, Ringwood, Ill.) are made on each plate. The averages and standard deviations for those measurements are summarized in Table 14(a), which also includes data for glass that has not been treated with a silanizing agent as the "Control No Silanization" entry. All measurements are made at room temperature.

TABLE 14(a)

Contact Angle for glass surfaces treated with one of nine different silanes to form a border region that is not visible

| Silane ID: | Leaving Group | Terminal Functionality | Water Contact Angle (degrees) Average | Std. Deviation |
|---|---|---|---|---|
| SIT8173.0 | Trihydro | Fluorine (13) | 91.569 | 6.1189 |
| SIT8174.0 | Trichloro | Fluorine (13) | 116.212 | 3.2937 |
| SIT8175.0 | Triethoxy | Fluorine (13) | 64.5037 | 8.0617 |
| SIT8176.0 | Trimethoxy | Fluorine (13) | 91.722 | 6.8284 |
| SIH5840.5 | Dimethylamino | Fluorine (17) | 81.006 | 8.5750 |
| SIH5841.7 | Tris(dimethylamino) | Fluorine (17) | 85.491 | 8.6567 |
| SIO6645.0 | Trimethoxy | Methyl (18) | 83.045 | 10.6766 |
| SIO6715.0 | Triethoxy | Methyl (18) | 62.4912 | 0.9539 |
| SIN6597.4 | Dimethylamino | Fluorine (9) | 59.7741 | 5.6127 |
| Control No Silanization | — | — | 18.395 | 1.4045 |

| Silane ID: | Leaving Group | Terminal Functionality | Oil Contact Angle (degrees) Average | Std. Deviation |
|---|---|---|---|---|
| SIT8173.0 | Trihydro | Fluorine (13) | 72.0708 | 7.0987 |
| SIT8174.0 | Trichloro | Fluorine (13) | 108.7258 | 3.0468 |
| SIT8175.0 | Triethoxy | Fluorine (13) | 33.1158 | 3.1323 |
| SIT8176.0 | Trimethoxy | Fluorine (13) | 55.3158 | 7.2287 |
| SIH5840.5 | Dimethylamino | Fluorine (17) | 41.068 | 2.8977 |
| SIH5841.7 | Tris(dimethylamino) | Fluorine (17) | 56.337 | 3.7703 |
| SIO6645.0 | Trimethoxy | Methyl (18) | 34.531 | 1.0548 |
| SIO6715.0 | Triethoxy | Methyl (18) | 34.6855 | 1.0308 |
| SIN6597.4 | Dimethylamino | Fluorine (9) | 27.0033 | 7.2239 |
| Control No Silanization | — | — | 12.341 | 3.6562 |

*Control measurement was made on the surface not subjected to HF treatment

Water and mineral oil contact angle data are measured on 2 inch by 2 inch glass plates prepared using one of the following three activating treatments:
1. Blasting with fine sand (57.5 μm);
2. Blasting with coarse sand (387.5 μm); and
3. Etching using 30 Sec Etching Cream Following the activation treatment, the plates are treated with one of three different fluorinated alkyl silanizing agents (SIH 5840.5, SIH 5841.7, and SIT 8174.0) to convert the surface into hydrophobic or oleophobic surfaces such as would be used in a spill-resistant border. For plates blasted with coarse sand, a non-fluorinated silane (SIO 6715.0) is also employed to convert the surface into a spill resistant border. After treatment with the silanizing agents, the plates are cured at 200° F. for 15 to 30 minutes and cooled. Five measurements of the contact angles for water and mineral oil are made on each plate. The averages and standard deviations for those measurements are summarized in Table 14(b), which also includes data for glass that has not been treated with a silanizing agent. All measurements are made at room temperature.

TABLE 14(b)

Contact Angle for glass surfaces treated with
silanes to form a visible border region

| Silane ID: | Visible Border | Liquid | Contact Angle (degrees) Average | Std. Deviation |
|---|---|---|---|---|
| SIH 5840.5 | Fine Blast | water | 76.93 | 5.797098 |
| SIH 5840.5 | Corse Blast | water | 71.37 | 3.014489 |
| SIH 5840.5 | 30 Sec. Etching Cream | water | 46.41 | 4.425683 |
| SIH 5841.7 | Fine Blast | water | 112.64 | 1.951766 |
| SIH 5841.7 | Corse Blast | water | 106.79 | 2.053628 |
| SIH 5841.7 | 30 Sec. Etching Cream | water | 108.01 | 11.83157 |
| SIT 8174.0 | Fine Blast | water | 123.74 | 2.899724 |
| SIT 8174.0 | Corse Blast | water | 124.72 | 3.995871 |
| SIT 8174.0 | 30 Sec. Etching Cream | water | 110.87 | 1.73312 |
| SIO 6715.0 | Corse Blast | | 85.22 | 1.815218 |
| Control No Silanization | Fine Blast | water | 26.25 | 11.89606 |
| Control No Silanization | Corse Blast | water | 41.61 | 6.504281 |
| Control No Silanization | 30 Sec. Etching Cream | water | 33.35 | 1.308337 |
| SIH 5840.5 | Fine Blast | mineral oil | 29.71 | 4.563883 |
| SIH 5840.5 | Corse Blast | mineral oil | 26.25 | 2.987117 |
| SIH 5840.5 | 30 Sec. Etching Cream | mineral oil | 38.13 | 5.513698 |
| SIH 5841.7 | Fine Blast | mineral oil | 52.73 | 4.227723 |
| SIH 5841.7 | Corse Blast | mineral oil | 79.85 | 3.850016 |
| SIH 5841.7 | 30 Sec. Etching Cream | mineral oil | 75.81 | 9.344477 |
| SIT 8174.0 | Fine Blast | mineral oil | 88.22 | 4.614441 |
| SIT 8174.0 | Corse Blast | mineral oil | 91.88 | 1.734779 |
| SIT 8174.0 | 30 Sec. Etching Cream | mineral oil | 85.75 | 4.597758 |
| SIO 6715.0 | Corse Blast | mineral oil | 10.51 | 0.398026 |
| Control No Silanization | Fine Blast | mineral oil | Less than 10 | — |
| Control No Silanization | Corse Blast | mineral oil | 13.66 | 1.212068 |
| Control No Silanization | 30 Sec. Etching Cream | mineral oil | 16.21 | 2.340523 |

*Control measurements are made on the surface after blasting or etching

Example 15

Spill-Resistant Borders and their Behavior with Oils

The behavior of spill-resistant borders with oils is assessed by determining the height of a mineral oil layer that the border will cause to be retained without spillage. For the assessment, 0.5 inch borders are formed on the edge of masked 4 inch by 4 inch glass plates. The region that will form the border on three of the plates is activated with 5% aqueous HF, two of which are treated with a fluorine containing silanizing agents and one with a non-fluorine containing silanizing agent. The region that will form the border on the remaining three plates is activated by sandblasting with 60 mesh particles, followed by treatment with the same three silanes employed for the HF activated plates. The mineral oil height and contact angle data obtained for all six samples is summarized in Table 15.

TABLE 15

Mineral Oil Height for Borders on Glass with Two
Different Activators and Three Different Silanes

| Plate ID | Silane Formula | Height (mm) | Contact Angle ($\Theta$) | Standard Deviation |
|---|---|---|---|---|
| Sand Blast 8174 | $C_8H_4Cl_3F_{13}Si$ | 2.38 | | |
| Sand Blast 5841.7 | $C_{16}H_{22}F_{17}N_3Si$ | 2.06 | | |
| Sand Blast 6715.0 (Non-F) | $C_{14}H_{32}O_3Si_3$ | 0.95 | | |
| HF 8174 | $C_8H_4Cl_3F_{13}Si$ | 1.91 | 108.7 | 3.04 |
| HF 5841.7 | $C_{16}H_{22}F_{17}N_3Si$ | 2.05 | 56.34 | 3.77 |
| HF 6715.0 (Non-F) | $C_{14}H_{32}O_3Si_3$ | 1.17 | 34.7 | 1.03 |

*Non-F indicates the terminal functionality contained no fluorine atoms.

Example 16

The Effect of Leaving Silanizing Agent Groups on the Water Retention of Spill-Resistant Borders Formed on Glass Surfaces The effectiveness of silane leaving groups and terminal functionalities on the ability of spill-resistant borders to retain water is assessed for nine different silanes under controlled conditions. For the assessment, nine 4 inch by 4 inch square glass plates are masked with electrical tape to create a 0.5-inch wide unmasked area around the outer edge as in Example 1. The unmasked area is etched with 5% HF for 1 minute, the acid is washed off with cold water, and the plates are dried at about 200° F. for 15-30 minutes, followed by cooling, and treating separate plates with one of nine different silanes as a 1% solution of the silane in hexane. All of the plates are heat cured at about 200° F. for 15-30 minutes, and after cooling are unmasked and the height of water retained by the spill-resistant border measured. All plates are processed at the same time in order to minimize any treatment differences that might arise. Water-height data are summarized in Table 16.

TABLE 16

Water Height for Spill-Resistant Borders Created by
Etching with 5% HF and using Nine Different Silanes

| No. | Silane Name[a] | Water Height (mm) | Leaving Group | Terminal Functionality[b] |
|---|---|---|---|---|
| 1 | SIT8173 | 3.92 | Trihydro | Fluorine (13) |
| 2 | SIT8174 | 4.59 | Trichloro | Fluorine (13) |
| 3 | SIT8175 | 3.90 | Triethoxy | Fluorine (13) |
| 4 | SIT8176 | 4.00 | Trimethoxy | Fluorine (13) |
| 5 | SIH5840.5 | 4.30 | Dimethylamino | Fluorine (17) |
| 6 | SIH5841.7 | 4.59 | Tris(dimethylamino) | Fluorine (17) |
| 7 | SIO6645.0 | 4.08 | Trimethoxy | Methyl (18) |
| 8 | SIO6715.0 | 3.69 | Triethoxy | Methyl (8) |
| 9 | SIN6597.4 | 3.50 | Dimethylamino | Fluorine (9) |

[a]All silanes are from Gelest and the entry under "Silane Name" represents their Gelest references.
[b]Numbers in parenthesis represent the number of fluorine's in the terminal functional groups.

Example 17

Sandblast Particle Size Versus Feature Size of Glass Borders

Three different sand particle sizes are used to create different size features in glass borders. Sands are: fine, with particle size ranging from 45-70 μm; coarse, with particle sizes of 250-525 μm; or medium, which is composed of a 50:50 mixture of fine and coarse sands, and yielding a particle size ranging from 45-525 μm.

Feature sizes are measured by taking 200× magnification micrographs for each of the sandblasted borders made on 4-by 4-in. glass plates. The sand used and feature sizes observed are summarized in Table 17.

TABLE 17

Particle Sizes and Observed Feature Sizes

| Sand Type | Sand Size Average in microns (μm) | Feature Size in Glass Border (μm) |
|---|---|---|
| Fine | 57.5 | 60.4 |
| Medium | 222.5 | 109.6 |
| Coarse | 387.5 | 202.0 |

The invention claimed is:

1. A method for forming a spill-resistant border on a surface of a refrigerator shelf comprising:
   (a) roughening a portion of the surface that will serve as the spill-resistant border on the shelf; and
   (b) applying a silane or fluorosilane silanizing agent to the portion of the surface that will serve as the spill-resistant border on the shelf, thereby increasing the hydrophobicity and oleophobicity of said portion of the surface that will serve as the spill-resistant border,
   wherein said spill-resistant border is visible and forms a perimeter around at least one area that has a lower hydrophobicity than the border, and
   wherein, when the surface is level, the spill-resistant border retains up to 5.9 mm of water, up to 5.2 mm of an oil and water mixture, or up to 4.7 mm of milk.

2. The method of claim 1, further comprising activating at least one part of said portion of said surface that will serve as a border prior to said applying the silane or fluorosilane, wherein the activating comprises etching with a chemical agent or abrading the surface.

3. The method of claim 2, further comprising applying a mask to said surface before said activating, before said applying the silane or fluorosilane, or before both said activating and said applying the silane or fluorosilane.

4. The method of claim 3, wherein said activating comprises etching the surface with a chemical agent or treating it with abrasive particles.

5. The method of claim 1, wherein said surface is glass.

6. The method of claim 1, wherein said spill-resistant border provides a retention of ≥3.0 mm of water or an oil and water mixture.

7. The method of claim 1, wherein said silane or fluorosilane silanizing agent comprises a fluoroalkyl group.

8. The method of claim 7, wherein said silane is tridecafluoro-1,1,2,2-tetrahydrooctyl trichlorosilane.

9. The method of claim 1, wherein the roughening a portion of the surface is conducted by etching or sandblasting.

10. The method of claim 1, wherein said silane is tridecafluoro-1,1,2,2-tetrahydrooctyl trichlorosilane.

11. A method for forming a hydrophobic and oleophobic spill-resistant border on a surface of a refrigerator shelf comprising binding particles to regions on the refrigerator shelf that will serve as the border to form bound particles;
   wherein the bound particles are treated with a silane or fluorosilane silanizing agent and said border forms a perimeter around at least one area of the surface that has a lower hydrophobicity and lower oleophobicity than the border; and
   wherein the spill-resistant border is visible and retains up to 3.1 mm of water, up to 3.6 mm of an oil and water mixture, or up to 2.3 mm of milk when the surface is level.

12. The method of claim 11, wherein the shelf is comprised of glass.

13. The method of claim 11, wherein the particles of the hydrophobic and oleophobic regions comprise particles treated with a silanizing agent.

14. The method of claim 11, wherein the particles bound to the hydrophobic and oleophobic regions comprise particles treated with a fluorosilane.

15. The method of claim 14, where the fluorosilane is tridecafluoro-1,1,2,2-tetrahydrooctyl trichlorosilane.

16. The method of claim 14, wherein the height of water retained by the border is at least 3.0 mm.

17. The method of claim 15, wherein the height of water retained by the border is at least 3.0 mm.

18. The method of claim 2, wherein said silane or fluorosilane is tridecafluoro-1,1,2,2-tetrahydrooctyl trichlorosilane.

19. The method of claim 11, wherein said silane or fluorosilane is tridecafluoro-1,1,2,2-tetrahydrooctyl trichlorosilane.

20. The method of claim 11, wherein said silane is tridecafluoro-1,1,2,2-tetrahydrooctyl trichlorosilane.

21. The method of claim 13, wherein said silane is tridecafluoro-1,1,2,2-tetrahydrooctyl trichlorosilane.

* * * * *